US012301709B2

(12) United States Patent
Nix

(10) Patent No.: US 12,301,709 B2
(45) Date of Patent: May 13, 2025

(54) MULTIPLE POST-QUANTUM CRYPTOGRAPHY KEY ENCAPSULATIONS WITH AUTHENTICATION AND FORWARD SECRECY

(71) Applicant: John A. Nix, Evanston, IL (US)

(72) Inventor: John A. Nix, Evanston, IL (US)

(*) Notice: Subject to any disclaimer, the term of this patent is extended or adjusted under 35 U.S.C. 154(b) by 175 days.

(21) Appl. No.: 18/254,365

(22) PCT Filed: Nov. 23, 2021

(86) PCT No.: PCT/US2021/060649
§ 371 (c)(1),
(2) Date: May 24, 2023

(87) PCT Pub. No.: WO2022/115491
PCT Pub. Date: Jun. 2, 2022

(65) Prior Publication Data
US 2024/0106636 A1  Mar. 28, 2024

Related U.S. Application Data

(60) Provisional application No. 63/117,849, filed on Nov. 24, 2020.

(51) Int. Cl.
*H04L 9/08* (2006.01)
*H04L 9/30* (2006.01)

(52) U.S. Cl.
CPC .......... *H04L 9/0852* (2013.01); *H04L 9/0861* (2013.01); *H04L 9/30* (2013.01)

(58) Field of Classification Search
CPC ........ H04L 9/0852; H04L 9/0861; H04L 9/30
See application file for complete search history.

(56) References Cited

U.S. PATENT DOCUMENTS

| 8,681,996 B2 | 3/2014 | Sabev |
| 8,782,774 B1 * | 7/2014 | Pahl ...................... H04L 9/0841 726/4 |
| 9,531,685 B2 | 12/2016 | Gero et al. |

(Continued)

OTHER PUBLICATIONS

Wikipedia, "Post-Quantum Cryptography Standardization", Aug. 31, 2020.

(Continued)

*Primary Examiner* — Darshan I Dhruv
(74) *Attorney, Agent, or Firm* — GrowIP Law Group LLC

(57) ABSTRACT

A server and a device can conduct mutually authenticated post-quantum cryptography (PQC) key encapsulation mechanisms (KEM) that also support forward secrecy. The device can store a trusted server public key (PK.server) and the server can store a trusted device public key (PK. device). The device can generate (i) a first KEM ciphertext and (ii) a first key with PK.server and encrypt an ephemeral public key (ePK. device) using the first key. The server can generate (i) a second KEM ciphertext and (ii) a second key with ePK. device. The server can generate (i) a third KEM ciphertext and (ii) a third key with PK.device. The server can encrypt an ephemeral public key (ePK. server) using the first, second, and third keys. The device can generate (i) a fourth KEM ciphertext and (ii) a fourth key with ePK. server. The device can encrypt application data using at least the first, second, third, and fourth keys.

22 Claims, 14 Drawing Sheets

(56) References Cited

U.S. PATENT DOCUMENTS

| | | | |
|---|---|---|---|
| 9,819,656 | B2 | 11/2017 | Carlson |
| 9,985,782 | B2 | 5/2018 | McCallum |
| 10,218,504 | B1* | 2/2019 | Kalach .................. H04L 9/0819 |
| 10,380,362 | B2 | 8/2019 | Nix |
| 11,153,080 | B1 | 10/2021 | Nix |
| 2002/0166048 | A1* | 11/2002 | Coulier ............... H04L 63/1441 713/169 |
| 2009/0049299 | A1 | 2/2009 | Jablon et al. |
| 2013/0051551 | A1* | 2/2013 | El Aimani ............ H04L 9/3247 380/30 |
| 2014/0195804 | A1* | 7/2014 | Hursti .................. H04L 9/0863 713/168 |
| 2015/0271146 | A1* | 9/2015 | Holyfield .............. H04L 9/0863 713/171 |
| 2016/0013935 | A1 | 7/2016 | Pahl |
| 2017/0187524 | A1* | 6/2017 | Furukawa ............. H04L 9/0844 |
| 2019/0097793 | A1 | 12/2019 | Nix |
| 2020/0162269 | A1 | 5/2020 | Nix |
| 2020/0235929 | A1* | 7/2020 | Jacobs ................. H04L 9/3073 |
| 2020/0304305 | A1* | 9/2020 | Garcia Morchon .. H04L 9/3093 |
| 2021/0083862 | A1* | 3/2021 | Pointcheval .......... H04L 9/0844 |

OTHER PUBLICATIONS

GSM Association, "iUICC POC Group Primary Platform requirements", Release 1.0, May 17, 2017.

ETSI Technical Standard 103 465 v.15.0.0, "Smart Cards; Smart Secure Platform (SSP); Requirements Specification", May 2019.

Bos, et al, "CRYSTALS—Kyber: a CCA-secure module-lattice-based Kem", NIST PQC Round 1 Submission Package, Nov. 2017.

Jao, et al, "Supersingular Isogeny Key Encapsulation", NIST PQC Round 2 Submission Package, Apr. 17, 2019.

Krawczyk, et al, "HMAC-based Extract-and-Expand Key Derivation Function (HKDF)", Internet Engineering Task Force (IETF), RFC 5869, May 2010.

Aragon, et al, "BIKE—Bit-Flipping Key Encapsulation", NIST PQC Conference, Apr. 13, 2018.

Fischlin, et al, "Multi-Stage Key Exchange and the Case of Google's QUIC Protocol", Association for Computing Machinery Conference on Computer and Communications Security 2014, p. 1193-1204, 2014.

Krawczyk, et al, "The OPTLS Protocol and TLS 1.3", Proc. IEEE European Symposium on Security and Privacy, 2016.

Federal Institute of Industrial Property, Russia, "International Search Report—PCT/US21/60649", Feb. 17, 2022.

Federal Institute of Industrial Property, Russia, "Written Opinion of the ISA", Feb. 17, 2022.

* cited by examiner

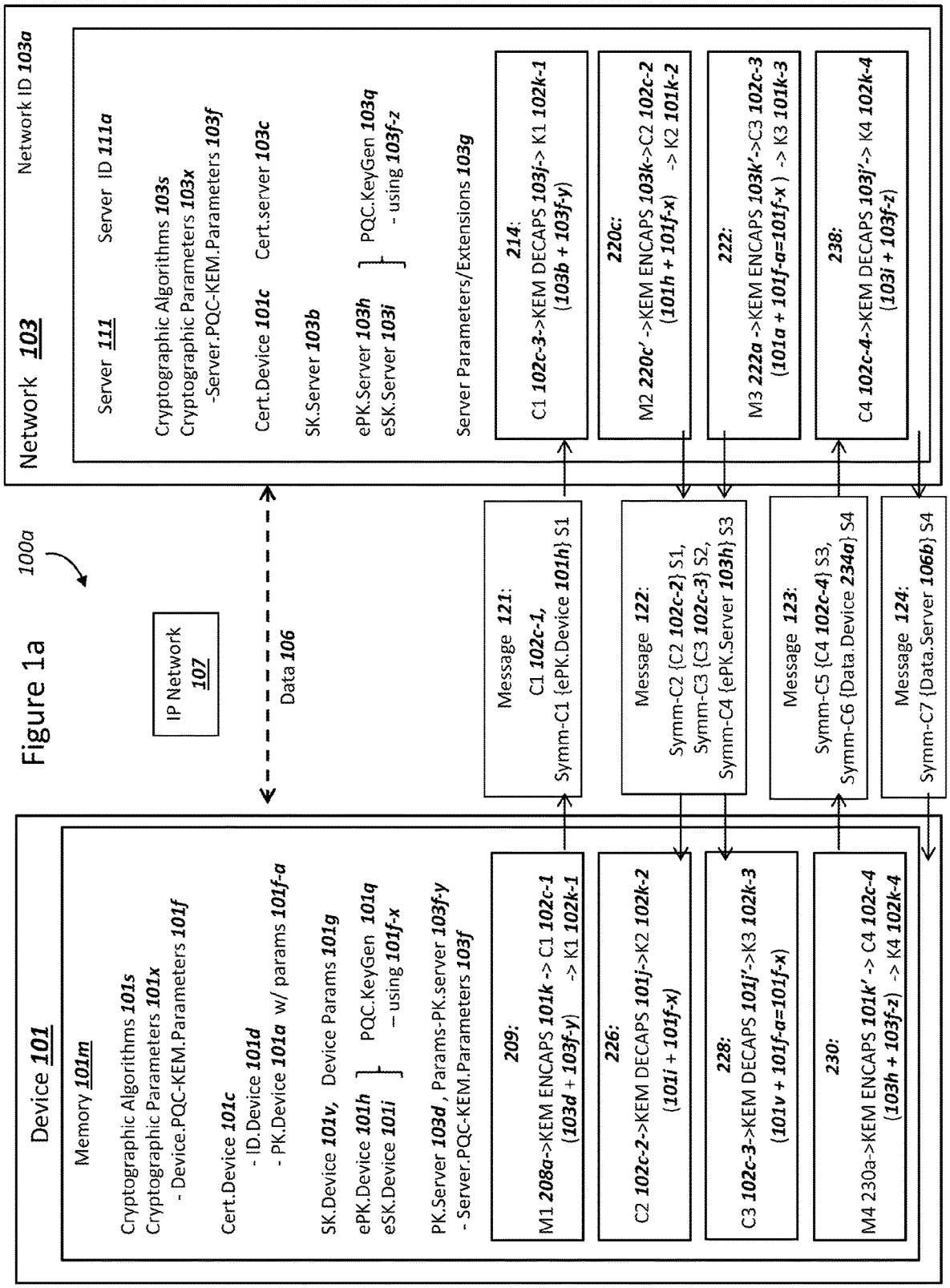

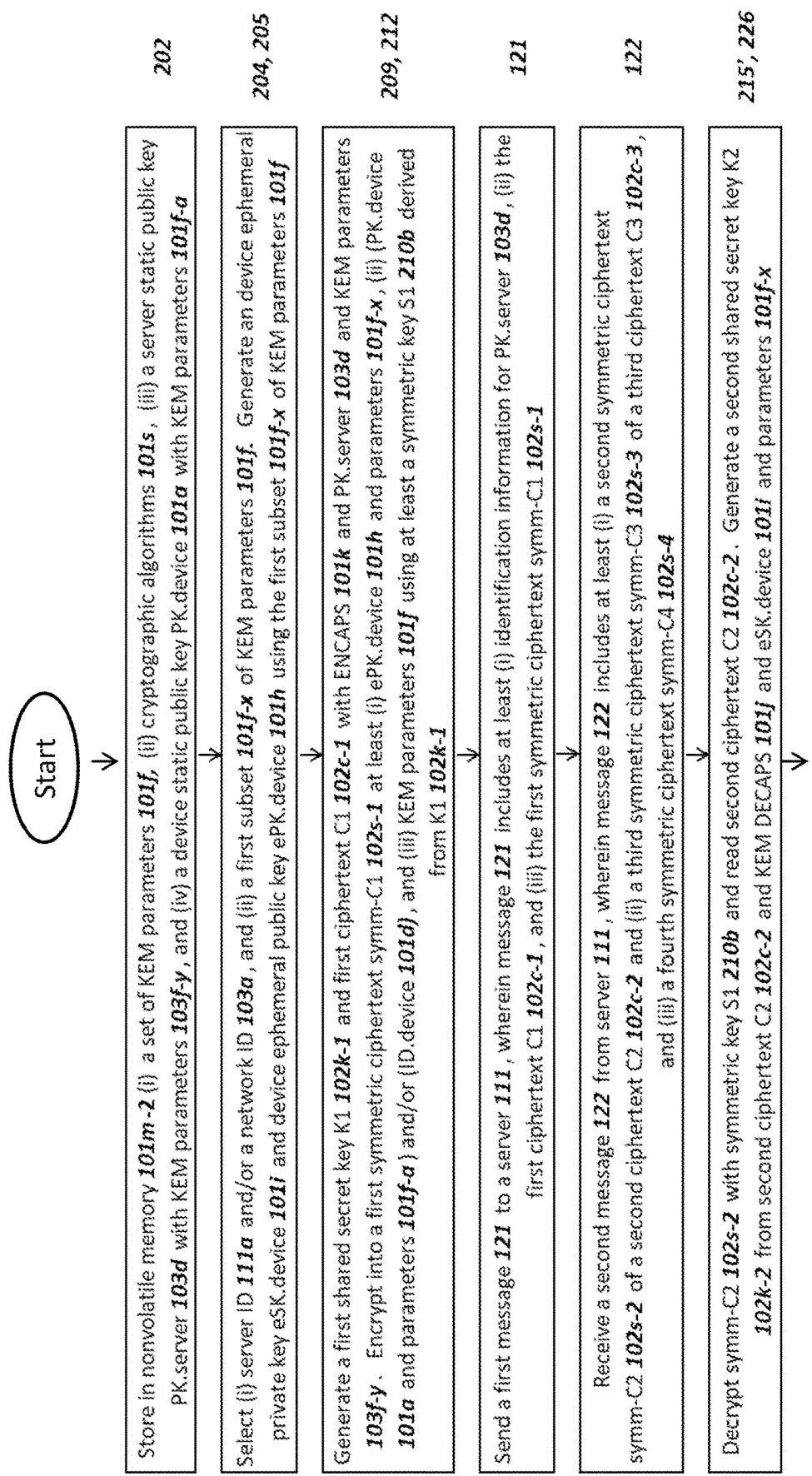

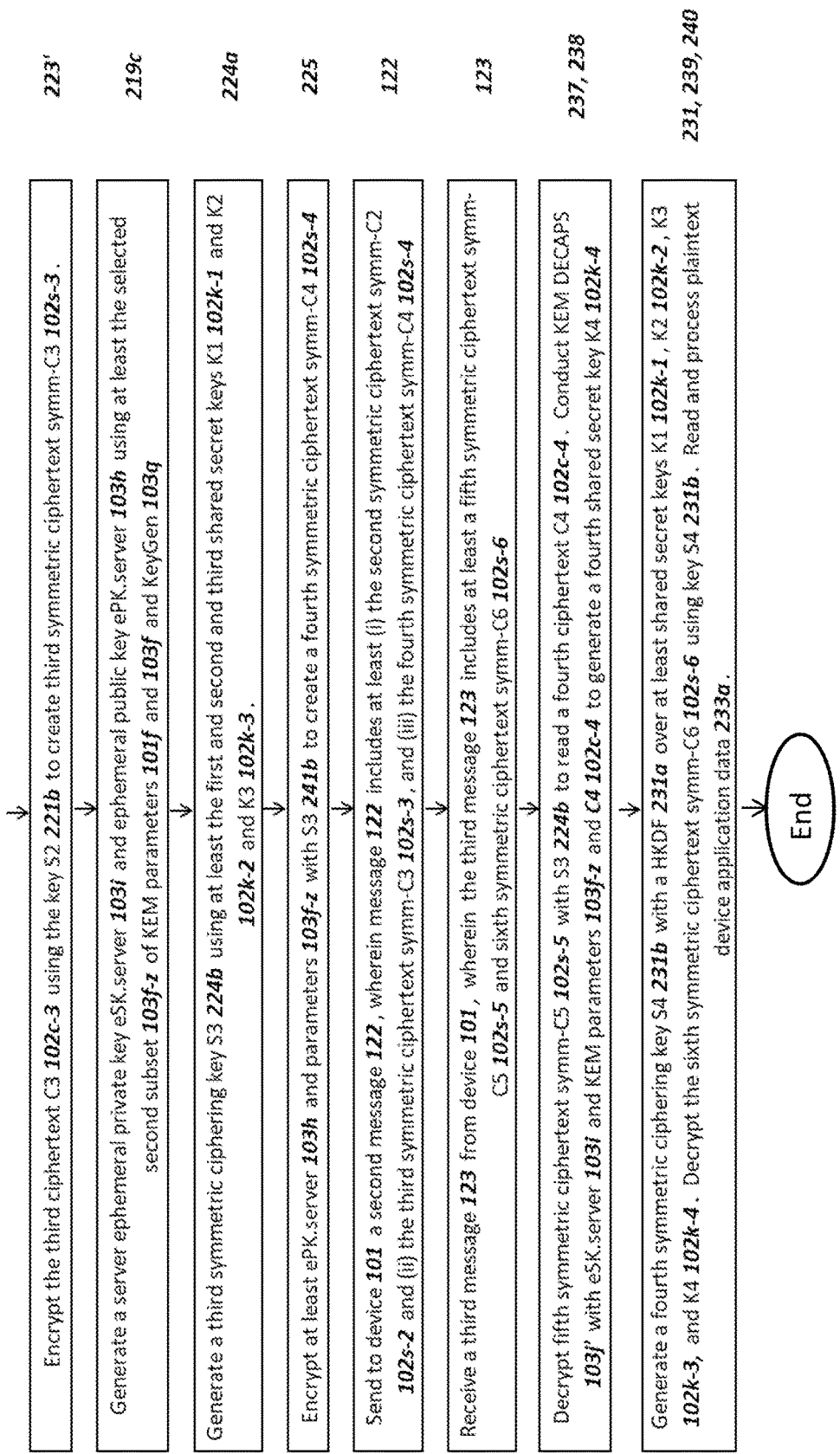

MULTIPLE POST-QUANTUM CRYPTOGRAPHY KEY ENCAPSULATIONS WITH AUTHENTICATION AND FORWARD SECRECY

RELATED APPLICATIONS

The present application is a U.S. National Stage Application of International Application No. PCT/US2021/060649, filed on Nov. 23, 2021, which claims the benefit of U.S. Provisional Patent Application No. 63/117,849, filed on Nov. 24, 2020, both of which are incorporated by reference herein in their entireties.

BACKGROUND

Technical Field

The present systems and methods relate to devices and servers conducting secure communications using post-quantum cryptography (PQC) key encapsulation mechanisms (KEM), and more particularly to using both (i) ephemeral key pairs and (ii) static key pairs in order to improve efficiency, increase flexibility, and enhance security of data sessions across insecure networks such as the public Internet.

Description of Related Art

Many protocols for secure communications through the public Internet depend on classical public key infrastructure (PKI) algorithms of Rivest-Shamir-Adleman (RSA), Diffi-Hellman (DH), or elliptic curve cryptography (ECC). ECC algorithms include elliptic curve Diffie-Hellman (ECDH) key exchanges. Example protocols as of September 2020 include current, published versions of Transport Layer Security (TLS), Secure Shell (SSH), Datagram Transport Layer Security (DTLS), the embedded SIM from the GSMA, the Device Provisioning Protocol (DPP) from the WiFi Alliance™, the Open Firmware Loader from Global Platform, and IP Security (IPSec). Many other examples exist as well. The security of the majority of communications on the public Internet today depend on at least one of RSA, DH, or ECC based algorithms.

Although the use of RSA, DH, and ECC algorithms are included in many different protocols and standards, quantum computers are expected to be able to solve both (i) the elliptic curve discrete logarithm problem (for DH and ECC algorithms) and (ii) the integer factorization problem (for RSA algorithms) in polynomial time, while classical computers solve the problem in exponential time. As of mid 2020, estimates for the number of logical qubits required to feasibly break a 256 bit ECC public key to determine the private key with a reasonable computation time are approximately 2000-4000 qubits. Estimates for the number of equivalent logical qubits required to break a 3072 bit RSA based PKI public key to determine the private key are approximately 4000-8000 qubits. The number of physical qubits required can be many times larger to support error correction, where the total number of physical qubits required depends on the quality of the physical qubits. The number of physical qubits can be reduced for qubits with longer stability and higher quality than available as of mid 2020.

Current industry projections of the number of qubits for operating quantum computers project the above number of qubits for breaking RSA, DH, and ECC PKI cryptography could be available for a computing device in approximately 5 to 10 years and likely within 15 years. As one example, in September of 2020, IBM publicly announced plans to operate quantum computers with 127 physical qubits in 2021, 433 qubits in 2022, and 1121 qubits in 2023. Continued projections for those announced plans show quantum computers with 4000 physical qubits should be available around 2024 or 2025. Alternative quantum computing architectures such as using photonics are planning for commercially available systems with 1 million physical qubits before 2030, such as the announced "Q1" system from PsiQuantum. Consequently, a need exists in the art for secure sessions to support cryptographic algorithms based on hard problems for quantum computers that are not based on either the elliptic curve discrete logarithm problem or the integer factorization problem. A need exists in the art for secure sessions to continue using PKI keys, such that a public key can be publicly shared and corresponding private keys securely stored.

The National Institute of Standards and Technology (NIST) in 2020 continues to conduct a project for Post-Quantum Cryptography (PQC) Standardization. The field of post-quantum cryptography continues to develop with proposed algorithms currently undergoing detailed evaluation for standardization as of September 2020. In general, the leading candidates for post-quantum cryptography key exchange or "key encapsulation mechanisms" (KEM) propose using lattice-based algorithms, code-based algorithms, or Supersingular Isogeny Key Encapsulation (SIKE). These proposed algorithms are described by the Wikipedia article for "Post-Quantum Cryptography" dated Aug. 31, 2020, which is hereby incorporated by reference and referred to as the Wikipedia PQC article. The above KEM algorithms propose, in summary, a first party deriving a PKI key pair, sending a public key to a second party, receiving a ciphertext processed with the public key from the second party, and processing the ciphertext with a private key in order determine a shared secret key for both the first party and the second party.

The exemplary algorithms for PQC KEM standardization generally have less long-term, detailed study and confirmation of security of the associated underlying "hard" problems, compared to integer factoring and calculating discrete logarithms. Consequently, the emergence of practical quantum computers over the coming decade (which can feasibly solve current hard problems for PKI cryptography commonly used) requires the industry to shift to cryptographic algorithms that have potential uncertainty for long-term security. In other words, it is currently not proven that lattice-based cryptography, code-based cryptography, or SIKE problems cannot be solved in polynomial time by either classical computers or quantum computers. A need exists in the art for secure sessions using PQC algorithms to provide security greater than the security provided by any single PQC algorithm (e.g. lattice-based, code-based, or SIKE), in order to reduce concerns and uncertainty about migrating from RSA, ECC, DH algorithms to PQC algorithms.

In order to address these concerns and uncertainty regarding the industry's upcoming transition away from classical cryptography to PQC, a need exists in the art for secure sessions to efficiently use a combination of at least two distinct algorithms, with one each from lattices, codes, and/or SIKE. A need exists in the art for the use of two different KEM algorithms to provide security at a level of at least the most secure of the two individual algorithms, such that if a first algorithm is determined insecure in the future, the overall session remains as secure as the level of second algorithm. A need exists in the art for a device and a server to efficiently support and negotiate KEM parameters in order to implement a secure session that uses two distinct KEM algorithms.

The most widely deployed standard for secure sessions on the public Internet today is TLS version 1.2 as specified in the Internet Engineering Task Force (IETF) 5246. As one example, the Payment Card Industry Security Standards Council recommends at least TLS v1.2 as of mid-2020. TLS version 1.2 normally requires that four handshake messages are exchanged before a device or client can send a server encrypted application data. The four handshake messages result in a single initial shared secret key and symmetric encryption derived from a single PKI algorithm (e.g. RSA, DH, or ECDH). TLS version 1.3 supports a device or client sending the server encrypted device application data after two handshake messages or "one round trip" (e.g. "Client Hello" and "Server Hello"), but again only supports a single initial shared secret key derived from a single PKI algorithm. The security for both TLS 1.2 and TLS 1.3 depends on single PKI key pairs, such that if one PKI key pair is compromised (such as the secret key is no longer secret), then the security of the session is compromised. A need exists in the art for a secure session to depend on more than one PKI key pair and algorithm, such that if a single PKI key pair or algorithm is compromised, then a data session can remain secure based on at least a second, different PKI key pair and associated algorithm used to secure the session.

Secure sessions between a device and a server should also preferably support forward secrecy. In general, forward secrecy is supported through the use of at least one ephemeral PKI key pair from either the device or the server. In this manner, shared secret keys and resulting symmetric ciphering keys are generally not compromised from the release or compromise of a static private key used during the establishment of a secure session. As one example, TLS v 1.3 provides forward secrecy through the use of two ephemeral ECDH PKI key pairs (one for the client and one for the server). However, the two ephemeral ECDH PKI key pairs are used for a single ECDH key exchange which results in both (i) a single initial shared secret key and (ii) security that depends on a single algorithm (e.g. ECC). A need exists in the art for a client/device and a server/host to both (i) obtain forward secrecy through the use of ephemeral PKI keys, and (ii) obtain security for the session from two distinct PQC algorithms (e.g. two different algorithms from lattice-based algorithms, code-based algorithms, and/or SIKE).

Likewise, conventional technology for secure sessions in TLS v1.2, TLS v.1.3, Secure Shell (SSH), IPSec, etc. (when using PKI algorithms) conduct a key exchange that results in a single initial shared secret key, such as a single "handshake secret" or "pre-master secret", where all subsequent shared secret keys are derived from the single "handshake secret" or "pre-master secret". As one example with ephemeral ECDH with TLS v1.3, a single ECDH is conducted using the client/device ephemeral PKI key pair and the server/host ephemeral PKI key pair in order to derive a handshake secret. The security of the handshake secret depends on the security of the single ECDH algorithm, which is likely compromised by practical quantum computers with sufficient qubits within less than a decade. A need exists in the art for secure sessions to (i) derive at least two independent shared secrets equivalent to a conventional "handshake secret" from two different PQC KEM algorithms, and (ii) securely use the two independent shared secrets to derive a symmetric ciphering key for use by both a device and a network.

Even through the use of ephemeral PKI key pairs and attempted forward secrecy, ephemeral ECC public keys are at a significant risk of being "broken" over the coming decade by quantum computers, such that a private key could be determined based on the public key. Breaking a single ephemeral public key in an ECDH key exchange breaks the security and forward secrecy for the session. Billions of new devices are being deployed over the next several years which connect to the Internet. Many of these devices for the "Internet of Things" such as smart meters for utility grids, or navigation systems within cars, or industrial equipment, may remain operational for more than a decade. Consequently a need exists in the art for security and encryption protocols to remain secure for more than the coming decade, when quantum computing may feasibly break traditional or classical PKI algorithms, PKI keys, and associated key exchanges using conventional and currently widely deployed technology. A need exists in the art for new devices to use (i) PQC KEM algorithms in a manner that resists quantum computers with rapidly growing quantum processing power, instead of (ii) classical PKI algorithms based on RSA, DH, and ECC.

With conventional technology, KEM algorithms with openly shared public keys can be subject to "Man in the Middle" (MITM) attackers that can try to substitute public keys such as an unauthenticated device ephemeral public key, and/or a server ephemeral public key with an ephemeral public key for the attacker. Establishing a secure session with KEM algorithms that are resistant to MITM attackers increase complexity as well as potentially requiring additional message and data shared within the handshake messages. A need exists in the art for both a device and a server to efficiently use PQC KEM algorithms with the minimum number of handshake messages and reduced additional data in order to establish secure communications resistant to a MITM attacker.

Many other examples exist as well for needs in the art for devices and servers or networks to securely support PQC KEM algorithms resistant to quantum computers. The above examples are just a few and intended to be illustrative instead of limiting.

SUMMARY

Methods and systems are provided for a device and a server to establish secure communications based on post-quantum cryptography (PQC) key encapsulation mechanisms (KEM). The methods and systems provided herein can address exemplary needs in the art described above and other benefits are available as well, including increasing the security from using multiple KEM for establishing a secure session or secured communications. In exemplary embodiments, a device or client can support a first set of PQC KEM algorithms and a server can support a second set of PQC KEM algorithms. The first and second sets of PQC KEM algorithms can support at least a first mutually shared PQC KEM algorithm and a second mutually shared PQC KEM algorithm and a third mutually shared PQC KEM algorithm and a fourth mutually shared PQC KEM algorithm.

Before connecting with a server, a device can store a server static public key PK.server for the first mutually shared PQC KEM algorithm, and the server can store the corresponding server static private key SK.server. The device can derive a device ephemeral public key ePK.device and device ephemeral private key eSK.device for the second mutually shared PQC KEM algorithm. Before connecting with a server, a device can store a device static public key PK.device for the third mutually shared PQC KEM algorithm, and the device can store the corresponding device static private key SK.device. The server can derive a server ephemeral public key and server ephemeral private key for the fourth mutually shared PQC KEM algorithm.

An exemplary system can include a computing device and a server. The server can be operated and controlled by a network. The server can include server computing hardware, where computer hardware can comprise electrical components for processing, storing, sending or transmitting, and receiving data, including communication with other nodes via data networks. For some exemplary embodiments, a server can comprise a virtual machine operating on a host server, where the host server includes server computing hardware. Server computing hardware can include at least one processor in order to store and record data as well as communicate with other nodes over an IP network, such as with a computing device operating at a remote location from the server.

The computing device could comprise a smartphone, a laptop computer, a second server, a smart camera, an intelligent sensor for the "internet of things", a tracking device, health monitoring equipment in a hospital, a desktop computer, and other possibilities exist as well. The computing device operates a client program or executable instructions by a processor in the device for communicating with the server. Both the device and the server can store cryptographic algorithms for processing both (i) the second mutually shared PQC KEM algorithm selected by the device and (ii) the third mutually shared PQC KEM algorithm selected by the server. The first mutually shared PQC KEM algorithm can be specified for the server static public key PK.server stored by the device. Both the device and the server can store (i) a first set of parameters associated with the second mutually shared PQC KEM algorithm selected by the device and (ii) the third mutually shared PQC KEM algorithm selected by the server.

The device can conduct a first KEM ENCAPS for the device using the server static public key PK.server in order to generate a first asymmetric ciphertext and a first shared secret key K1. The device can generate a first symmetric ciphering key S1 using at least the first shared secret key K1 and a first HKDF. The device can select a first plaintext comprising (i) the device ephemeral public key, (ii) an identifier or code specifying the second mutually shared PQC KEM algorithm for the device ephemeral public key ePK.device, (iii) the first set of PQC KEM algorithms supported by the device, and (iv) the device static public key PK.device and an identifier or code specifying the third mutually shared PQC KEM algorithm for the device static public key PK.device The device can use the first symmetric ciphering key S1 to encrypt the first plaintext into a first symmetric ciphertext symm-C1. The device can send the server a first message, which could comprise a "Client Hello" message. The first message can include both the first asymmetric ciphertext C1 and the first symmetric ciphertext symm-C1. The first message can include an identity for the server static public key PK.server, as well as plaintext metadata for processing the first symmetric ciphertext symm-C1.

The server can receive the first message and select a server static private key SK.server using the identity for the server static public key PK.server in the first message. The server can conduct a first KEM DECAPS for the server using the server static private key SK.server in order to generate the first shared secret key K1. The server can generate the first symmetric ciphering key S1 using at least the first shared secret key K1. The server can decrypt the first symmetric ciphertext symm-C1 using the first symmetric ciphering key S1. The server can read the first plaintext that includes (i) the device ephemeral public key PK.device, (ii) an identifier or code specifying the first mutually shared PQC KEM algorithm for the device ephemeral public key, and (iii) the first set of PQC KEM algorithms supported by the device, and (iv) the device static public key PK.device and an identifier or code specifying the third mutually shared PQC KEM algorithm for the device static public key PK.device.

The server can conduct a second KEM using a first KEM encapsulation function (KEM ENCAPS) for the server with (i) the received device ephemeral public key ePK.device from the first message and (ii) the second mutually shared PQC KEM algorithm selected by the device. The output of the KEM ENCAPS can be both (i) a second asymmetric ciphertext C2 and (ii) a second shared secret key K2.

In exemplary embodiments, the server can generate a second symmetric ciphertext symm-C2 with input of the second asymmetric ciphertext C2 and the first symmetric ciphering key S1. In other words, the second symmetric ciphertext symm-C2 can comprise the second asymmetric ciphertext C2 that is "double encrypted". A benefit for "double encryption" of the second asymmetric ciphertext C2 using the first symmetric ciphering key S1 is that an attacker who can obtain the device ephemeral public key ePK.device from the first message could attempt to substitute a fake or fraudulent second asymmetric ciphertext using ePK.device. However, the attacker could not create the second symmetric ciphertext that "double encrypts" the second asymmetric ciphertext C2 without mutually deriving at least the first symmetric ciphering key S1, thereby addressing needs in the art to increase security of using PQC KEM and make communications more resistant to "man in the middle" attacks.

The server can use a second HKDF with at least the second shared secret key K2 to derive at least a second symmetric ciphering key S2. For preferred exemplary embodiments, the server can use at least both (i) the first shared secret key K1 output from the first KEM DECAPS function for the server and also (ii) the second shared secret key K2 output from the first KEM ENCAPS function for the server in order to derive at least the second symmetric ciphering key S2. In this manner, the second symmetric ciphering key S2 can provide a security level of at least the stronger of the first KEM (e.g. used the KEM DECAPS) and the second KEM (e.g. used with the KEM ENCAPS). Thus, if one KEM is later found compromised or broken in the future, the second symmetric ciphering key S2 can remain secured by the other KEM. This feature provides benefits over conventional technology and addresses needs in the art identified above, where a current PQC algorithm proposed for standardization could have currently unidentified weaknesses identified in the future. In other words, the input of both the first shared secret key K1 and the second shared secret key K2 into the second HKDF to derive the second symmetric ciphering key S2 can provide an overall higher level of security, and other benefits can be achieved as well.

The server can conduct a third KEM using a second KEM encapsulation function (KEM ENCAPS') for the server with (i) the received device static public key PK.device from the decrypted first symmetric ciphertext symm-C1 (ii) the third mutually shared PQC KEM algorithm specified by parameters for the device static public key PK.device. The output of the KEM ENCAPS' for the server can be both (i) a third asymmetric ciphertext C3 and (ii) a third shared secret key K3.

The server can use a third HKDF with at least the third shared secret key K3 to derive at least a third symmetric ciphering key S3. For preferred exemplary embodiments, the server can use at least all of (i) the first shared secret key K1 output from the first KEM DECAPS function for the server and also (ii) the second shared secret key K2 output from the first KEM ENCAPS function for the server and also (iii) the third shared secret key K3 output from the second KEM ENCAPS' function for the server in order to derive at least the third symmetric ciphering key S3. In this manner, the third symmetric ciphering key S3 can provide a security level of at least the stronger of the first KEM (e.g. used the KEM DECAPS) and the second KEM (e.g. used with the KEM ENCAPS) and the third KEM (e.g. used with the KEM ENCAPS'). Thus, if one or two KEM algorithms are later found compromised or broken in the future, the symmetric ciphering key S3 can remain secured by at least one of the three KEM algorithms that remain unbroken or uncompromised.

In exemplary embodiments, the server can generate a third symmetric ciphertext symm-C3 with input of the third asymmetric ciphertext C3 and the second symmetric ciphering key S2. In other words, the third symmetric ciphertext symm-C3 can comprise the third asymmetric ciphertext C3 that is "double encrypted". The benefits for the use of "double encryption" discussed above for the second asymmetric ciphertext C2 within the second symmetric ciphertext symm-C2 also apply to "double encrypting" the third asymmetric ciphertext C3 within the third symmetric ciphertext symm-C3. Note that the second symmetric ciphering key S2 should be use to encrypt the third asymmetric ciphertext C3 because the second symmetric ciphering key S2 can be derived from the second HKDF, which does not require input or use of the third asymmetric ciphertext C3.

The server can select the fourth mutually shared PQC KEM algorithm from overlap between (i) the first set of PQC KEM algorithms supported by the device and (ii) the second set of PQC KEM algorithms supported by the server. In exemplary embodiments the second and third mutually shared PQC KEM algorithm selected by the device for ePK.device and PK.device, respectively, can support a type comprising one of lattice-based cryptography, code-based cryptography, and SIKE. In exemplary embodiments the fourth mutually shared PQC KEM algorithm selected by the server can support a type both (i) comprising one of lattice-based cryptography, code-based cryptography, and SIKE, and (ii) different than the type (or types) selected by the device for use with ePK.device and PK.device. In this manner, at least two different types of PQC KEM algorithms can be mutually supported and subsequently used by both the device and the server. Security of communications between the device and server can be increased through the use of at least two different PQC algorithms.

The server can derive a server ephemeral private key eSK.server and a corresponding server ephemeral public key ePK.server using the fourth mutually shared PQC KEM algorithm selected by the server. The server can use a symmetric ciphering algorithm and the third symmetric ciphering key S3 to encrypt into a fourth symmetric ciphertext symm-C4 at least (i) the derived server ephemeral public key ePK.server, and (ii) an identity or code for the fourth mutually shared PQC KEM algorithm selected by the server and used with the ePK.server.

The server can generate a response second message that includes at least (i) metadata for the symmetric ciphering algorithms (e.g. at least an identity or parameters for the symmetric ciphering algorithm and/or initialization vectors), (ii) the second symmetric ciphertext symm-C2, and (iii) the third symmetric ciphertext symm-C3, and the fourth symmetric ciphertext symm-C4. The server can send the response second message to the device, and the response second message can comprise a "Server Hello" message.

The device can receive the response second message and conduct a series of steps in order to process the message. The device can use the first symmetric ciphering key S1 to decrypt the received second symmetric ciphertext symm-C2 in order to read the second asymmetric ciphertext C2. The device can conduct a KEM using a first KEM decapsulation function (KEM DECAPS) for the device with the received second asymmetric ciphertext C2 and the device ephemeral private key eSK.device in order to mutually derive or generate the second shared secret key K2. The device can use the second HKDF with at least the first shared secret key K1 and the second shared secret key K2 to mutually derive at least the second symmetric ciphering key S2.

The device can use (i) the metadata, (ii) the symmetric ciphering algorithm, and (iii) the mutually derived second symmetric ciphering key S2 to decrypt the third symmetric ciphertext symm-C3 into a plaintext comprising the third asymmetric ciphertext C3. The device can conduct a KEM using a second KEM decapsulation function (KEM DECAPS') for the device with the received third asymmetric ciphertext C2 and the device static private key SK.device in order to mutually derive or generate the third shared secret key K3. The device can use the third HKDF with at least the first shared secret key K1 and the second shared secret key K2 and the third shared secret key K3 to mutually derive at least the third symmetric ciphering key S3.

The device can use (i) the metadata, (ii) the symmetric ciphering algorithm, and (iii) the mutually derived third symmetric ciphering key S3 to decrypt the fourth symmetric ciphertext symm-C4 into a plaintext comprising (i) the derived server ephemeral public key ePK.server, and (ii) an identity or code for the fourth mutually shared PQC KEM algorithm selected by the server and used with the ePK.server.

The device can conduct a fourth KEM using a second KEM encapsulation function (KEM ENCAPS') for the device with (i) the received server ephemeral public key ePK.server from the plaintext in the paragraph above (e.g. transmitted within the fourth symmetric ciphertext symm-C4) and (ii) the fourth mutually shared PQC KEM algorithm selected by the server for ePK.server. The output of the KEM ENCAPS' can be both (i) a fourth asymmetric ciphertext C4 and (ii) a fourth shared secret key K4. The device can use at least the first, second, third, and fourth shared secret keys K1, K2, K3, and K4 and a fourth HKDF in order to mutually derive the fourth symmetric ciphering key S4.

In some exemplary embodiments, the fourth asymmetric ciphertext C4 can be "double encrypted" into a fifth symmetric ciphertext symm-C5 by the device using the third symmetric ciphering key S3 and the symmetric ciphering algorithm. In other words, the fourth asymmetric ciphertext C4 can be data that is asymmetrically encrypted using the fourth mutually shared PQC KEM algorithm. The encrypted fifth symmetric ciphertext symm-C5 can comprise data that is both (i) asymmetrically encrypted using the KEM ENCAPS' with ePK.server and then also (ii) symmetrically encrypted using the third symmetric ciphering key.

As contemplated herein, a symmetric ciphering algorithm can use both a symmetric ciphering key and a corresponding message authentication code (MAC) key. The symmetric ciphering algorithm can include the generation of MAC values or tags using a mode specified in parameters for the symmetric ciphering algorithm. As one example, a symmetric ciphering algorithm could use the Poly1305 algorithm for the generation of MAC or tag values with a MAC key. An example for standards describing the use of Poly1305 include IETF RFC 7539, which is hereby incorporated by reference. Other algorithms for generating a MAC or tag value for symmetric ciphering algorithms are possible as well without departing from the scope of the present disclosure, such as AES with modes such as Electronic Code Book mode (ECB) or Galois/Counter Mode (GCM).

Each of the first, second, third, and fourth HKDF used by the device and server can generate both symmetric ciphering keys and MAC keys. In other exemplary embodiments, the fifth ciphertext C3 can be "MACed" with a MAC key generated by the third HKDF, and a symmetric encryption of the fourth ciphertext C3 with the third symmetric ciphering key S3 could be omitted. Device can specify second metadata for a third message below that indicates if (i) the device sends the server the fourth asymmetric ciphertext C4 as a "double encrypted" fifth symmetric ciphertext symm-C5, or (ii) the device sends the server the fourth ciphertext C3 and "MACed" data with MAC codes generated with a mutually derived third MAC key. Other possibilities exist as well for a device and a server to specify the use and communication of a "double encrypted" fifth symmetric ciphertext symm-C5.

The device can select plaintext data for encryption to include in a third message, which could comprise data for a "Client Finished" message. The plaintext could include (i) final handshake data and also potentially (ii) application data from the device to the server. The application data could be sensor data, device configuration data, a registration message, and other possibilities exist as well. The device can use (i) the metadata from the response second message, (ii) the symmetric ciphering algorithm, and (iii) the derived fourth symmetric ciphering key S4 to encrypt the plaintext described in this paragraph into a sixth symmetric ciphertext symm-C6. The device can send the server the third message, where the third message can include at least the fifth symmetric ciphertext symm-C5 (possibly as a "double encrypted" fourth asymmetric ciphertext C4) and the sixth symmetric ciphertext symm-C5.

The server can receive the third message and conduct a series of steps to process the third message. In preferred exemplary embodiments where the third message includes the "double encrypted" fourth asymmetric ciphertext C4, the server can use the symmetric ciphering algorithm and the third symmetric ciphering key S3 to decrypt the "double encrypted" fourth asymmetric ciphertext C4 from the fifth symmetric ciphertext symm-C5 into a plaintext fourth asymmetric ciphertext C4. After removal of the symmetric encryption, the server can read the fourth asymmetric ciphertext C4 which comprises data that has been asymmetrically encrypted.

The server can conduct a fourth KEM using a second KEM decapsulation function (KEM DECAPS') with (i) the fourth asymmetric ciphertext C4, and (ii) the fourth mutually shared PQC KEM algorithm selected by the server and (iii) the server ephemeral private key eSK.server. The output of the KEM DECAPS' can be the fourth shared secret key K4. The server can use the fourth HKDF with at least the fourth shared secret key K4 to mutually derive at least the fourth symmetric ciphering key S4. For preferred exemplary embodiments, the server can use at least both (i) the first shared secret key K1 output from the first server KEM DECAPS function and also (ii) the second shared secret key K2 output from the first server KEM ENCAPS function and also (iii) the third shared secret key K3 output from the second server KEM ENCAPS' function and also (iv) the third shared secret key K4 output from the second server KEM DECAPS' function in order to derive at least the fourth symmetric ciphering key S4. The security benefits for including both the first and second and third and fourth shared secret keys K1 and K2 and K3 and K4 in the generation of the fourth symmetric ciphering key S4 are described above for the server's generation of the second symmetric ciphering key.

The server can use (i) the symmetric ciphering algorithm, and (ii) the mutually derived fourth symmetric ciphering key S4 to decrypt the sixth symmetric ciphertext symm-C6 from the third message from the device into plaintext. The server can confirm the final device handshake message from the plaintext. The server can subsequently process device application data and derive additional symmetric ciphering keys using at least the first and second and third and fourth shared secret keys K1 and K2 and K3 and K4.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1a is a graphical illustration of an exemplary system, where a device and a network process and communicate data in order to establish secure communications, in accordance with exemplary embodiments;

FIG. 9a is a flow chart illustrating exemplary steps for a device to conduct multiple different KEM algorithms in order to efficiently secure communications with a server, in accordance with exemplary embodiments;

FIG. 10b is a flow chart illustrating exemplary steps for a server to conduct multiple different KEM algorithms in order to efficiently secure communications with a device, in accordance with exemplary embodiments.

DETAILED DESCRIPTION OF EXEMPLARY EMBODIMENTS OF THE INVENTION

FIG. 1a

Figure 1B:
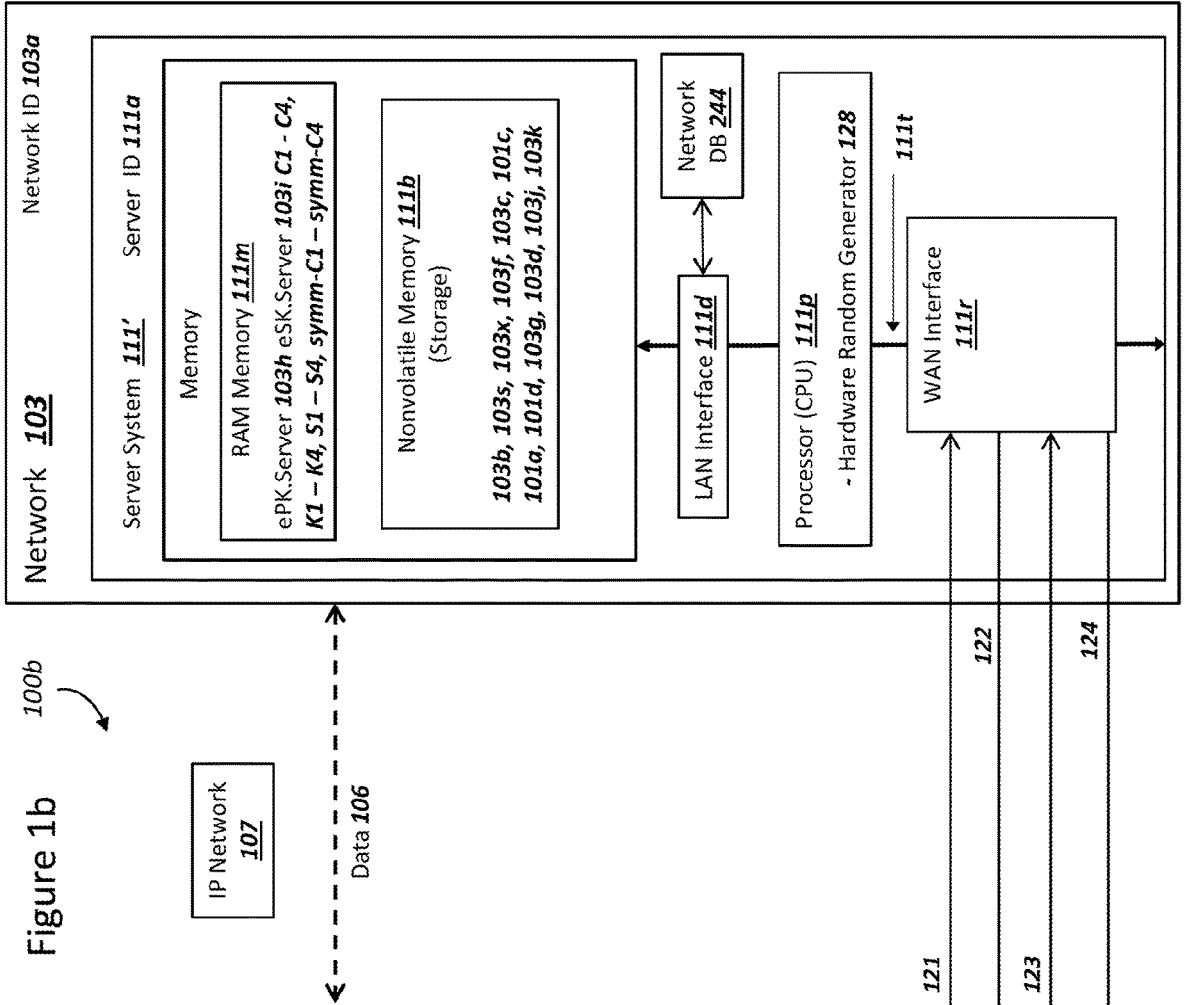
FIG. 1b is a graphic illustration of exemplary electrical components with a device and a server, in accordance with exemplary embodiments.

FIG. 1a is a graphical illustration of an exemplary system, where a device and a network process and communicate data in order to establish a secure communications, in accordance with exemplary embodiments. The system 100a can include a device 101, an Internet Protocol (IP) network 107, and a network 103. The depicted nodes or entities can communicate data 106 over the IP network 107. Although a single device 101 and a single network 103 are depicted in FIG. 1, a system 100a can comprise a plurality of each of the depicted nodes or entities. A system 100a as depicted in FIG. 1a can support secure sessions between the device 101 and the network 103 such as, but not limited to, using a protocol for Transport Layer Security (TLS), Datagram Transport Layer Security (DLTS), a virtual private network (VPN), IP Security (IPSec), Secure Shell (SSH). Other possibilities exist as well for secure protocols supported between device 101 and network 103, without departing from the scope of the present disclosure.

Device 101 and network 103 can utilize a variety of wireless wide area network (WAN) and wireless local area network (LAN) wireless and technologies to communicate data 106 between the nodes, including Low Power Wide Area (LPWA) technology, 3rd Generation Partnership Project (3GPP) technology such as, but not limited to, 3G, 4G Long-Term Evolution (LTE), or 4G LTE Advanced, NarrowBand-Internet of Things (NB-IoT), LTE Cat M, and 5G or subsequent wireless technologies. In addition, the wireless technology used by device 101 and network 103 could support or implement wireless LAN technologies such as WiFi and the related series of standards from IEEE 802.11 standards, such as 802.11ac, 802.11 ax, etc. Other examples exist as well for wireless WAN technology and/or wireless LAN technology used by device 101 and network 103 without departing from the scope of the present disclosure.

Network 103 can also connect to the IP network 107 and send/receive data 106 other via a wired connection such as, but not limited to, an Ethernet connection, or a fiber optic connection. In other words, for some exemplary embodiments, network 103 can connect to IP network 107 using a wired connection, and device 101 can connect to IP network 107 using a wireless connection. IP network 107 could also be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 107 could utilize globally routable IP addresses. A private IP network overlayed on IP network 107 could utilize private IP addresses which could also be referred to as an Intranet. Other possibilities for device 101 and network 103 to communicate data through an IP network 107 exist as well without departing from the scope of the disclosure. For some embodiments, IP network 107 could comprise a private IP network that does not support globally routable or publicly accessible IP addresses.

Device 101 can be a computing device for sending and receiving data using a radio, such as a radio 101r depicted and described in connection with FIG. 1b below. Device 101 can take several different embodiments, such as a general purpose personal computer, a laptop computer, a mobile phone or mobile handset based on the Android® or Fuchsia from Google® or the IOS operating system from Apple®, a tablet, a device with a sensor or actuator for the "Internet of Things", a module for "machine to machine" communications, a device that connects to a wireless Wide Area Network (WAN) operated by a mobile network operator, a router, and/or a server, and other possibilities exist as well for the embodiments of a device 101 without departing from the scope of the present disclosure. Device 101 can connect to IP network 107 with a wired connection such as Ethernet or fiber-optic lines, for embodiments where device 101 comprises a server, router, personal computer, etc. Additional details for the electrical components within device 101 are also depicted and described in connection with FIG. 1b below.

Memory 101m can comprise combinations of (i) volatile random access memory and (ii) nonvolatile memory. The volatile memory can include random access memory (RAM) for relatively fast read and write operations, such as SRAM or DRAM compared, to nonvolatile memory. RAM for memory 101m could also include persistent RAM or non-volatile RAM (NVRAM), such that data in a persistent RAM memory or nonvolatile RAM is stored when power is removed. Nonvolatile memory can include storage memory such as a flash memory and record or store data when power is removed from device 101. In general, different forms and electrical components for memory 101m can be used without departing from the scope of the present disclosure.

Memory 101m within device 101 can store device cryptographic algorithms 101s, device cryptographic parameters 101x, a device ephemeral public key infrastructure (PKI) key pair comprising an device ephemeral private key 101i and a corresponding device ephemeral public key 101h, an optional device certificate cert.device 101c, a set of supported device PQC KEM parameters device.PQC-KEM.parameters 101*f*, a key exchange mechanism (KEM) decapsulation function 101*j*, and a KEM encapsulation function 101*k*.

Associated with the device certificate cert.device 101*c* can be a device identity of ID.device 101*d* and a device static private key for SK.device 101*v*. The cert.device 101*c* can include a static public key for from device 101 of PK.device 101*a* and the corresponding static private key of SK.device 101*v*. PK.device 101*a* and the device certificate cert.device 101*c* can be shared with other nodes on IP network 107, such that (i) the other nodes can verify and authenticate the device certificate cert.device 101*c* and (ii) the other nodes can conduct a PQC KEM with the PK.device 101*a*, and (iii) the device 101 can conduct the PQC KEM with the static private key of SK.device 101*v*. Note that device certificate of cert.device 101*c* can include a device identity of ID.device 101*d*, such that the device identity ID.device 101*d* can be securely associated with a device static public key PK.device 101*d* for conducting KEM in an authenticated manner. In other words, only device 101 could successfully conduct a PQC KEM using the static private key SK.device 101*v* corresponding to the static public key PK.device 101*a* in the device certificate cert.device 101*c*). As one example, the device identity of ID.device 101*d* can be in the common name (CN) field of cert.device 101*c*. For some embodiments, the use of a device certificate cert.device 101*c* could be omitted, and the device static public key PK.device 101*a* could be shared with a network 103 and/or server 111 before the device 101 communicates with the network 103 and/or server 111.

As depicted in FIG. 1*a*, the device static public key PK.device 101*a* can support a set of cryptographic parameters 101*f*-*a*, which can comprise a subset of Device.PQC-KEM.Parameters 101*f* to specify a certain KEM algorithm and values for conducting the KEM algorithm with PK.device 101*a* and SK.device 101*v*. As described in this FIG. 1*a* below, Device.PQC-KEM.Parameters 101*f* can be cryptographic parameters pertaining to and specifying an algorithm for conducting a KEM, which are also depicted and described in connection with FIG. 8 below. In exemplary embodiments, the cryptographic parameters for device 101 to specify and use a specific KEM algorithm within device cryptographic algorithms 101*s* can be specified by Device.PQC-KEM.Parameters 101*f*.

A first KEM performed by device 101 of KEM ENCAPS 101*k* can use parameters 103*f*-*y*, which can be a subset of Device.PQC-KEM.Parameters 101*f*, where use of parameters 103*f*-*y* by device 101 for a first KEM ENCAPS 101*k* is depicted in FIG. 1*a* and also described below. A second KEM performed by device 101 of KEM DECAPS 101*j* can use parameters 101*f*-*x*, which can be a different subset of Device.PQC-KEM.Parameters 101*f*, where use of parameters 103*f*-*x* is by device 101 for a second KEM DECAPS 101*j* is depicted in FIG. 1*a* and also described below. A third KEM performed by device 101 of KEM DECAPS 101*j'* can use parameters 101*f*-*a*, which can be a different subset of Device.PQC-KEM.Parameters 101*f*, where use of parameters 103*f*-*a* is by device 101 for a third KEM DECAPS 101*j'* is depicted in FIG. 1*a* and also described below. For some embodiments, the third KEM DECAPS 101*j'* can use parameters 101*f*-*a* that are equal or the same as parameters 110*f*-*x* used in the second KEM DECAPS 101*j'*. A fourth KEM performed by device 101 of KEM ENCAPS 101*k'* can use parameters 110*f*-*z*, which can be a different subset of Device.PQC-KEM.Parameters 101*f*, where use of parameters 103*f*-*z* is by device 101 for a fourth KEM DECAPS 101*k'* is depicted in FIG. 1*a* and also described below.

In some exemplary embodiments, cryptographic parameters 101*f*-*a* associated with PK.device 101*a* and SK.device 101*v* can be the same as cryptographic parameter 110*f*-*x* associated with the device ephemeral public key ePK.device 101*h*. In other exemplary embodiments, cryptographic parameters 101*f*-*a* could be a different set of parameters within Device.PQC-KEM.Parameters 101*f* than cryptographic parameter 110*f*-*x* associated with the device ephemeral public key ePK.device 101*h*, such as specifying a different PQC KEM algorithm for use with device static public key PK.device 101*a* than with the device ephemeral public key ePK.device 101*h*.

Note that device 101 could store a plurality of different PK.device 101*a* (possibly stored with different device certificates cert.device 101*c*), each with different cryptographic parameters 101*f*-*a*, and select a preferred PK.device 101*a* and cryptographic parameters 101*f*-*a* to use based on criteria described below for selecting parameters 101*f*-*x* for the device ephemeral public key ePK.device 101*h*. For these embodiments, cryptographic parameters 101*f*-*a* associated with PK.device 101*a* and SK.device 101*v* can be the same as cryptographic parameter 101*f*-*x* associated with the device ephemeral public key ePK.device 101*h*. In exemplary embodiments, a specific set of (i) parameters 101*f*-*a* and PK.device 101*a* and (ii) parameters 101*f*-*x* and ePK.device 101*x* can be selected in a step 121 as depicted and described in connection with FIG. 2 below.

Device 101 can store a network static public key of PK.server 103*d* along with the associated PQC KEM parameters for the network static public key of params-PK.server 103*f*-*y*. Note that the network static public key PK.server 103*d* can also be referred to herein as a server static public key. Both the key PK.server 103*d* and the associated parameters of params-PK.server 103*f*-*y* can be stored in nonvolatile memory of device 101 during device configuration or before device 101 sends a first message to server 111 in network 103. The network static public key of params-PK.server 103*f*-*y* can be equivalent to the parameters 101*f*-*x* for a device ephemeral public key of ePK.device 101*h* described below. Or, device 101 could securely receive PK.server 103*d* and associated parameters of params-PK.server 103*f*-*y* via a secure and/or authenticated session before device 101 sends the message 121 to network 103 and server 111 in FIG. 1*a*.

Device 101 can store the network static public of PK.server 103*d*, along with the associated PQC KEM parameters for the network static public key of params-PK.server 103*f*-*y*, in a number of different manners without departing from the scope of the present disclosure. PK.server 103*d* and params-PK.server 103*f*-*y* could be recorded in nonvolatile memory 101*m*-2 (as depicted in FIG. 1*b* below) during device 101 manufacturing, distribution, or configuration before device 101 initiates communication with network 103. A technician or user could load the PK.server 103*d* and params-PK.server 103*f*-*y* using a web-based interface for device 101, and other possibilities exist as well including the use of the Device Provisioning Protocol to transfer the PK.server 103*d* and params-PK.server 103*f*-*y* in configuration data to device 101 for another mobile device operated by the technician or user.

In some exemplary embodiments, the technician or user could acquire the PK.server 103*d* and params-PK.server 103*f*-*y* in a secure manner, such as through a secure session established with network 103 via the mobile device such as a smartphone operated by the user or technician. Or, a manufacturer or distributor could load the PK.server 103*d* and params-PK.server 103*f*-*y* and device data including device cryptographic algorithms 101*s* and device cryptographic parameters 101*x* and cert.device 101*c* during a configuration step of device 101. In addition, a manufacturer or distributor could (i) load device data including device cryptographic algorithms 101*s* and device cryptographic parameters 101*x* and cert.device 101*c* during a configuration step of device 101, and then (ii) device 101 could acquire the PK.server 103*d* and params-PK.server 103*f-y* during a secure session with network 103 via data 106 before device 101 and network 103 conduct the message flows depicted in FIG. 1*a*.

Note that the server KEM parameters Server.PQC-KEM.Parameters 103*f*, which can specify the KEM parameters supported by server 111, can also be securely loaded into device 101 or stored by device 101 using the same steps described herein for device 101 to acquire the PK.server 10*d* and params-PK.server 103*f-y*. In some exemplary embodiments, the set of KEM parameters Server.PQC-KEM.Parameters 103*f* can be specified in a protocol for communications between device 101 and network 103, where device 101 stores the protocol in an operating system for device 101 or device cryptographic algorithms 101*s*.

In some embodiments, the parameters 110*f-x* for the device ephemeral public key of ePK.device 101*h* can specify the same algorithm (e.g. Kyber, SIKE, classical McEliece, etc) as the parameters for the network static public of params-PK.server 103*f-y*. In other exemplary embodiments, the parameters of parameters 101*f-x* for the device ephemeral public key of ePK.device 101*h* and a selected PK.device 101*a* can specify a different algorithm from the parameters for the network static public of params-PK.server 103*f-y* (where parameters 101*f-a* for PK.device 101*a* are the same as parameters 110*f-x* for the device ephemeral public key ePK.device 101*h*). Additional details regarding a device (i) storing the parameters for the network static public of params-PK.server 103*f-y*, and then (ii) selecting the parameters 101*f-x* for the device ephemeral public key of ePK.device 101*h* and the same parameters 101*f-a* for the device static public key PK 101*a* are depicted and described in connection with FIG. 2, FIG. 8, and FIG. 9*a* below, such as in a step 204. Exemplary use of different combinations of both device KEM parameters 101*f* and server KEM parameters 103*f* are depicted and described in connection with FIG. 8 below.

In some embodiments, the parameters 101*f-a* for the device static public key of PK.device 101*a* can specify the same algorithm (e.g. Kyber, SIKE, classical McEliece, etc) as the parameters for the network static public of params-PK.server 103*f-y*. In other exemplary embodiments, the parameters of parameters 101*f-a* for the device static public key of PK.device 101*a* can specify a different algorithm from the parameters for the network static public of params-PK.server 103*f-y*. Additional details regarding a device (i) storing the parameters for the network static public of params-PK.server 103*f-y*, and then (ii) using the parameters 101*f-a* for the device static public key of PK.device 101*a* are depicted and described in connection with FIG. 2, FIG. 8, and FIG. 9*a* below. Note that in some preferred exemplary embodiments, the parameters 101*f-a* for the device static public key of PK.device 101*a* can be the same values as the parameters 110*f-x* for the device ephemeral public key of ePK.device 101*h*. As noted above, device 101 can record a plurality of PK.device 101*a* and select the PK.device 101*a* with parameters 101*f-a* that match the parameters 101*f-x* selected for the device ephemeral public key ePK.device 101*h*, such as in a step 204. Exemplary use of different combinations of both device KEM parameters 101*f* and server KEM parameters 103*f* are depicted and described in connection with FIG. 8 below.

In exemplary embodiments, device 101 can also store server KEM parameters Server.PQC-KEM.Parameters 103*f*, which can specify the KEM parameters supported by server 111. Device 101 can use the parameters 103*f* for server 111 and/or network 103 in order to select a subset of KEM parameters 101*f-x* for a device ephemeral public key associated with a step 101*q* to derive the device ephemeral public key ePK.device 101*h*. As noted above, device 101 can select a device static public key PK.device 101*a* with parameters 101*f-a* (from a plurality of PK.device 101*a*) such that the PK.device 101*a* and parameters 101*f-a* are also supported by the parameters 101*f-x* for the device ephemeral public key ePK.device 101*h*. In other words, in exemplary embodiments, the KEM parameters 101*f-x* can comprise values that meet the following conditions, (i) are a subset of parameters 101*f*, (ii) are a subset of parameters 103*f* stored by device 101 and server 111, and (iii) are different than the parameters 103*f-y* for the server static public key PK.server 103*d*.

In general, the depicted data within memory 101*m* can be stored within a nonvolatile memory 101*m*-2 (depicted and described in connection with FIG. 1*b* below) such as flash memory or a solid state drive or hard drive when power from device 101 is removed or the device is powered off. When power is supplied to device 101 or device 101 operates, for some embodiments, the device ephemeral private key 101*i* and the corresponding device ephemeral public key 101*h* may optionally only be stored in volatile memory such as RAM. As depicted and described in connection with FIG. 1*b* below, when power is supplied to device 101 or device 101, the depicted data for memory 101*m* can be copied by processor 101*p* using a bus 101*t* from a nonvolatile memory 101*m* for device 101 into a volatile memory 101*m*.

Device cryptographic algorithms 101*s* can include the steps and logic for processor 101*p* in device 101 (depicted in FIG. 1*b* below) to conduct in order for device 101 to securely communicate with network 103 and a server 111. Device cryptographic algorithms 101*s* can include at least symmetric ciphering algorithms, a random number generator (which can use input from a hardware random number generator 128 depicted and described in connection with FIG. 1*b* below), a key pair generation algorithm, digital signature algorithms, asymmetric ciphering algorithms, secure hash algorithms, and key exchange mechanisms (KEM). Device cryptographic algorithms 101*s* can use libraries associated with cryptographic suites such as OpenSSL, crypto++, BouncyCastle, or Mozilla, and other possibilities exist as well without departing from the scope of the present disclosure, including the future update of those libraries to support post-quantum cryptography. Device cryptographic algorithms 101*s* can use inputs of keys such as public keys, private keys, and/or symmetric keys along with device cryptographic parameters 101*x* in order to for device 101 to process cryptographic data including ciphertext, key encapsulation mechanisms, and digital signatures.

Device cryptographic parameters 101*x* can specify values or settings for (i) processing a KEM that supports post-quantum cryptographic algorithms such as KEM DECAPS 101*j*/101*j'* and KEM ENCAPS 101*k*/101*k'*, (ii) mutually deriving a shared secret, (iii) mutually deriving a symmetric ciphering key from the shared secret using a HKDF, (iv) using a symmetric ciphering algorithm with the symmetric ciphering key, and/or (v) using a digital signature algorithm. As contemplated herein, device cryptographic parameters 101*x* may also be referred to as parameters 101*x*. Each of device 101 and network 103 can record at least a compatible subset of parameters within a set of device cryptographic parameters 101x, such as parameters 101f-x, 103f-y, 101f-z, and 101f-a. Parameters 101x can specify values for key length, key formatting (e.g. compressed or uncompressed), encoding rules, constants, numbers or variables for a post-quantum cryptography algorithm of a key exchange mechanism, etc. Parameters 101x can specify values for a post-quantum cryptography algorithm of a digital signature algorithm.

In exemplary embodiments, device cryptographic parameters 101x and device cryptographic algorithms 101s (as well as server cryptographic parameters 103x and cryptographic algorithms 103x for a network 103) can support post-quantum cryptography key exchanges or "key encapsulation mechanisms" (KEM) using lattice-based, code-based, or Supersingular Elliptic Curve Isogeny algorithms. These proposed algorithms are described by the Wikipedia article for "Post-Quantum Cryptography" dated Aug. 31, 2020, which is hereby incorporated by reference. In other words, device cryptographic parameters 101x and 103x and device cryptographic algorithms 101s and 103s can support (i) classical cryptographic functions such as secure hash algorithms (e.g. SHA256 or SHA3-256, etc.) and symmetric ciphering (e.g. AES, Blowfish, etc.), while also including (ii) support for PQC algorithms identified in Round 3 of the National Institute of Standards and Technology (NIST) project for Post-Quantum Cryptography (PQC) Standardization.

In general, as contemplated herein, keys, device cryptographic algorithms 101s or 103s, and parameters 101x or 103x supporting post-quantum cryptography (PQC) key exchange mechanisms (KEM) can be based on any of (i) lattice based algorithms, such as learning with errors, (ii) code based algorithms such as classic McEliece or BIKE, and (iii) ECC algorithms that based on Supersingular Elliptic Curve Isogeny, and other possibilities exist as well without departing from the scope of the present disclosure. In exemplary embodiments, keys, device cryptographic algorithms 101s or 103s, and parameters 101x or 103x supporting post-quantum cryptography (PQC) key exchange mechanisms (KEM) are not based on (i) the integer factorization problem (e.g. RSA), (ii) the discrete logarithm problem, or (iii) the elliptic curve discrete logarithm problem.

In exemplary embodiments, the depicted KEM parameters of Device.PQC-KEM.Parameters 101f can comprise a set of parameters that comprise a subset of the device cryptographic parameters 101x, where the depicted KEM parameters of Device.PQC-KEM.Parameters 101f pertain to parameters for different PQC key exchange mechanisms. Other parameters within device cryptographic parameters 101x could specify values for cryptographic operations besides KEM, such as symmetric ciphering algorithms, random number generation, hash-based key derivation functions (HKDF), digital signature algorithms, etc. Exemplary values of the depicted KEM parameters of Device.PQC-KEM.Parameters 101f are also depicted and described in connection with FIG. 8 below. Device 101 can select a subset of 101f-x of the set of KEM parameters 101f in order to (i) select a device static public key PK.device 101a, and (ii) generate a device ephemeral PKI key pair and conduct KEM with a network, such as in steps 226 and 228 performed by device 101. As contemplated herein, the subset 101f-x of the set of KEM parameters 101f can also be referred to as KEM parameters 101f-x and also parameters 101f-x.

Device 101 can select a subset 101f-x of the set of KEM parameters 101f in order to (i) generate an ephemeral PKI key pair and conduct a KEM with a network 103 using a server 111 and (ii) select a PK.device 101d from a plurality of PK.device 101d stored by device 101 in nonvolatile memory 101m-2 (depicted in FIG. 1b below). In an exemplary embodiment, subset 101f-x of the KEM parameters of Device.PQC-KEM.Parameters 101f could specify in FIG. 2 below of one of (i) Kyber-512 for approximately 128 bit of security with symmetric encryption, or (ii) Kyber-768 for approximately 192 bits of security with symmetric encryption, or (iii) Kyber-1024 for approximately 256 bits of security with symmetric encryption. In other words, Device.PQC-KEM.Parameters 101f could specify families or groups of parameters for multiple different PQC KEM such as, but not limited to, Kyber, SIKE, BIKE, etc., and the subset 101f-x could comprise the parameters for using a specific KEM for the family or group (such as subset 101f-x specifying values for one of the equivalent levels of 128, 192, or 256 bits of security for a symmetric ciphering algorithms). Other post-quantum cryptographic algorithms and parameters could be supported as well for both the KEM parameters of Device.PQC-KEM.Parameters 101f and a subset 101f-x.

A device 101 could store one or a plurality of different device certificates cert.device 101c. Each of the different device certificates 101c could use different values for (i) a device identity such as a user name for ID.device 101d, (ii) a device static public key PK.device 101a for conducting authenticated KEM with a network 103, (iii) a different certificate issuer for generating a digital signature for the device certificate 101c, and/or (iv) a subset of device cryptographic parameters 101x and cryptographic algorithms 101a for use with the device certificate 101c. In exemplary embodiments, the device certificate 101c can be formatted according to X.509v3 standards. The device identity of ID.device 101d in a device certificate 101c can be an international mobile subscriber identity (IMSI), a subscription permanent identifier (SUPI) according to 5G standards, or a network access identifier (NAI) as specified in IETF RFC 7542, and other possibilities exist as well for a device identity ID.device 101d without departing from the scope of the present disclosure. For some embodiments, the use of a device certificate cert.device 101c to record a device static public key of PK.device 101a could be omitted, and both device 101 and network 103 could store and use a device static public key of PK.device 101a without requiring the use of a device certificate cert.device 101c.

In exemplary embodiments, the subset of device cryptographic parameters 101x and device cryptographic algorithms 101s for a device certificate cert.device 101c can support any of the digital signature algorithms as specified in Round 3 of the NIST PQC project, which are also identified in the Wikipedia PQC article. The device certificate cert.device 101c can be stored in nonvolatile memory such as a storage memory for memory 101m when device 101 is powered off or inactive, and then moved into volatile memory such as a RAM memory for memory 101m when device 101 operates.

Device 101 can include a set of device parameters or device extensions 101g for conducting a secure session with a network 103 and a server 111. The device extensions 101g can include supported cipher suites supported by device 101 in establishing secure communications with network 103 and server 111. The device extensions 101g can include supported symmetric ciphering algorithms and modes, such as the Advanced Encryption Standard (AES) with a ciphertext chaining mode such as Electronic Code Book mode (ECB), Cipher Block Chaining mode (CBC), etc. Device extensions 101g can include supported secure hash algorithms, key lengths, and supported digital signature algorithms from device cryptographic algorithms 101s for device 101. Device extensions 101g can also include supported device cryptographic parameters 101x for use with the device cryptographic algorithms 101s.

Device 101 can include a PQC key pair generation algorithm PQC.KeyGen 101q from device cryptographic algorithms 101s and the selected subset 101f-x of KEM parameters 101f (where the selection of parameters 101f-x can be conducted in a step 121 in FIG. 2 below). Network 103 can include a compatible PQC key pair generation algorithm 103q from server cryptographic algorithms 103s described below. A PQC key pair generation algorithm 101q can use the selected subset 101f-x of KEM parameters 101f in order to generate (i) a random number from a random number generator in order to derive a device ephemeral PKI private key eSK.device 101h and (ii) a corresponding device ephemeral PKI public key ePK.device 101i.

The device ephemeral private key eSK.device 101i can comprise a first private key for an exemplary lattice-based algorithm of Kyber768, although other PQC algorithms (e.g. BIKE, SIKE, etc) could be used instead. In other words, the selected subset 101f-x could specify use of Kyber768. The KEM parameters 101f-x could specify values of the device ephemeral private key eSK.device 101i of n=256 and q=7681. The KEM parameters 101f-x that define keys and ciphertext could be set to du=11, dv=3 and dt=11. For Kyber768, the values of k could be 3 and n could be 4. Other values for KEM parameters 101f-x are possible as well without departing from the scope of the present disclosure, such as an exemplary lattice-based algorithm of Kyber1024. With Kyber 1024, the values associated KEM parameters 103f-y could be the same as above, except for the use of k=4 and n=5.

In an exemplary embodiments that use Kyber algorithms, PQC.KeyGen 101q can comprise "Algorithm 1 Kyber:CPA: KeyGen( ): key generation" from the paper "CRYSTALS— Kyber: a CCA-secure module-lattice-based KEM" (referred to herein as the Kyber paper), which is herein incorporated by reference. In exemplary embodiments that use Supersingular Isogeny Key Encapsulation (SIKE) algorithms, PQC.KeyGen 101q can comprise the "KeyGen" function or algorithm specified in the paper "Supersingular Isogeny Key Encapsulation" dated Apr. 16, 2020, (referred to herein as the SIKE paper), which is herein incorporated by reference. Other PQC key generation functions from Round 3 of the NIST PQC project could be used for a PQC.KeyGen 101q or 103q function as well, without departing from the scope of the present disclosure. Parameters 101f-x (and similar parameters 101f-a, 103f-y, and 103f-z) can specify both (i) the PQC algorithm used for the PKI key pair that included ePK.device 101h, and (ii) the values or parameters for the PQC algorithm such as for Kyber768, Kyber 1024, SIKEp503, SIKEp610, etc.

Device 101 can store or record in memory 101m a KEM ENCAPS function 101k in both (i) nonvolatile memory or storage memory when device 101 is powered off and (ii) volatile memory such as RAM when device 101 is operating. A subset of parameters Device.PQC-KEM.Parameters 101f, such as the second subset 103f-y of parameters for the server static public key PK.server 103d could be used with KEM ENCAPS function 101k. The selected subset of parameters Device.PQC-KEM.Parameters 101f and a stored server static public key PK.server 103d of params-PK.server 103f-y can be used with the KEM ENCAPS function 101k in order to convert number such as, but not limited to, a random number for M1 208a into both (i) a first asymmetric ciphertext C1 102c-1 and a first shared secret key K1 102k-1. Note the ciphertext C1 102c-1 may be referred to herein as a first ciphertext. The parameters and values used with the KEM ENCAPS function 101k are depicted and described for a step 209 in FIG. 2 below and also in FIG. 3 below. The KEM ENCAPS function 101k can be included in device cryptographic algorithms 101s and support a plurality of different PQC key exchange mechanisms (KEM), such as any of the PQC KEM in Round 3 of the NIST PQC project.

Device 101 can store or record in memory 101m a KEM DECAPS function 101j in both (i) nonvolatile memory or storage memory when device 101 is powered off and (ii) volatile memory such as RAM when device 101 is operating. In summary, the parameters 101f-x (selected in a step 121 in FIG. 2 below) and the generated or derived device ephemeral private key eSK.Device 101i can be used with the KEM DECAPS function 101j in order to convert a second received ciphertext C2 102c-2 into a second shared secret key K2 102k-2. The parameters and values used with the KEM DECAPS function 101j are depicted and described for a step 226 in FIG. 2 below and also in FIG. 5 below. The KEM DECAPS function 101j can be included in device cryptographic algorithms 101s and support a plurality of different PQC key exchange mechanisms (KEM), such as any of the PQC KEM in Round 3 of the NIST PQC project.

Device 101 can store or record in memory 101m a KEM DECAPS function 101j' in both (i) nonvolatile memory or storage memory when device 101 is powered off and (ii) volatile memory such as RAM when device 101 is operating. In summary, the parameters 101f-a and the stored device static private key SK.device 101v can be used with the KEM DECAPS function 101j' in order to convert a third received ciphertext C3 102c-3 into a third shared secret key K3 102k-3. The parameters and values used with the KEM DECAPS function 101j' are depicted and described for a step 228 in FIG. 2 below and also in FIG. 6 below. The KEM DECAPS function 101j' can be included in device cryptographic algorithms 101s and support a plurality of different PQC key exchange mechanisms (KEM), such as any of the PQC KEM in Round 3 of the NIST PQC project. For some embodiments, the KEM DECAPS function 101j' can be the same as the KEM DECAPS function 101j, such as using the same set of parameters 101f-x but with using (i) SK.device 101v for KEM DECAPS function 101j' and (ii) ePK.device 101h for KEM DECAPS function 101j.

Device 101 can store or record in memory 101m a KEM ENCAPS function 101k' in both (i) nonvolatile memory or storage memory when device 101 is powered off and (ii) volatile memory such as RAM when device 101 is operating. A subset of parameters Device.PQC-KEM.Parameters 101f, such as the subset 103f-z of parameters for the server ephemeral public key ePK.server 103h could be used with KEM ENCAPS function 101k'. The selected subset of parameters Device.PQC-KEM.Parameters 101f and a received server ephemeral public key ePK.server 103h of params-PK.server 103f-z can be used with the KEM ENCAPS function 101k' in order to convert number such as, but not limited to, a random number for M4 230a into both (i) a fourth asymmetric ciphertext C4 102c-4 and a fourth shared secret key K4 102k-4. The parameters and values used with the KEM ENCAPS function 101k' are depicted and described for a step 230 in FIG. 2 below and also in FIG. 6 below. The KEM ENCAPS function 101k' can be included in device cryptographic algorithms 101s and support a plurality of different PQC key exchange mechanisms (KEM), such as any of the PQC KEM in Round 3 of the NIST PQC project.

As contemplated herein, the use of the term "first asymmetric ciphertext C1 102c-1" or "second asymmetric ciphertext C2 102c-2", etc. can refer to asymmetrically encrypted ciphertext used with a PQC key exchange mechanism. A different term of "a first symmetric ciphertext symm-C1 102s-1" can refer to different ciphertext that is symmetrically encrypted with a symmetric ciphering key. Thus, (i) a "first asymmetric ciphertext C1 102c-1" can be communicated between device 101 and network 103, and then (ii) "a first symmetric ciphertext symm-C1 102s-1" can be communicated between device 101 and network 103, and then (iii) a "second asymmetric ciphertext C2 102c-2" can be communicated between device 101 and network 103.

Network 103 can comprise a collection of servers and also operate as a cloud service. As depicted for system 100a in FIG. 1a, network 103 can communicate with device 101 through IP network 107. Network 103 can include a network identity of network ID 103a, which could comprise a domain name, a name, or a string to uniquely identify network 103 in a system 100a. In exemplary embodiments, at least a portion of network ID 103a can comprise a network access identifier for network 103. Network 103 can include at least one server 111 as depicted in FIG. 1a. Although a single server 111 is depicted for a network 103 in FIG. 1a, a network 103 could include a plurality of servers 111, where each server 111 can be identified using a different server identity of server ID 111a.

Figure 1B:
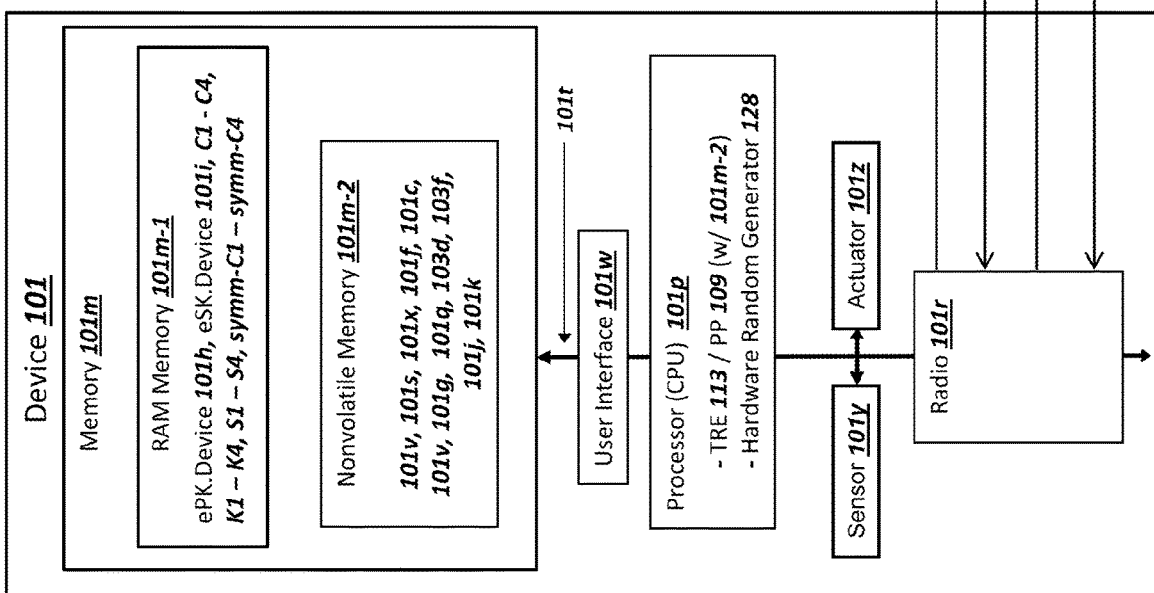

Server 111 can include hardware components and electrical components similar to those of a device 101 depicted in FIG. 1b, except generally with larger capacities appropriate for a server 111. Server 111 can also operate as a host computing environment with physical hardware for a virtual machine to operate as a guest computing environment. Server 111 can include a server identity of server ID 111a, which could comprise a domain name, a name, or a string to uniquely identify server 111 in a system 100a. In exemplary embodiments, at least a portion of server ID 111a can comprise a network access identifier for server 111. Exemplary hardware and electrical components for a server 111 are depicted and described in connection with FIG. 1b below.

Server cryptographic algorithms 103s can include the steps and logic for processor 103p in server 111 (depicted in FIG. 1b below) to conduct in order for server 111 and network 103 to securely communicate with device 101. Device cryptographic algorithms 101s can include at least symmetric ciphering algorithms, a random number generator, a key pair generation algorithm, digital signature algorithms, asymmetric ciphering algorithms, secure hash algorithms, and key exchange mechanisms. Server cryptographic algorithms 103s can use libraries associated with cryptographic suites such as OpenSSL, crypto++, BouncyCastle, or Mozilla, and other possibilities exist as well without departing from the scope of the present disclosure, including the future update of those libraries to support post-quantum cryptography. Server cryptographic algorithms 103s can use inputs of keys such as public keys, private keys, and/or symmetric keys along with server cryptographic parameters 103x in order to for server 111 and network 103 to process cryptographic data including ciphertext, key exchanges, and digital signatures.

Server cryptographic parameters 103x can specify values or settings for (i) processing a KEM that supports post-quantum cryptographic algorithms such as KEM DECAPS 103j/103j′ and KEM ENCAPS 103k/103k′, (ii) mutually deriving a shared secret, (iii) mutually deriving a symmetric ciphering key from the shared secret using a HKDF, (iv) using a symmetric ciphering algorithm with the symmetric ciphering key, and (v) using a digital signature algorithm. As contemplated herein, server cryptographic parameters 103x may also be referred to as parameters 103x. Each of device 101 and network 103 can record at least compatible subset of parameters within a set of server cryptographic parameters 103x. Parameters 103x can specify values for key length, key formatting (e.g. compressed or uncompressed), encoding rules, constants, numbers or variables for a post-quantum cryptography algorithm of a key exchange mechanism, etc. Parameters 103x can specify values for a post-quantum cryptography algorithm of a digital signature algorithm.

In exemplary embodiments, server cryptographic parameters 103x and server cryptographic algorithms 103s (as well as device cryptographic parameters 101x and cryptographic algorithms 101x for a device 101) can support post-quantum cryptography key exchanges or "key encapsulation mechanisms" (KEM) using lattice, code-based, or Supersingular Elliptic Curve Isogeny algorithms. These proposed algorithms are described by the Wikipedia article for "Post-Quantum Cryptography" dated Aug. 31, 2020, which is hereby incorporated by reference. In other words, server cryptographic parameters 103x and server cryptographic algorithms 103s can support (i) classical cryptographic functions such as secure hash algorithms (e.g. SHA256 or SHA3-256, etc.) and symmetric ciphering (e.g. AES, Blowfish, etc.), while also including (ii) support for PQC algorithms identified in Round 3 of the National Institute of Standards and Technology (NIST) project for Post-Quantum Cryptography (PQC) Standardization.

In exemplary embodiments, the depicted KEM parameters of Server.PQC-KEM.Parameters 103f can comprise a set of parameters that comprise a subset of the server cryptographic parameters 103x, where the depicted KEM parameters of Server.PQC-KEM.Parameters 103f pertain to parameters for different PQC key exchange mechanisms (KEM). Exemplary values of the depicted KEM parameters of Server.PQC-KEM.Parameters 103f are also depicted and described in connection with FIG. 8 below. Note that Server-.PQC-KEM.Parameters 103f can be different than Device-.PQC-KEM.Parameters 101f, but in exemplary embodiments, at least two subsets of parameters is commonly shared between a server 111 and a device 101, such as the exemplary subsets 101f-x and 103f-y as depicted and described in connection with FIG. 2 and FIG. 8 below. For some exemplary embodiments, the exemplary subsets 101f-x and 103f-y can comprise the same values and specify the same parameters. For other exemplary embodiments, the exemplary subsets 101f-x and 103f-y can specify different parameters for different KEM algorithms. In addition, in some exemplary embodiments a third subset of parameters is commonly shared between a server 111 and a device 101, such as the exemplary subset 103f-z can be used for server ephemeral PKI keys as described below.

A server 111 could store one or a plurality of different server certificates cert.server 103c. Each of the different server certificates 103c could use different values for (i) a server identity such as a server name or server ID 111a, (ii) a static server static public key for verifying digital signatures generated by server 111 (different than PK.server 103d stored by device 101 for key agreement/KEM), (iii) a different certificate issuer for generating a digital signature for the server certificate 103c, and/or (iv) a subset of cryptographic parameters 103*s* and cryptographic algorithms 103*x* for use with the server certificate 103*c*. In exemplary embodiments, the server certificate 103*c* can be formatted according to X.509v3 standards. The server identity in a server certificate 101*c* can be a server ID 111*a*, or a network access identifier (NAI) as specified in IETF RFC 7542, and other possibilities exist as well without departing from the scope of the present disclosure. For some exemplary embodiments, the use of a server certificate cert.server 103*c* can be omitted, and a server 111 and device 101 can use a server static public key PK.server 103*d* without requiring the use of a server certificate cert.server 103*c*.

In exemplary embodiments, the subset of cryptographic parameters 103*s* and cryptographic algorithms 103*x* for a server certificate cert.server 103*c* can support any of the digital signature algorithms as specified in Round 2 of the NIST PQC project, which are also identified in the Wikipedia PQC article. The server certificate cert.server 103*c* can be stored in nonvolatile memory such as a storage memory 111*b* (depicted in FIG. 1*b*) when server 111 is powered off or inactive, and then moved into volatile memory such as a RAM memory 111*m* (depicted in FIG. 1*b*) for memory 111*m* when server 111 operates or is connected to IP network 107.

As depicted in FIG. 1, server 111 and network 103 can also store a static private key SK.server 103*b* corresponding to the public key PK.server 103*d* stored by device 101. Although not depicted in FIG. 1, server 111 can also store and support the parameters associated with the server static private key of SK.server 103*b* which can be the same or equivalent to the params-PK.server 103*f-y* stored by device 101.

Server 111 can select a subset 103*f-z* of the set of KEM parameters 103*f* in order to generate a PKI key pair and conduct a KEM 103*j*/101*k'* with a device 101. In an exemplary embodiment, subset 103*f-z* of the KEM parameters of Server.PQC-KEM.Parameters 103*f* could specify the selection of Kyber-512 for approximately 128 bit of security with symmetric encryption, or Kyber-768 for approximately 192 bits of security with symmetric encryption, or Kyber-1024 for approximately 256 bits of security with symmetric encryption. In other words, Server.PQC-KEM.Parameters 103*f* could specify a family or group of parameters for a PQC KEM such as, but not limited to, Kyber, SIKE, BIKE, etc., and the subset 103*f-z* could comprise the parameters for using a specific KEM for the family or group (such as subset 103*f-z* specifying values for one of the equivalent levels of 128, 192, or 256 bits of security for a symmetric ciphering algorithms). Other post-quantum cryptographic algorithms and parameters could be supported as well for both the KEM parameters of Server.PQC-KEM.Parameters 103*f* and a subset 103*f-z*.

Figure 8:
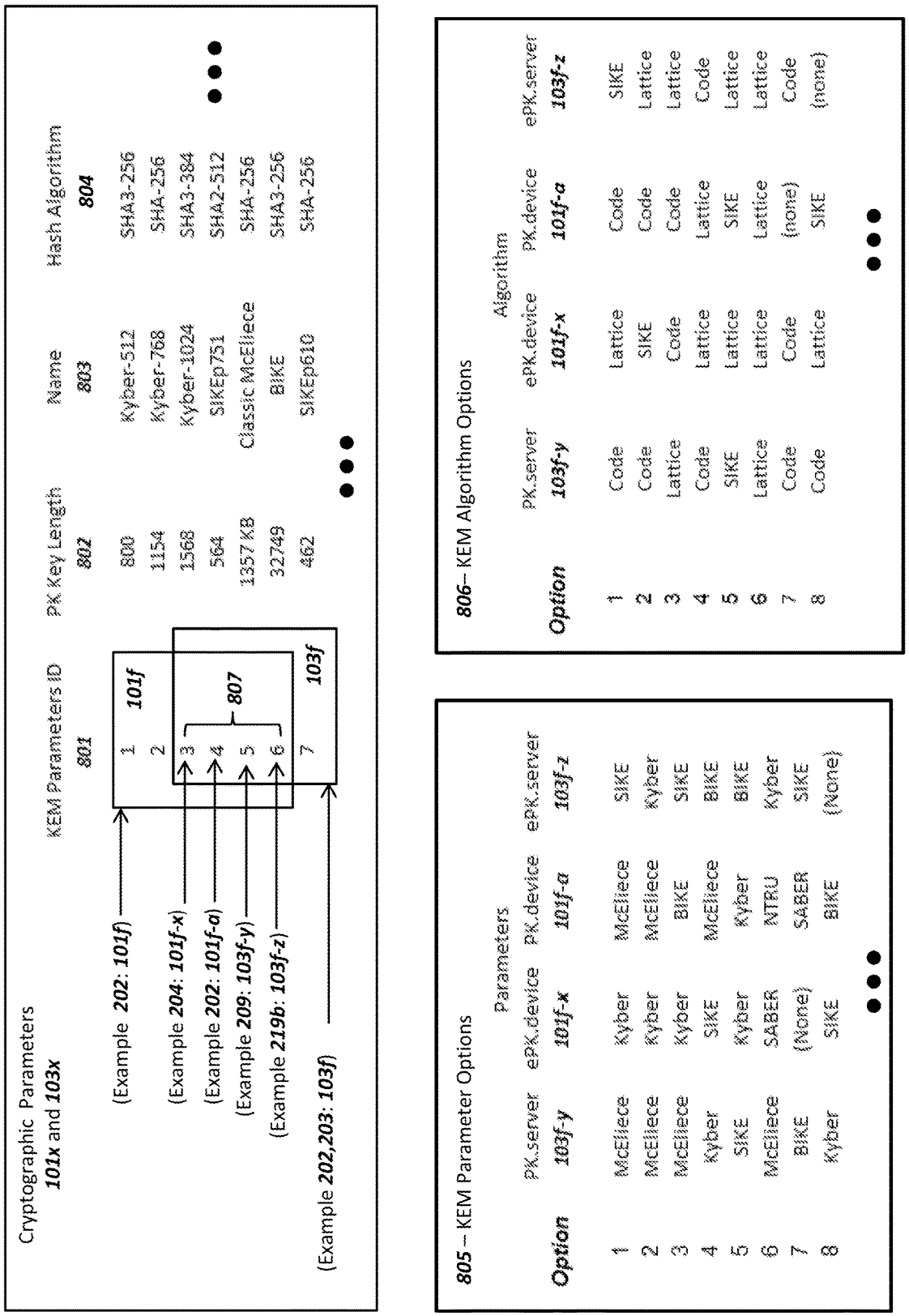
FIG. 8 is an illustration of (i) an exemplary set of cryptographic parameters for multiple key exchange mechanism (KEM) stored and used by a device and a server, and (ii) exemplary options for the cryptographic parameters, and (iii) exemplary options for cryptographic algorithms associated with the cryptographic parameters, in accordance with exemplary embodiments.

For some preferred exemplary embodiments and as depicted in FIG. 8 below, the subset 103*f-z* of parameters selected by server 111 in a step 122 in FIG. 2 can be different than the subset 101*f-x* selected by device 101, such as supporting a different KEM algorithm, including a different type or family. For other existing embodiments, the subset 103*f-z* can be the same as the subset 101*f-x*, such as both server 111 and device 101 using the same KEM algorithm and parameters for device ephemeral PKI keys and server ephemeral PKI keys.

Server 111 can include a PQC key pair generation algorithm PQC.KeyGen 103*q* from server cryptographic algorithms 103*s* and the selected subset 103*f-z* of KEM parameters 103*f*. A PQC key pair generation algorithm 103*q* can use the selected subset 103*f-z* of KEM parameters 103*f* in order to generate (i) a random number from a random number generator in order to derive or generate a server ephemeral PKI private key eSK.server 103*h* and (ii) a corresponding server ephemeral PKI public key ePK.server 103*i*.

In an exemplary embodiments that use Kyber algorithms, PQC.KeyGen 103*q* can comprise "Algorithm 1 Kyber:CPA: KeyGen( ): key generation" from the paper "CRYSTALS—Kyber: a CCA-secure module-lattice-based KEM" (referred to herein as the Kyber paper), which is herein incorporated by reference. In exemplary embodiments that use Supersingular Isogeny Key Encapsulation (SIKE) algorithms, PQC.KeyGen 103*q* can comprise the "KeyGen" function or algorithm specified in the paper "Supersingular Isogeny Key Encapsulation" dated Apr. 16, 2020, (referred to herein as the SIKE paper), which is herein incorporated by reference. Other PQC key generation functions from Round 3 of the NIST PQC project could be used for a PQC.KeyGen 103*q* function as well, without departing from the scope of the present disclosure.

Server 111 can store or record in nonvolatile memory or storage memory 111*b* (as depicted in FIG. 1*b*) SK.server 101*b* when server 111 is powered off and (ii) volatile memory such as RAM 111*m* (as depicted in FIG. 1*b*) when operating a KEM DECAPS function 103*j*. In summary, (i) the subset of KEM parameters 103*f-y* for the server static public key SK.server 103*d* and (ii) the stored server static private key SK.server 103*b* can be used with the KEM DECAPS function 103*j* in order to convert a received first asymmetric ciphertext C1 102*c-1* into a first shared secret key K1 102*k-1*. The parameters and values used with the KEM DECAPS function 103*j* are depicted and described for a step 214 in FIG. 2 below and also in FIG. 4 below and also FIG. 8 below. The KEM DECAPS function 103*j* can be included in server cryptographic algorithms 103*s* and support a plurality of different PQC key exchange mechanisms (KEM), such as any of the PQC KEM in Round 3 of the NIST PQC project.

Server 111 can store or record in nonvolatile memory or storage memory 111*b* when server 111 is powered off and (ii) volatile memory such as RAM 111*m* when operating a KEM ENCAPS function 103*k*. A received subset of parameters Server.PQC-KEM.Parameters 103*f*, such as subset 101*f-x* could be used with KEM ENCAPS function 103*k*. The received subset of parameters Server.PQC-KEM.Parameters 103*f* and a received device ephemeral public key ePK.device 101*h* can be used with the KEM ENCAPS function 103*k* in order to convert number such as, but not limited to, a random number for M2 220*c'* into both (i) a second asymmetric ciphertext C2 102*c-2* and (ii) a second shared secret key K2 102*k-2*. The parameters and values used with the KEM ENCAPS function 103*k* are depicted and described for a step 220*c* in FIG. 2 below and also in FIG. 4 below and also FIG. 8 below. The KEM ENCAPS function 103*k* can be included in server cryptographic algorithms 103*s* and support a plurality of different PQC key exchange mechanisms (KEM), such as any of the PQC KEM in Round 3 of the NIST PQC project.

Server 111 can store or record in nonvolatile memory or storage memory 111*b* when server 111 is powered off and (ii) volatile memory such as RAM 111*m* when operating a KEM ENCAPS function 103*k'*. A received subset of parameters Server.PQC-KEM.Parameters 103*f*, such as subset 101*f-x* or 101*f-a* could be used with KEM ENCAPS function 103*k'*. The received subset of parameters Server.PQC-KEM.Parameters 103*f* and a received or previously stored (e.g. before message 121) device static public key PK.device 101*a* can be used with the KEM ENCAPS function 103*k'* in order to convert number such as, but not limited to, a random number for M3 222a into both (i) a third asymmetric ciphertext C3 102c-3 and (ii) a third shared secret key K3 102k-3. The parameters and values used with the KEM ENCAPS function 103k' are depicted and described for a step 222 in FIG. 2 below and also in FIG. 4 below and also FIG. 8 below. The KEM ENCAPS function 103k' can be included in server cryptographic algorithms 103s and support a plurality of different PQC key exchange mechanisms (KEM), such as any of the PQC KEM in Round 3 of the NIST PQC project.

Server 111 can store or record in nonvolatile memory or storage memory 111b (as depicted in FIG. 1b) SK.server 101b when server 111 is powered off and (ii) volatile memory such as RAM 111m (as depicted in FIG. 1b) when operating a KEM DECAPS function 103j'. In summary, (i) the subset of KEM parameters 103f-z for the server ephemeral public key eSK.server 103h and (ii) the stored server ephemeral private key eSK.server 103i can be used with the KEM DECAPS function 103j' in order to convert a received fourth asymmetric ciphertext C4 102c-4 into a fourth shared secret key K4 102k-4. The parameters and values used with the KEM DECAPS function 103j' are depicted and described for a step 222 in FIG. 2 below and also in FIG. 4 below and also FIG. 8 below. The KEM DECAPS function 103j' can be included in server cryptographic algorithms 103s and support a plurality of different PQC key exchange mechanisms (KEM), such as any of the PQC KEM in Round 3 of the NIST PQC project.

Server 111 can include a set of server parameters or server extensions 103g for conducting a secure session with a device 101. The server parameters 103g can include supported cipher suites supported by server 111 in establishing a secure session with device 101. The server parameters 103g can also be used for the "Extensions" fields within a "Server Hello" message such as a second message 121 as depicted and described in connection with FIG. 2 below. The server parameters 103g can include supported symmetric ciphering algorithms and modes, such as the Advanced Encryption Standard (AES) with a ciphertext chaining mode such as Electronic Code Book mode (ECB), Cipher Block Chaining mode (CBC), etc. Server parameters 103g can include supported secure hash algorithms, key lengths, and supported digital signature algorithms from server cryptographic algorithms 103s. Server parameters 103g can also include supported server cryptographic parameters 103x for use with the server cryptographic algorithms 103s.

As depicted in FIG. 1a, device 101 and server 111 operating within network 103 can exchange a series of messages in order to conduct encrypted and authenticated communications between the nodes. Device 101 can use KEM ENCAPS 101k in a step 209 with the server static public key PK.server 103d in order to send both (i) the first asymmetric ciphertext C1 102c-1 and (ii) a first symmetric ciphertext symm-C1 102s-1. Device 101 can generate a first shared secret key K1 102k-1 and the first asymmetric ciphertext C1 102c-1 using KEM ENCAPS function 101k in a step 210 below in FIG. 2 and FIG. 3. Device 101 can generate a symmetric ciphering key S1 using at least the first shared secret key K1 102k-1. Device 101 can generate a device ephemeral public key ePK.device 101h using PQC.KeyGen 101q and parameters 101f-x. Device 101 can encrypt ePK.device 101h into a first symmetric ciphering symm-C1 102s-1 using the first symmetric ciphering key S1 in a step 212 below in FIG. 2 and FIG. 3. Device 101 can send a message 121 to server 111, where the message 121 includes both (i) the first asymmetric ciphertext C1 102c-1 and (ii) the first symmetric ciphertext symm-C1 102s-1. For some embodiments, the first symmetric ciphertext symm-C1 102s-1 can also include parameters 110f-x for ePK.device 101h.

Server 111 can receive the message 121. In a step 214 below in FIG. 2 and FIG. 3, server 111 can conduct a KEM DECAPS function 103j with (i) the first asymmetric ciphertext C1 102c-1 and (ii) the server static public key PK.server 103b and parameters 103f-y in order generate the first shared key K1 102k-1. Server 111 can generate the first symmetric ciphering key S1 using at least the shared key K1 102k-1 in a step 214 in FIG. 2 and FIG. 3. Server 111 can decrypt the first symmetric ciphertext symm-C1 102s-1 using the first symmetric ciphering key S1 in a step 215 below in FIG. 2 and FIG. 3. Server 111 can read the plaintext value for the device ephemeral public key ePK.device 101h, and the first symmetric ciphertext symm-C1 102s-1 can also include parameters 110f-x for ePK.device 101h.

Server 111 can conduct a KEM ENCAPS function 103k with ePK.device 101h and the parameters 101f-x in order to generate a second asymmetric ciphertext C2 102c-2 and a second shared secret key K2 102k-2, in a step 220c from FIG. 2 and FIG. 4 below. Server 111 can use at least the second shared secret key K2 102k-2 in order to generate a second symmetric ciphering key S2. For some exemplary embodiments, server 111 can use at least the first shared secret key K1 102k-1 and the second shared secret key K2 102k-2 in order to generate the second symmetric ciphering key S2.

Server 111 can encrypt the second asymmetric ciphertext C2 102c-2 into a second symmetric ciphertext symm-C2 102s-2 using the first symmetric ciphering key S1. In other words, the second symmetric ciphertext symm-C2 102s-2 can comprise a "double encrypted" second asymmetric ciphertext C2 102c-2. Note the encryption and subsequent transmission of the second asymmetric ciphertext C2 102c-2 within the second symmetric ciphertext symm-C2 102s-2 can enhance security of a system 100a, since the use of both SK.server 103b and ePK.device 101h in KEM can be required to transmit and process the "double encrypted" second asymmetric ciphertext C2 102c-2 in a subsequent message 122. For some embodiments the use of "double encryption of the second asymmetric ciphertext C2 102c-2 can be omitted, and the second asymmetric ciphertext C2 102c-2 could be transmitted without additional symmetric ciphering and the use of the first symmetric ciphering key S1.

Server 111 can conduct a KEM ENCAPS function 103k' with PK.device 101a and the parameters 101f-a in order to generate a third asymmetric ciphertext C3 102c-3 and a third shared secret key K3 102k-3, in a step 222 from FIG. 2 and FIG. 4 below. Server 111 can encrypt the third asymmetric ciphertext C3 102c-3 into a third symmetric ciphertext symm-C3 102s-3 using the second symmetric ciphering key S2. In other words, the third symmetric ciphertext symm-C3 102s-3 can comprise a "double encrypted" third asymmetric ciphertext C3 102c-3. Note the encryption and subsequent transmission of the third asymmetric ciphertext C3 102c-3 within the third symmetric ciphertext symm-C3 102s-3 can enhance security of a system 100a, since the use of SK.server 103b, ePK.device 101h, and PK.device 101a in KEM can be required to transmit the "double encrypted" third asymmetric ciphertext C3 102c-3 in a subsequent message 122. For some embodiments the use of "double encryption of the third asymmetric ciphertext C3 102c-3 can be omitted, and the third asymmetric ciphertext C3 102c-3 could be transmitted without additional symmetric ciphering and the use of the second symmetric ciphering key S2.

In a step 224 below in FIG. 2 and also FIG. 4, server 111 can use at least the third shared secret key K3 102k-3 in order to generate a third symmetric ciphering key S3. For some exemplary embodiments, server 111 can use at least (i) the first shared secret key K1 102k-1 and (ii) the second shared secret key K2 102k-2 and (iii) in order to generate the third symmetric ciphering key S3.

Server 111 can generate a server ephemeral public key ePK.server 103h using PQC.KeyGen 103q and parameters 103f-z. Server 111 can encrypt ePK.server 103h into a fourth symmetric ciphertext symm-C4 102s-4 using the third symmetric ciphering key S3 in a step 225 below in FIG. 2 and FIG. 5. Server 111 can send a message 122 to device 101, where the message 122 includes (i) the second symmetric ciphertext symm-C2 102s-2 encrypted with the first symmetric ciphering key S1 and comprising the second asymmetric ciphertext C2 102c-2, (ii) the third symmetric ciphertext symm-C3 102s-3 encrypted with the second symmetric ciphering key S2 and comprising the third asymmetric ciphertext C3 102c-3, and (iii) the fourth symmetric ciphertext symm-C4 102s-4 encrypted with the third symmetric ciphering key S3 and comprising the server ephemeral public key ePK.server 103h. For some embodiment, the fourth symmetric ciphertext symm-C4 102s-4 can also comprise the parameters 103f-z for ePK.server 103h.

Device 101 can receive the message 122. Device 101 can decrypt the second symmetric ciphertext symm-C2 102s-2 using the first symmetric ciphering key S1. Device 101 can read the plaintext value for the second asymmetric ciphertext C2 102c-2 after the decryption step. Device 101 can conduct a KEM DECAPS function 101j with (i) the device ephemeral secret key SK.device 101v and parameters 101f-x and (ii) the second asymmetric ciphertext C2 102c-2 in order to generate the second shared key K2 102k-2. Device 101 can generate the second symmetric ciphering key S2 using at least the shared key K2 102k-2 in a step 226 in FIG. 2 and FIG. 5 below. For some exemplary embodiments, device 101 can generate the second symmetric ciphering key S2 using at least the shared key K2 102k-2 and the shared key K1 102k-1 derived above in an KEM ENCAPS function 101k performed by device. Device 101 can decrypt the third symmetric ciphertext symm-C3 102s-3 using the second symmetric ciphering key S2 in a step 227 below in FIG. 2 and FIG. 5 below. Device 101 can read the plaintext value for the third asymmetric ciphertext C3 102c-3 from the decrypted third symmetric ciphertext symm-C3 102s-3.

Device 101 can decrypt the third symmetric ciphertext symm-C3 102s-3 using the second symmetric ciphering key S2 in a step 227 below in FIG. 2 and FIG. 5 below. Device 101 can read the plaintext value for the third asymmetric ciphertext C3 102c-3 from the decrypted third symmetric ciphertext symm-C3 102s-3.

Device 101 can conduct a KEM DECAPS function 101j' with (i) the device static private key SK.device 101v and parameters 101f-a and (ii) the third asymmetric ciphertext C3 102c-3 in order to generate the third shared key K3 102k-3. The use of KEM DECAPS function 101j' by device 101 is depicted and described in connection with a step 228 below FIG. 2 and also FIG. 6. Device 101 can generate the third symmetric ciphering key S3 using at least the shared key K3 102k-3 in a step 228 in FIG. 2 and FIG. 6 below. For some exemplary embodiments, device 101 can generate the third symmetric ciphering key S3 using at least the shared key K3 102k-3 and (i) the shared key K1 102k-1 derived above in an KEM ENCAPS function 102k-1 performed by device 101 and (ii) the shared key K2 102k-2 derived above with the KEM DECAPS function 101j.

Device 101 can use the derived symmetric ciphering key S3 to decrypt the fourth symmetric ciphertext symm-C3 102s-4 in order to read at least plaintext data containing the server ephemeral public key ePK.server 103h. The plaintext data can also include parameters 103f-z for the server ephemeral public key ePK.server 103h.

Device 101 can use KEM ENCAPS 101k' in a step 230 in FIG. 2 and FIG. 6 below with the server ephemeral public key ePK.server 103h and parameters 101f-z in order to generate a shared key K4 102k-4 and a fourth asymmetric ciphertext C4 102c-4. Device 101 can generate the fourth symmetric ciphering key S4 using at least the shared key K4 102k-4 in a step 231 in FIG. 2 and FIG. 6 below. For some exemplary embodiments such as with step 231 in FIG. 2 and FIG. 6 below, device 101 can generate the fourth symmetric ciphering key S4 using at least the shared key K4 102k-4 and (i) the shared key K1 102k-1 derived above in an KEM ENCAPS function 101k performed by device 101 and (ii) the shared key K2 102k-2 derived above with the KEM DECAPS function 101j and (iii) the shared key K3 102k-3 derived above with the KEM DECAPS function 101j'. For the embodiments described in the sentence above, the security of a system 100a can be increased because the fourth symmetric ciphering key S4 can require the successful use by device 101 of PK.server 103d, eSK.device 101i, SK.device 101v, and ePK.server 103h. Device 101 can encrypt the fourth asymmetric ciphertext C4 102c-4 into a fifth symmetric ciphertext symm-C5 102s-5 using the derived third symmetric ciphering key S3 derived with KEM DECAPS function 101j'.

Device 101 can generate data.device 234a in a step 234 below in FIG. 2 and FIG. 7a. Data.device 234a can comprise application data from device 101 for server 111 and network 103, such as a sensor measurement, or registration information, and other possibilities exist as well for data.device 234a without departing from the scope of the present disclosure. Device 101 can encrypt the data.device 234a using the fourth symmetric ciphering key S4 into a sixth symmetric ciphertext symm-C6 102s-6. Device 101 can send server 111 a message 123 with both (i) the fifth symmetric ciphertext symm-C5 102s-5 comprising a "double encrypted" fourth asymmetric ciphertext C4 102c-4 and (ii) the sixth symmetric ciphertext symm-C6 102s-6.

Server 111 can receive the message 123 from device 101. Server 111 can decrypt the fifth symmetric ciphertext symm-C5 102s-5 using the third symmetric ciphering key S3 derived by a server 111 above along with step 222. Server 111 can read the plaintext value for the fourth asymmetric ciphertext C4 102c-4. Server 111 can use a KEM DECAPS function 103j' with (i) the server ephemeral private key eSK.server 103i and parameters 103f-z and (ii) the fourth asymmetric ciphertext C4 102c-4 in order to generate the fourth shared key K4 102k-4. The use of KEM DECAPS function 103j' by server 111 is depicted and described in connection with a step 238 below FIG. 2 and also FIG. 7a.

Server 111 can generate the fourth symmetric ciphering key S4 using at least the shared key K4 102k-4 in a step 231 in FIG. 2 and FIG. 6 below. For some exemplary embodiments such as with step 231 in FIG. 2 and FIG. 6 below, server 111 can generate the fourth symmetric ciphering key S4 using at least the shared key K4 102k-4 and (i) the shared key K1 102k-1 derived above in an KEM DECAPS function 103j performed by server 111 and (ii) the shared key K2 102k-2 derived above with the KEM ENCAPS function 103k and (iii) the shared key K3 102k-3 derived above with the KEM ENCAPS function 103k'. For the embodiments described in the sentence above, the security of a system 100a can be increased because the fourth symmetric ciphering key S4 can require the successful use by server 111 of SK.server 103b, ePK.device 101h, PK.device 101a, and eSK.server 103i.

Server 111 can decrypt the sixth symmetric ciphertext symm-C6 102s-6 into a plaintext value for data.device 234a. Server 111 and network 103 can process the plaintext data.device 234a and generate data.server 106b in response to the data.device 234a. Server 111 can encrypt the data-.server 106b into a seventh symmetric ciphertext symm-C7 102s-7 using the mutually derived fourth symmetric ciphering key S4. Server can send device 101 a message 124 with the seventh symmetric ciphertext symm-C7 102s-7. Device 101 can receive the message 124 and decrypt the seventh symmetric ciphertext symm-C7 102s-7 using the fourth symmetric ciphering key S4 mutually derived by both device 101 and server 111.

FIG. 1b

FIG. 1b is a graphic illustration of exemplary electrical components with a device and a server, in accordance with exemplary embodiments. FIG. 1b includes additional details for hardware components within device 101 and server 111, which are also depicted and described above in connection with FIG. 1a. The exemplary electrical components within a computing device of device 101, which could comprise a smartphone, could be assembled in a step 201 as depicted and described in connection with FIG. 2 below. The electrical components within device 101 can include a memory 101m, a processor 101p, a radio 101r, a sensory 101y, an actuator 101z, and a user interface 101w. As depicted in FIG. 1b, a data bus 101t or a system bus 101t could internally electrically connect the depicted components within a device 101. Additional components to support the operation of device 101 can include a battery to store electrical power, and an antenna to transmit and receive RF signals. The sensor 101y can collect data external or internal to the device 101, such as temperature, motion, position, pressure, etc. A device 101 could also include the actuator 101z to convert electrical signals into physical actions, such as a motor for moving components, a relay for opening or closing a circuit, a speaker for outputting sound, etc.

In exemplary embodiments, the memory 101m depicted and described in connection with FIG. 1a can comprise at least two portions of a volatile or random access memory 101m-1 and a nonvolatile or storage memory 101m-2. The random access memory 101m-1 can comprise memory with relatively faster read and/or write times compared to the nonvolatile memory 101m-2, and could comprise memory supporting formats or electrical connections such as DDR4, DDR3, etc. In general, volatile memory such RAM 101m-1 can be flushed or essentially erased when electrical power is removed or turned off for the RAM 101m-1 component. In general, nonvolatile memory 101m-2 can retain data within the memory when electrical power is removed or turned off for the nonvolatile memory 101m-2 component. Additional details regarding the keys, values, and data stored within RAM 101m-1 and nonvolatile memory 101m-2 are described below for device 101 in this FIG. 1b.

Processor 101p can comprise a central processing unit (CPU) or a "system on a chip" and be similar to a processor 111p for a server 111 described below, but with reduced capabilities for a device 101 compared to a processor 111p for a server 111. A processor 101p can comprise exemplary ARM® based processors or an Intel® based processor such as belonging to the ATOM® family of processors, and other possibilities exist as well. A processor 111p or 101p can include components such as registers, accumulators, and logic elements to add, subtract, multiply, and divide numerical values and record the results in memory as well as read numerical values and strings from memory.

Tamper resistant element (TRE) 113 can comprise a tamper resistant element as described in the GSMA PP Requirements document, titled "iUICC POC Group Primary Platform requirements", Release 1.0 dated May 17, 2017, which is hereby incorporated by reference in its entirety ("GSMA PP Requirements"). TRE 113 can also comprise the secure element as described in the ETSI SSP Requirements document ETSI TS 103 465 V15.0.0 (2019 May) titled "Smart Cards; Smart Secure Platform (SSP); Requirements Specification" ("ETSI SSP Requirements"), which is hereby incorporated by reference in its entirety. Tamper resistant element 113 can comprise a silicon enclave within a tamper resistant chip such as a "system on chip" operating within processor 101p. In addition, processor 103p for network 103 can include a TRE and a primary platform 109.

TRE 113 can include a primary platform (PP) 109, where a primary platform is also described in both the GSMA PP Requirements document and the ETSI SSP Requirements document. TRE 113 could also comprise a "Smart Secure Platform" (SSP) as described in the ETSI SSP Requirements document, such as the SSP depicted in FIG. 2 of the "Architecture" section 9.2.1. Primary platform 109 can comprise a secure operating environment, a secure enclave, a secure element, and include a dedicated processing core within a processor for device 101. Primary platform 109 can also operate in a Trusted Execution Environment (TEE) within a processor for device 101. Primary platform 109 can also comprise a SSP as contemplated by ETSI documents and draft specifications for 5G networks.

TRE 113 and PP 109 can support a variety of applications. TRE 113 can comprise the physical device such as a dedicated processing core or silicon area within a processor 101p in FIG. 1a, and a primary platform 109 can comprise a secure processing environment operating within the TRE 113. With appropriate configured secondary platform bundle, TRE 113 and PP 101 could operate as an "integrated universal integrated circuit card" (iUICC), an "embedded universal integrated circuit card" (eUICC), a secure element for banking applications or payments from mobile phones, an radio-frequency identity (RFID) card, a secure bootstrap environment for device 101, a virtual key for cars or door locks, an secure environment for recording an identity and secret or private keys for drivers licenses, passports, online or web-site access, etc.

For some exemplary embodiments, the steps and data processing conducted by device 101 to establish a secure session such as the steps and data processing depicted and described for a device 101 in FIG. 2 and FIG. 9a and FIG. 9b below can be conducted by a secondary platform bundle operating within a primary platform 109 within a processor 101p.

In other exemplary embodiments, the use of a TRE 113 and PP 109 could be (i) omitted or substituted with similar secure enclave or secure processing environment technology. For these embodiments, the processor 101p within device 101 could perform the steps and data processing depicted and described for a device 101 in FIG. 2 and FIG. 9a and FIG. 9b below without the use of a TRE 113 and PP 109. Note that the use of a TRE 113 and PP 109 could be omitted for some embodiments of a device 101, and the steps and data processing for a device 101 depicted in FIG. 2 and FIG. 9a and FIG. 9b below (as well as subsequent Figures herein) could be conducted using the processor 101p and other depicted electrical components for a device 101.

Device 101 may include radio 101r support radio-frequency (RF) communications with networks including a MNO 102 via standards such as GSM, UMTS, mobile WiMax, CDMA, LTE, LTE Advanced, 5G, and/or other mobile-network technologies. In a wireless configuration, the radio 101r may also provide connectivity to local networks such as 802.11 WLAN, Bluetooth, Zigbee, or an IEEE 802.15.4 network, among other possibilities. In exemplary embodiments, a radio 101r is connected to an antenna, which could be either internal to device 101 or external to device 101. As depicted in FIG. 1b, radio 101r can be used to communicate messages 121, 122, 123, and 124 with a server 111 and network 103. For some embodiments, a device 101 could use a wired physical interface such as Ethernet to communicate with server 111 instead of a radio 101r.

Note that device 101 may also optionally include user interface 101w which may include one or more devices for receiving inputs and/or one or more devices for conveying outputs. User interfaces are known in the art and thus user interfaces are not described in detail here. User interface 101w could comprise a touch screen if device 101 operates as a smartphone or mobile phone. Device 101 can optionally omit a user interface 101w, since no user input may be required for many M2M applications such as networked sensors, although a user interface 101w could be included with device 101. LED lights or a display of LEDs could also comprise a user interface 101w.

A (i) processor 101p and/or TRE 113 for device 101 and (ii) processor 111p for server 111 could include a hardware random number generator 128. The hardware random number generator 128 can use a sensor such as sensor 101y in device 101 (or an equivalent sensor in server 111) to collect environmental noise measurements such as silicon thermal noise, noise values within RAM or nonvolatile memory cells, and other possibilities exist as well for a hardware random number generator 128 to collect noise or environmental data for the processor to calculate a random number. The random number or a secure hash value over the random number (or series of random numbers output from hardware random number generator 128) can be used for a PQC KeyGen step 101q for device 101 or PQC KeyGen step 103q for generating ephemeral PKI key pairs such as ePK/eSK for device 101 and also ePK/eSK for server 111.

As depicted in FIG. 1b, RAM 101m-1 can store the device ephemeral public key ePK.device 101h and device ephemeral private key eSK.device 101i. RAM 101m-1 can also store data used with KEM functions 101k, 101j, 101j', and 101k' depicted in FIG. 1a, such as, but not limited to, the first asymmetric ciphertext C1 102c-1 through the fourth asymmetric ciphertext C4 102c-4, the first symmetric ciphertext symm-C1 101s-1 through the fourth symmetric ciphertext symm-C4 102s-4, the first shared secret key K1 through the fourth shared secret key K4, as well as the first symmetric ciphering key S1 210b (depicted in FIG. 3 below) through the fourth symmetric ciphering key S4 231b (depicted in FIG. 6 below). By storing the data within RAM memory 101m-1, operations with the data can be conducted more efficiently with faster read and write times and also security can be increased, since the values and data do not need to be stored long-term, such as hours or longer after the sequence of message flows for messages 121 through message 124. By not storing data associated with the message flows 121 through message 124 long-term (such as in nonvolatile memory 101m-2), the security of a systems 100a, 100b, and 200 can be increased because the data can be erased or overwritten and not available for a potential attacker to probe or attempt to read at a later time.

As depicted in FIG. 1b, nonvolatile memory 101m-2 can store data for device 101, such that device 101 could conduct the KEM functions 101k, 101j, 101j', and 101k' multiple times over the lifetime of device 101. Specific data for a particular or current instance of a sequence of KEM functions can reside in RAM 101m-1, such that the data is available to a processor 101p during the particular instance of the KEM functions. The data stored or recorded in nonvolatile memory can include the device static private key SK.device 101v, device cryptographic algorithms 101s, device cryptographic parameters 101x, device KEM parameters 101f, a device certificate 101c (which can include a device static public key PK.device 101a and ID.device 101d), the device static private key SK.device 101v, device extensions 101g, multiple PQC KeyGen functions 101q, the server static public key PK.server 103b, server KEM parameters 103f, and KEM functions 101j and 101k (as well as 101j' and 101k').

A server 111 operating within network 103 can include server hardware depicted in FIG. 1b comprising random access memory (RAM) 111m, storage memory 111b, at least one system bus 111c, at least one network interface 111d, and at least one processor 103p. For a server 111 operating in a network 103, server 111 can include at least one processor 111p in order to store and record data as well as communicate with other nodes over an IP network 107, such as device 101 through an IP network 107. Processor 111p can also be referred to as a central processing unit (CPU) 111p. Processor 111p can comprise a general purpose processor appropriate for the computational requirements for a server 101, and may operate with multiple different processor cores, including field programmable gate arrays (FPGA).

A processor 111p can comprise exemplary ARM® based processors or an Intel® based processor such as belonging to the XEON® family of processors, and other possibilities exist as well. Processor 111p can utilize the system bus 111c to fetch instructions from RAM memory 111m or storage memory 111b within a server 111 and operate on the instruction. A processor 111p or 101p can include components such as registers, accumulators, and logic elements to add, subtract, multiply, and divide numerical values and record the results in memory. In exemplary embodiments, at least one processor 101p within server 111 can be used to conduct the steps and message flows depicted in FIG. 2 below, as well as the steps for a server 111 in FIG. 10 below.

RAM 111a may comprise a random access memory for Server 111. RAM 111a can be a volatile memory providing rapid read/write memory access to processor 111p. RAM 111a could be located on a separate integrated circuit in server 111. The system bus 111c may be any of several types of bus structures including a memory bus or memory controller, a peripheral bus, and a local bus using any of a variety of bus architectures including a data bus. System bus 111c connects components within server 111, such as transferring electrical signals between the components illustrated for a server 111. Server 111 can include multiple different versions of bus 111c to connect different components, including a first system bus 111c between CPU 111p and RAM 111a (which could be a memory bus), and a second system bus 111c between CPU 111p and network interface 111d, which could be a SPI bus, a PCI bus, or similar data busses.

Server 111 may also operate a WAN network interface 111r, where WAN network interface 111r can be used to connect and communicate with other nodes such as depicted in FIG. 1a and also FIG. 2 below. WAN network interface 111r can comprise a physical interface connected to system bus 111c for server 111. In exemplary embodiments, WAN network interface 111r can comprise an Ethernet or fiber optic wired connection for communication over a wide area network. WAN network interface 111d can connect server 111 to plurality of computing devices and other servers through networks such as the globally routable public Internet. As depicted in FIG. 1b, WAN network interface 111r can be used to communicate messages 121, 122, 123, and 124 with a device 101.

Server 111 may also operate a LAN network interface 111d, where LAN network interface 111d can be used to connect and communicate with other nodes within network 103, such as, but not limited to, a network database 244. LAN network interface 111d can comprise a physical interface connected to system bus 111c for server 111. In exemplary embodiments, LAN network interface 111d can comprise an Ethernet or fiber optic wired connection for communication over a local area network. For some embodiments, the LAN network interface 111d for server 111 can be combined with the WAN network interface 111r, such that the same LAN network interface 111d can communicate with both device 101, and other servers or nodes within a network 103.

Nonvolatile memory 111b or "storage" 111b (which can also be referred to herein as "storage memory 111b") within server 111 can comprise a non-volatile memory for long-term storage of data, including times when server 111 may be powered off. Storage memory 111b may be a NAND flash memory or a NOR flash memory and record firmware for server 111, such as a bootloader program and an operating system. Storage memory 111b can record long-term and non-volatile storage of data or files for server 111. In exemplary embodiments, the network identity 103a is recorded in storage memory 111b when server 111 is powered off, and the network identity 103a is moved or copied by CPU 111p into RAM 111a when server 111 powers on. Additional details regarding the keys, values, and data stored within RAM 111a and nonvolatile memory 111b are described below for server 111 in this FIG. 1b.

Storage memory 111b can operate as a traditional hard disk drive or a solid state drive (SSD), or as a storage area network (SAN). Storage memory 111b can also comprise a plurality of spinning hard disk drives in a redundant array of independent disks (RAID) configuration. Storage memory 111b may also be referred to as "server storage" and can include exemplary file systems of FAT16, FAT 32, NTFS, ext3, ext4, UDF, or similar file systems. As contemplated herein, the terms "memory 111b", "storage memory 111b", and "nonvolatile memory 111b" can be considered equivalent.

As depicted in FIG. 1b, RAM 111a can store the server ephemeral public key ePK.server 103h and server ephemeral private key eSK.server 103i. RAM 111a can also store data used with KEM functions 103j, 103k, 103k', and 103j' depicted in FIG. 1a, such as, but not limited to, the first asymmetric ciphertext C1 102c-1 through the fourth asymmetric ciphertext C4 102c-4, the first symmetric ciphertext symm-C1 101s-1 through the fourth symmetric ciphertext symm-C4 102s-4, the first shared secret key K1 through the fourth shared secret key K4, as well as the first symmetric ciphering key S1 210b (depicted in FIG. 3 below) through the fourth symmetric ciphering key S4 231b (depicted in FIG. 6 below). By storing the data within RAM memory 111a, operations with the data can be conducted more efficiently with faster read and write times and also security can be increased, since the values and data do not need to be stored long-term, such as hours or longer after the sequence of message flows for messages 121 through message 124. By not storing data associated with the message flows 121 through message 124 long-term (such as in nonvolatile memory 111b), the security of a systems 100a, 100b, and 200 can be increased because the data can be erased or overwritten and not available for a potential attacker to probe or attempt to read at a later time.

As depicted in FIG. 1b, nonvolatile memory 111b can store data for server 111, such that server 111 could conduct the KEM functions 103j, 103k, 103k', and 103j' multiple times over the lifetime of server 111. Specific data for a particular or current instance of a sequence of KEM functions can reside in RAM 111a, such that the data is available to a processor 111p during the particular instance of the KEM functions. The data stored or recorded in nonvolatile memory can include the server static private key SK.server 103b, server cryptographic algorithms 103s, server cryptographic parameters 103x, server KEM parameters 103f, a server certificated cert.server 103c, a device certificate cert-.device 101c, a device static public key PK.device 101a, a device identity ID.device 101d, server extensions 103g, a server static public key PK.server 103d, and KEM functions 103j and 103k (as well as 103j' and 103k').

For some exemplary embodiments, some depicted data for storage memory 111b of server 111 could be stored or recorded in a secure server 111' instead of storage memory 111b of server 111, in order to increase the security of systems 100a, 100b, and 200. An exemplary secure server 111' within a network 103 and communicating with a server 111 is depicted and described in connection with FIG. 2 below. For these embodiments, the server static private key of SK.server 103b could be stored within the secure server 111', and the secure server 111' could conduct the KEM DECAPS function 101k for a step 214 as depicted and described in connection with FIG. 1a above and also FIG. 2 below. Server 111 could communicate with the secure server 111' using the LAN interface 111d. In this manner, the server static private key SK.server 103b does not need to be stored on the same server 111 that connects with a globally routable IP network 107 and communicates with multiple devices 101 through the public IP network 107.

FIG. 2

Figure 2:
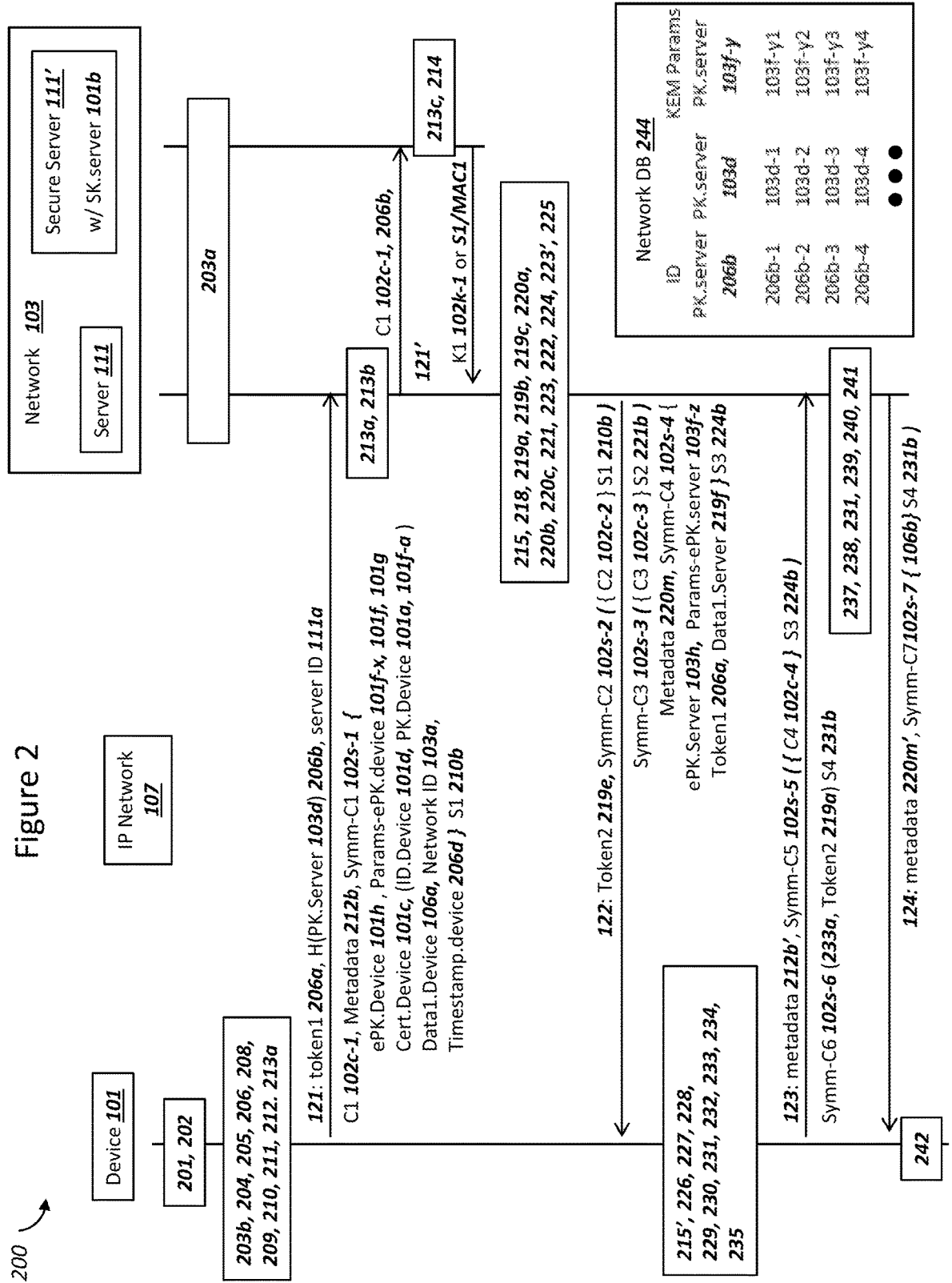
FIG. 2 is a simplified message flow diagram illustrating an exemplary system with exemplary data sent and received by a device and a network, in accordance with exemplary embodiments.

FIG. 2 is a simplified message flow diagram illustrating an exemplary system with exemplary data sent and received by a device and a network, in accordance with exemplary embodiments. System 200 can include a device 101, IP network 107, a network 103, and a server 111 operating within network 103. System 200 can also include a network database 244 for storing data pertaining to devices 101 and network 103 and server 111. Some exemplary embodiments, a network 103 could include both a server 111 and a secure server 111', where the secure server 111' both (i) stores the server static private key SK.server 103b corresponding to the server static public key PK.server 103d stored by device 101, and (ii) conducts the KEM DECAPS function 214 instead of server 111 conduction the KEM DECAPS function 214 as depicted in FIG. 1a. In exemplary embodiments, secure server 111' can include hardware components equivalent to server 111 as depicted and described in connection with FIG. 1b above. Secure server 111' can also be referred to herein as server 111'. Note that server 111 can comprise a server that is also secure, but the use of secure server 111' in a system 200 can further increase the security of a network 103 by (i) placing the server static secret key SK.server 103b and (ii) conducting a KEM DECAPS function 103j within the secure server 111'.

The nodes or entities within system 200 were also depicted and described in connection with FIG. 1a and FIG. 1b above, where FIG. 2 depicts exemplary steps for the nodes and exemplary message flows between the nodes. Although a single device 101, IP network 107, and network 103 are depicted in a system 200, a system 200 could include a plurality of each of the depicted nodes connected via different IP networks 107. In addition, data recorded for device 101 and network 103 depicted and described above in FIG. 1a and FIG. 1b can be received and stored in the device 101 and network 103 depicted in FIG. 2 during the steps and message flows depicted in FIG. 2.

At step 201, device 101 could be manufactured. The electrical components depicted for device 101 in FIG. 2 could be assembled and connected, such as (i) mounting both RAM memory for device 101 memory 101m onto a circuit board and then also (ii) mounting flash memory or storage memory for device 101 memory 101m onto a circuit board for device 101. For some embodiments, RAM memory for device 101 memory 101m can be included within a processor 101p. Sensors 101y and actuators 101z could be connected to a device 101 in a step 201 as well. Some firmware could be loaded into device 101 at a step 201, such as storing a boot loader firmware within nonvolatile memory 101m-2 from FIG. 1b in order for device 101 to being operating after power up. Some drivers could be loaded or stored within device 101 at a step 201 as well.

At step 202, firmware and software can be stored or recorded in device 101 during manufacturing or a device distribution step. The firmware and software can be stored within nonvolatile memory 101m-2 or storage memory for memory 101m within device 101. The firmware and software can include device drivers used by processor 101p within device 101. Memory 101m may include a flash memory and record firmware and/or an operating system for device 101. Memory 101m can record or store long-term and non-volatile storage of data or files for device 101. Device 101 could also be distributed to end users during a step 202 after the loading of firmware and configuration data for device 101.

In an exemplary embodiment, an operating system with configuration settings is recorded in nonvolatile memory 101m-2 in a step 202. The operating system can include device cryptographic algorithms 101s and device cryptographic parameters 101x, where device cryptographic algorithms 101s and device cryptographic parameters 101x were depicted and described in connection with FIG. 1a above. Note that the set of parameters Device.PQC-KEM.Parameters 101f as first subset of device cryptographic parameters 101x can be stored in device 101 at a step 202. Exemplary Device.PQC-KEM.Parameters 101f are also depicted and described in connection with FIG. 8 below. The firmware, operating system, and application software loaded in device 101 in a step 202 can include machine executable instructions for processor 101p in order for processor 101p to conduct the subsequent series of steps and message flows depicted for device 101 in FIG. 2 and also subsequent figures below. For some exemplary embodiments, the server static public key of PK.server 103d and associated parameters of params-PK.server 103f-y can be stored in device 101 in a step 202. For some exemplary embodiments, the device static private key of SK.device 101v and associated parameters of 101f-a can be stored in device 101 in a step 202, along with PK.device 101a.

A step 202 can include device 101 selecting a protocol for establishing a secure session with a network 103. As contemplated herein, a secure session can comprise communications between device 101 and network 103 where the data is both encrypted and at least authenticated using static PKI key pairs for both device 101 (e.g. keys 101a/101v) and server 111 (e.g. keys 103d/103b). In preferred exemplary embodiments, the encryption of data between device 101 and network 103 supports forward secrecy through the use of ephemeral PKI key pairs. The secure session could support any of TLS, DTLS, SSH, a VPN, IPSec, and other protocols are possible as well without departing from the scope of the present disclosure. For some embodiments, the secure session could support download of firmware for an Open Firmware Loader, equivalent to the GlobalPlatform OFL standard, but supporting PQC algorithms and security.

A step 202 can include device 101 selecting a protocol for establishing secure communications with network 103 and then using subsequent steps and message flows as depicted herein in order to conduct the protocol for the secure communications. At a step 203, server 111 and server 111' within network 103 can conduct a step equivalent to a step 202 by device above, where server 111 and server 111' is loaded is an operating system and configuration settings or parameters. The data could be stored within storage memory 111b. Prior to a step 203, the electrical components for a server 111 depicted in FIG. 1b above could be assembled.

A network 103 could perform the step 203 for a server 111 and server 111', such as a network administrator connecting to server 111 and server 111' and performing the steps. The operating system and associated application software for server 111 and server 111' can include server cryptographic algorithms 103s and server cryptographic parameters 103x. A step 203a could include server 111 and server 111' loading and operating a server package for processing secure sessions and messages such as OpenSSL, BouncyCastle, Secure Shell (SSH), an IP Security (IPSec) server, a VPN, and other possibilities exist as well for the server packages and application software loaded in a step 203a. In exemplary embodiments, server 111 and server 111' conducting the steps in FIG. 2 can comprise a virtual server operating on a host server, where the host server includes computing hardware for a server 111 as depicted and described in connection with FIG. 1b above.

Note that the set of parameters Server.PQC-KEM.Parameters 103f as first subset of server cryptographic parameters 103x can be stored in server 111 at a step 203a. Exemplary Server.PQC-KEM.Parameters 103f are also depicted and described in connection with FIG. 8 below. The firmware, operating system, and application software loaded in server 111 in a step 203 can include machine executable instructions for processor 111p in order for processor 111p to conduct the subsequent series of steps and message flows depicted for server 111 in FIG. 2 and also subsequent figures below. The software or firmware loaded in a step 203a can include host software or firmware for server 111 to conduct the subsequent steps depicted herein, such as received and processing a Transport Layer Security (TLS) "client hello" message for message 121, processing and sending a TLS "server hello" message for message 121, etc.

At step 203a, server 111 can also load the server cryptographic algorithms 103s with a server process for conducting transport layer security such as TLS, where the server process could comprise software such as OpenSSL, Microsoft Server, etc. In addition, although TLS is described as a technology or protocol for a secure session in FIG. 2, other and related protocols could be used as well for processing multiple PQC KEM in the current disclosure with a device 101, including IP Security (IPSec), Datagram Transport Layer Security (DTLS) with UDP messages, Secure Shell (SSH), and other possibilities exist as well.

At step 203a, server application software for a server 111 conducting a secure session with device 101 such as a TLS server could be configured to support the use of a KEM ENCAPS function 103k/103k' and also the KEM DECAPS function 103j/103j', which is depicted and described in connection with FIG. 1a above. Note that the configuration step 203a could also specify a preference for the use of different device cryptographic algorithms 101s for the KEM ENCAPS function 103k/103k' and the KEM DECAPS function 103j/103j'. For some exemplary embodiments, the device static public key of PK.device 101a and associated parameters of 101f-a can be stored in server 111 or a network database 244 in a step 203a.

From a step 202 above, device 101 could record a plurality of server static public keys PK.server 101d with associated KEM parameters 103f-y. In a step 203b, device 101 can select a server static public key PK.server 101d with an associated set of KEM parameters 103f-y. The selection could be based on a protocol for communications used by device 101 and server 111, such as a first protocol specifying or supporting a first set of KEM parameters 103f-y for the first protocol where device 101 selects an associated first server static public key PK.server 101d for the first protocol. A second protocol could specify or support a second set of KEM parameters 103f-y for the second protocol where device 101 selects an associated second server static public key PK.server 101d for the second protocol. Other possibilities exist as well for a device 101 to select KEM parameters 103f-y in a step 203b without departing from the scope of the present disclosure. The first protocol and the second protocol could also specify KEM parameters 101f-x for device 101 to use in deriving and using a device ephemeral PKI key pair of ePK.device 101h and eSK.device 101i. Device 101 could select the KEM parameters 101f-x for device 101 in a step 203b.

At steps 204 through 206, device 101 can begin operating and process data in order to generate a first message 121 for server 111, where the first message 121 could comprise a "Client Hello" message. Steps 204 and subsequent steps in FIG. 2 for device 101 can use the computing hardware in device 101 as depicted in FIG. 1b above, as well as the operating system and stored parameters within device 101 stored in a step 202 above. At step 204, device 101 can power on or wake from a sleep state and then select either a network ID 103a or a server ID 111a for sending a first message 121. The IDs 103a or 111a could comprise domain names or IP addresses for connecting to the network 103. The IDs 103a or 111a could be obtained by a device 101 from (i) a configuration step 202 or (ii) via data written to device 101 during a configuration step 202.

Step 204 can include device 101 selecting device extensions 101g for use with a secure session between device 101 and server 111. In some protocols such as TLS, the device extensions 101g can be referred to as extensions, such the device or client data for the section "4.2—Extensions" within IETF RFC 8446. Device extensions 101g were also described above in connection with FIG. 1a, and can include identifiers or values for supported device cryptographic algorithms 101s and device cryptographic parameters 101x. Device extensions 101g can include supported cipher suites such as names for symmetric ciphering algorithms, secure hash algorithms, digital signature algorithms, etc. Device extensions 101g selected in a step 204 can include an identity for a certificate issuer or certificate authority of supported by device 101. The identity for the certificate issuer can comprise a name or string recorded in a certificate issuer certificate root certificate or possibly an intermediate certificate issuer certificates stored within device 101. A value or field for device extensions 101g processed by device 101 in a step 204 can include a certificate request, such that a "Client Hello" or first message 121 can request certificates and at least one digital signature from server 111 that supports other fields or values in device extensions 101g such as specified supported digital signature algorithms in device cryptographic algorithms 101s in addition to the an identity of a supported certificate issuer by device 101.

At step 204, device 101 can select KEM parameters as a subset of the device cryptographic parameters 101x for conducting a first KEM 101k/103j, where the selected KEM parameters can comprise Device.PQC-KEM.Parameters 101f. An exemplary selected set of KEM parameters Device.PQC-KEM.Parameters 101f are also depicted and described in connection with FIG. 8 below. During a step 204, device 101 could also select a subset of KEM parameters 101f-x from the set of KEM parameters Device.PQC-KEM.Parameters 101f. In other words, at a step 204, the parameters Device.PQC-KEM.Parameters 101f can include different supported families of PQC KEM, such as Kyber, BIKE, SIKE, etc, where the subset of KEM parameters 101f-x can comprise a specific, identified KEM such as one of (i) Kyber-768 or (ii) SIKEp434 or (iii) BIKE security level 3, etc. As discussed above, in exemplary embodiments, the KEM parameters 101f-x can comprise values that meet the following conditions, (i) are a subset of parameters 101f, (ii) are a subset of parameters 103f stored by device 101 and server 111, and (iii) are different than the parameters 103f-y for the server static public key PK.server 103d, which could be stored in device 101 in a step 202 as described above.

At step 204, device 101 can also select a device static public key PK.device 101a (and corresponding private key SK.device 101v) that supports either (i) the selected KEM parameters 101f-x associated with ePK.device 101h, or (ii) a different set of KEM parameters 101f-a. For these embodiments, KEM parameters 101f-a associated with PK.device 101a can be the same as KEM parameters 110f-x selected for the device ephemeral public key ePK.device 101h and device ephemeral private key eSK.device 101i. A certificate of device 101 of cert.device 101c could be selected along with or for the device static public key PK.device 101a in a step 204. Or, for another embodiment, device 101 could store a device static public key PK.device 101a (and corresponding private key SK.device 101v) that support parameters 101f-a. Device 101 could use the steps to select PK.device 101a where the KEM parameters 101f-a comprise values that meet the following conditions, (i) are a subset of parameters 101f, (ii) are a subset of parameters 103f stored by device 101 and server 111, and (iii) are different than the parameters 103f-y for the server static public key PK.server 103d. Device 101 in a step 204 could subsequently in a step 205 below generate an ephemeral PKI key pair that matches the parameters 101f-x used by PK.device 101a and SK.device 101v.

At step 205, device 101 can use a PQC.KeyGen function 101q in FIG. 1a to generate a device ephemeral PKI key pair comprising a device ephemeral public key ePK.device 101h and a device ephemeral private key eSK.device 101i. The algorithm used to generate the ephemeral PKI key pair can be specified in KEM parameters 101f-x selected by device 101 in a step 204 above. In a step 205, the device ephemeral PKI key pair can comprise a key pair supporting key exchange mechanisms specified in Round 3 of the NIST "Post Quantum Cryptography" (PQC) project. Each KEM provides details for a KeyGen function, which could be used for a PQC.KeyGen function 101q in a step 205. The device ephemeral public key ePK.device 101h generated in a step 205 can comprise the value of "Key Share" within a "Client Hello" message for a first message 121 below.

At step 206, device 101 can also generate a first token token1.device 206a. For some embodiments, token1.device 206a can include or comprise a random number. Token1.device 206a could also include other data such as a sequence number for communication at the transport or application layer between device 101 and network 103. Token1.device 206a could also include a session identity in order for device 101 and network 103 to track the session or sequence of communication between device 101 and network 103. At step 206, device 101 can also select or process an identity for the server static public key of PK.server 103d, such that server 111 can determine both (i) which server static public key PK.server 103d is stored and used by device 101, and (ii) the associated server static private key SK.server 103b in order to use with a first message 121 received from device 101. For some embodiments as depicted in FIG. 2, the identity of the server static public key of PK.server 103d can comprise a secure hash value of H(PK.server 103d) 206b. For these embodiments, the secure hash can use RIPEMD with a length of 160 bits.

Other values for the identity of the server static private key SK.server 103b could be used as well and a secure hash value of the PK.server 103d is not required. For example, any unique identification value or number or string associated either with device 101 or the PK.server 103d stored by device 101 could be selected by device 101 in a step 206, and the unique identification value could be included in a message 121 below and server 111 could use the unique identification value with a database 244 in order to select a server static private key 103b and parameters 103f-y in order to process the message 121.

At step 206, device 101 can also process data1.device 106a, which could comprise at least one of several different possible data sets for device 101. The possible different data sets for data1.device 106a can include a registration message for device 101, parameters 101g used by device 101, firmware or configuration settings for device 101 including values for sensor 101y and actuator 101z, and other possibilities exist as well for data1.device 106a without departing from the scope of the present disclosure. At step 206, device 101 can also generate a timestamp 206d, which can be useful for both (i) sending to server 111 and (ii) increasing resistance to replay attacks. In exemplary embodiments, device 101 can obtain a reasonably accurate time (such as to within a few seconds of a certified time source) from (i) system information blocks (SIB) transmitted by a wireless network that device 101 connects with via radio 101r and/or (ii) conducting an authenticated "network time protocol" (NTP) query before sending a message to network 103.

At step 208, device 101 can derive or generate a random number M1 208a for use in a first KEM 101k/103j between device 101 and server 111. At step 209, device 101 can use both (i) the stored server static public key of PK.server 103d and (ii) the specified subset of KEM parameters 103f-y for the server static public key and the first KEM 101k/103j in order to generate both (x) a first asymmetric ciphertext C1 102c-1 and (y) a first shared secret key K1 102k-1. At step 209, device 101 can use a KEM ENCAPS function 101k with both (i) and (ii) from the previous sentence as well as M1 208a in order to generate both (x) a ciphertext C1 102c-1 and (y) a first shared secret key K1 102k-1. A summary of the step 209 by device 101 with a KEM ENCAPS function 101k was also depicted and described in connection with FIG. 1a above. A device 101 can use both device cryptographic algorithms 101s and device cryptographic parameters 101x along with the subset of KEM parameters 103f-y in order to conduct the step 209. The function and use of a step 209 and a KEM ENCAPS function 101k is also depicted and described in FIG. 3 below.

At step 210, device 101 can use a hash-based key derivation function or an HMAC-based Extract-and-Expand Key Derivation Function (HKDF) 210a (depicted and described in FIG. 3 below for a step 210) with at least the first shared secret key K1 102k-1 output from KEM ENCAPS function 101k in order to generate both (i) a first symmetric ciphering key of S1 210b and a first message authentication code (MAC) key MAC1 210c. Note that in some exemplary embodiments, additional data mutually shared between device 101 and server 111 besides the first shared secret key K1 102k-1 can also be input into the HKDF 210a in a step 210 in order to generate S1 210b and MAC1 210c. The additional data input into HKDF 210a in addition to the first shared secret key K1 102k-1 is depicted and described below in connection with a step 210 by device 101 in FIG. 3.

For the embodiments in the previous sentence, the values input into a HKDF 210a along with key K1 102k-1 can be transmitted external to a symmetric ciphertext encrypted with S1 210b and/or MAC 210c. In other words, the plaintext data such as the network ID 103a or a server ID 111a and/or timestamp 206d can be plaintext values sent in a message 121 below and also external to symmetric ciphertext (where they could also be included in the symmetric ciphertext within a message 121). For other embodiments, the input of additional data from a message 121 into a HKDF 210a besides K1 102k-1 could be omitted, and S1 210b and MAC1 210c could be derived from K1 102k-1 without including plaintext data from message 121 into HKDF 210a in a step 210. The function and use of a step 210 using output from KEM ENCAPS function 101k of at least K1 102k-1 and a HKDF 210a is also depicted and described in FIG. 3 below.

At step 211, device 101 can select and process a plaintext 211a for encryption into a first symmetric ciphertext symm-C1 102s-1. A step 211 is also depicted and described in connection with FIG. 3 below. Note that the first asymmetric ciphertext C1 102c-1 could be previously output from the KEM ENCAPS function 101k (where device 101 uses the first asymmetric ciphertext C1 102c-1 for the first KEM 101k/103j). In other words, (i) a first asymmetric ciphertext C1 102c-1 can be used with asymmetric ciphering and a KEM and (ii) a first symmetric ciphertext symm-C1 102s-1 can be used with symmetric ciphering and mutually derived symmetric ciphering keys such as S1 210b and MAC1 210c (which are depicted and described below in connection with FIG. 3 for a step 211).

In exemplary embodiments the data or values for the plaintext 211a selected in a step 211 can include the device ephemeral public key of ePK.Device 101h, the associated parameters for the device ephemeral public key of params-ePK.device 101f-x, the set of KEM parameters 101f supported by device 101, device extensions 101g described above in FIG. 1a, the device certificate of cert.device 101c, the device static public key PK.device 101a with KEM parameter 101f-a, an identity of device ID.Device 101d, initial device data data1.device 106a described above in connection with a step 206, an identity of the network 103 of network ID 103a, and a timestamp.device 206d. Note that some data could be omitted from a plaintext 211a in a step 211, such as the data could be external to plaintext 211a and included by device 101 in a message 121 below outside of a first symmetric ciphertext symm-C1 102s-1. In exemplary embodiments, at least the device ephemeral public key of ePK.Device 101h and the initial device data data1.device 206a can be included in plaintext 211a. Additional data could be included in plaintext 211a or some data listed above could be omitted from plaintext 211a without departing from the scope of the present disclosure. The exemplary use of a plaintext 211a selected in a step 211 is depicted and described in connection with FIG. 3 below.

For embodiments where server 111 can store the device static public key PK.device 101a before device 101 sends the message 121, such as with a step 203a, the PK.device 101a and/or a certificate of device cert.device 101c can be omitted from a plaintext 211a. For embodiments there server 111 does not store the device static public key PK.device 101a before device 101 sends the message 121, the PK.device 101a and/or a certificate of device cert.device 101c with PK.device 101a can be included in the plaintext 211a, and the parameters 101f-a for the PK.device 101a can be included in the plaintext 211a as well. In this manner, server 111 (which may not record or store PK.device 101a before device 101 sends a message 121), then server 111 can know what parameters 101f-a to use with the PK.device 101a.

At step 212, device 101 can use symmetric encryption 212a with the plaintext 211a from a step 211 in order to generate the first symmetric ciphertext symm-C1 102s-1. A step 212 is also depicted and described in connection with FIG. 3 below. The symmetric encryption 212a can be included within device cryptographic algorithms 101s for device 101. The symmetric encryption 212a can include input of the parameters specified in metadata 212b, which can be a selected subset of device extensions 101g described above. In other words, device extensions 101g can support a range of parameters for device 101 and metadata 212b can be the specific subset for the operation of symmetric encryption 212a. As depicted for a step 212 below, symmetric encryption 212a can also use the symmetric ciphering key S1 210b and MAC key MAC1 210c from a step 210 above. In a step 212, device 101 can also use an initialization vector for the symmetric encryption 212a, where the initialization vector can be included with metadata 212b or derived from HKDF 210a.

After the conclusion of a step 212 by device 101, device 101 can then conduct a step 213a to process a first message 121 as depicted in FIG. 2. A step 213a can use firmware or application software within device 101 in order to perform steps as specified in a protocol for a secure session or secure communications between device 101 and network 103. For some embodiments, the first message 121 can comprise a "Client Hello" message according to the protocol for the secure session selected by device in a step 204. Device 101 can send a first message 121 to the server 111 operating in network 103 in a step 213a. A domain name for server 111 or an IP address for server 111, such as a server ID 111a, could be stored in device 101 at a step 205. A step 201f can comprise processor 101p writing the data for the first message 121 to a radio 101r (or equivalently a network interface if device 101 does not include a radio 101r).

Figure 3:
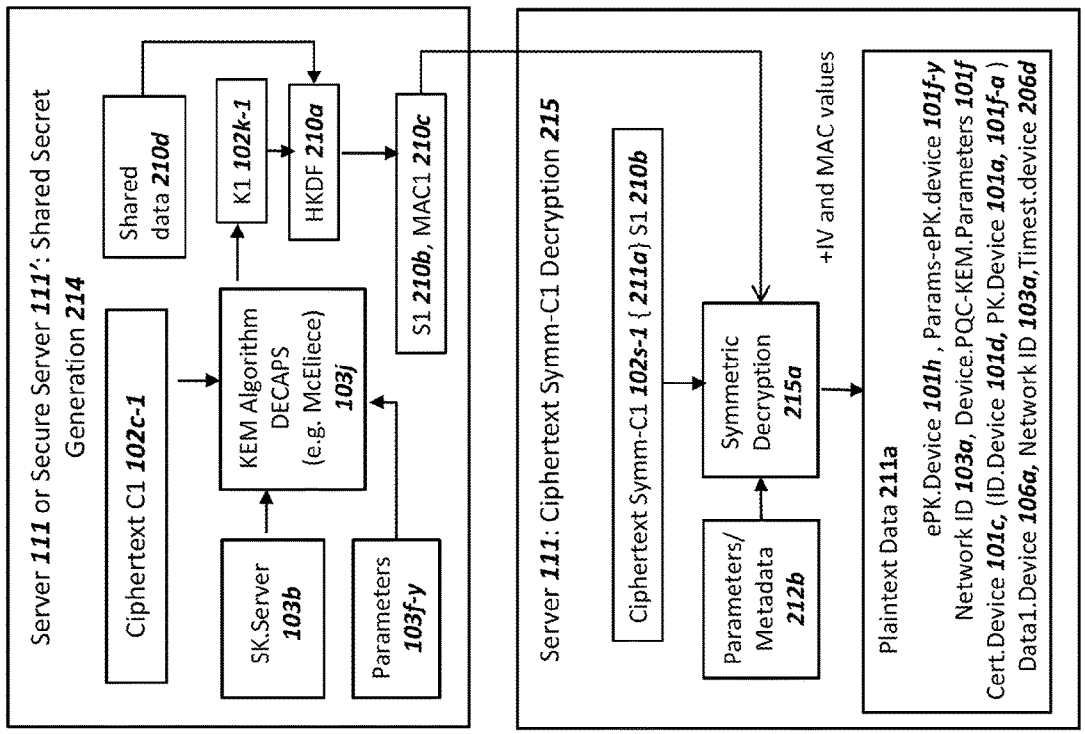
FIG. 3 is a flow chart illustrating exemplary steps for a device and server conducting (i) a key encapsulation mechanism to mutually derive a symmetric ciphering key, and (ii) symmetric ciphering using the derived symmetric ciphering key, in accordance with exemplary embodiments.
Figure 3:
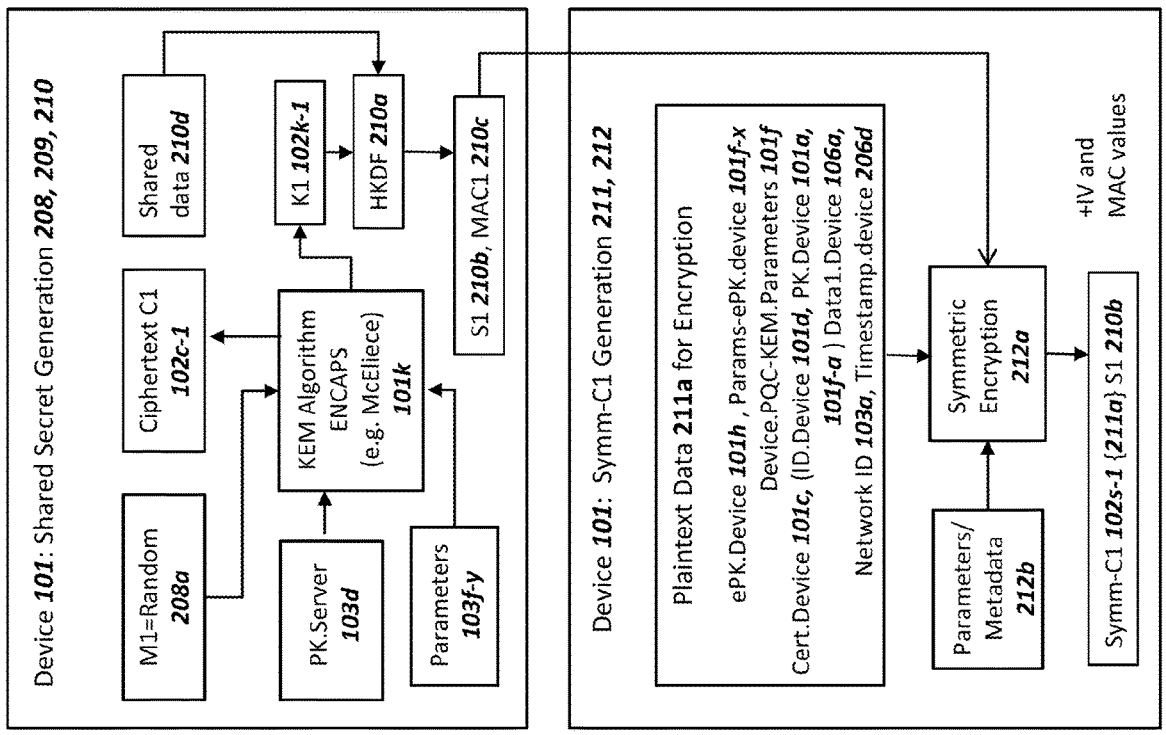

As depicted in FIG. 2, the first message 121 from device 101 to server 111 can include a server ID 111a, the first token token1.device 206a, an identity 206b of the server static public key PK.server 103d. For the embodiment depicted in FIG. 2, the identity of the server static public key PK.server 103d can be a secure hash value H(103d), although other unique identity values could be used as well. Server 111 or network 103 can use the unique identity values to select a server static private key SK.server 103b and parameters 103f-y from a database 244 in order to conduct a KEM DECAPS function 103k. The first message 121 can also include the first asymmetric ciphertext C1 102c-1, metadata 212b associated with symmetric encryption 212a (as depicted in FIG. 3), and the first symmetric ciphertext symm-C 1102s-1. Note that the metadata 212b can include plaintext values for a MAC code using MAC1 210c (from FIG. 3 below). The metadata 212b can also include an initialization vector, or the initialization vector could be derived by a HKDF over at least a first shared secret key K1 102k-1. Message 121 can include headers or values specifying the message is for a first message or "Client Hello" according to the secure session protocol selected by the device 101.

Server 111 can receive the first message 121 via a WAN interface 111r in server 111 (depicted for server 111 in FIG. 1b above). Server 101 can use application software such as, with server cryptographic algorithms 103s and server cryptographic parameters 103x and processor 111p to process the received first message 121. The depicted ciphertext of C1 102c-1 includes sufficient data for server 111 or network 103 to use the C1 102c-1 with the KEM DECAPS 103j function to generate the first shared secret key K1 102k-1. The depiction of brackets such as "{ } S1 210b" in FIG. 2 for the first symmetric ciphertext symm-C1 102s-1 in message 121 indicates the data within the brackets is encrypted with at least the shared symmetric ciphering key S1 210b, and the shared symmetric ciphering key S1 210b is not transmitted in message 121. Likewise, the designated symmetric ciphering keys with brackets "{ }" depicted in FIG. 2 and FIG. 1a above depict the data is encrypted with the symmetric ciphering keys and the symmetric ciphering keys are not transmitted with the encrypted data. Although the use of MAC keys is not depicted in FIG. 2 and FIG. 1, encrypted data using symmetric ciphering keys such as the key S1 210b could also include a corresponding MAC key MAC1 210c.

At step 213b, server 111 can conduct a first step to process the first message 121. Server 111 can confirm the first message 121 is supported by server 111 using at least the identity of the server static public key PK.server 103d stored by device 101. In exemplary embodiments, a server 111 or network 103 can include a network database 244 as depicted in FIG. 2 and conduct the step 213b using the network database 244. For embodiments where network 103 includes network database 244 external to server 111, then server 111 can communicate with a network database 244 via LAN network interface 111d.

Network database 244 can include a plurality of values for (i) the identity of the server static public key ID-PK.server 206b (which can comprise a secure hash over the server static public key in some embodiments), (ii) the associated server static public key PK.server 103d for the identity, and (iii) the KEM parameters 103f-y associated with the server static public key PK.server 103d. Although not depicted for a network database 244 in FIG. 2, a network database 244 can also include the associated server static private key SK.server 103b for the server static public key PK.server 103d. For some embodiments, the network database 244 could also include a device static pubic key PK.device 101 along with a device identity ID.device 101d. For embodiments where message 121 does not include device static public key PK.device 101a and includes device identity ID.device 101*d*, then server 111 could select in a step 213*a* could select from a network database 244 or another server within network 103 the device static public key PK.device 101*a*.

At step 213*b*, server 111 can use the identity of the server static public key 206*b* or a server identity of 111*a* from a message 121 to select a secure server 111', where secure server 111' stores and performs calculations and KEM function 103*k* with the server static private key SK.server 101*b* for the server static public key PK.server 101*d* associated with the identity of the server static public key 206*b*. As noted above, secure server 111' could be connected to server 111 through a LAN network interface 111*d* within network 103, where device 101 may not be able to communicate with secure server 111' directly (e.g. send a message 121 to secure server 111'). As depicted in FIG. 2, server 111 can then send secure server 111' a message with at least both (i) the first asymmetric ciphertext C1 102*c*-1 and (ii) identification information for the server static public key 206*b*, and both (i) and (ii) can be received from device 101 in a message 121. Secure server 111' can receive the message from server 111 of both (i) the first asymmetric ciphertext C1 102*c*-1 and (ii) identification information for the server static public key 206*b*. For some embodiments, identification information for the device 101 could be received as plaintext in a message 121 and the identification information for the device 101 could be sent in the message from server 111 to secure server 111'. For embodiments where secure server 111' uses a HKDF 210*a* as depicted and described in FIG. 3 below for a step 214, then server 111 could also send secure server 111' data from the message 121 in order for secure server 111' to use the data with the HDKR 210*a* (such as data 121' depicted and described in connection with FIG. 3 below).

At step 213*c*, secure server 111' can use either (a) the identification information for the server static public key 206*b* or (b) identification information for device 101 from the message from server 111 in order to select (i) the server static public key PK.server 103*d*, (ii) server static private key SK.server 103*b* from the network database 244 and (iii) to KEM parameters 103*f-y* for the server static PKI key pair. For some embodiments, the secure server 111' use the data (a) and/or (b) from the previous sentence to select the data (i) through (iii) in the previous sentence from the network database 244. Note that for some exemplary embodiments, the KEM parameters 103*f-y* (or an identifier for the KEM parameters 103*f-y*) for the server static public key PK.server 103*d* can be sent as plaintext in the message 121 and also received from server 111. In some preferred exemplary embodiments, the PK.server 103*d* stored in device 101 can comprise a public key for the Classic McEliece algorithm, and the corresponding first asymmetric symmetric ciphertext C1 102*c*-1 can be less than approximately 300 bytes. Thus, although with Classic McEliece the server static public key PK.server 103*d* can be large for PKI keys, such as an exemplary 1 MB or larger, the PK.server 103*d* can be distributed to device 101 during a configuration step 202 before device 101 sends a message to network 103 in a system 200. For other embodiments, such as those depicted for KEM parameter options 805 in FIG. 8 below, the server static public key PK.server 103*d* can support PQC KEM parameters and algorithms different than Classic McEliece.

At step 214, secure server 111' can use (i) the KEM parameters 103*f-y* determined from message 121 in a step 213*b* along with (ii) server cryptographic algorithms 103*s* to conduct the KEM DECAPS 103*j* function with the received first asymmetric ciphertext C1 102*c*-1. The server 111 can use the server static private key of SK.server 103*b* with the KEM DECAPS 103*j* and the received first asymmetric ciphertext C1 102*c*-1 in order to generate the first shared secret key K1 102*k*-1. A step 214 for server 111 is also depicted and described in connection with FIG. 4 below. Note that for some PQC algorithms, the KEM DECAPS 103*j* function could fail for a small frequency of messages 202 and 213, such as less than one failure per million or billion KEM messages or ciphertext C1, and if a step 214 fails, then secure server 111' could notify server 111 and server 111 could send device 101 an error message and then return to a step 213*b* to receive the generation of a different message 121.

A step 214 can also include secure server 111' using the first shared secret key K1 102*k*-1 with the HKDF 210*a* (depicted in FIG. 3 below) in order to generate the first symmetric ciphering key S1 210*b* and the first MAC key MAC1 210*c*. Note that the HKDF 210*a* can also include input data from message 121 in addition to the first shared secret key K1 102*k*-1, which is also depicted and described for the step 214 below in FIG. 4. For embodiments described in the previous sentence, then the message from server 111 to secure server 111' could include the additional data 121' from message 121. The data input into HKDF 210*a* by secure server 111' and device 101 (in step 210 above) would be identical in exemplary embodiments in order for the HKDF 210*a* to output the same values for device 101 and server 111. At the conclusion of a step 214, secure server 111' can send at least the first symmetric ciphering key S1 210*b* and first MAC key MAC1 210*c* to server 111, which are mutually and secretly shared between server 111 and device 101. As depicted in the message from secure server 111' to server 111, the message could alternatively include the first shared secret key K1 102*k*-1 output from KEM DECAPS 103*j* in a step 214. For the embodiment described in the previous sentence, then server 111 could conduct the HKDF 210*a* depicted and described in connection with FIG. 3 in order to generate the first symmetric ciphering key S1 210*b* and first MAC key MAC1 210*c*.

A step 214 can include secure server 111' (or server 111 for embodiments where server 111 stores the SK.server 101*b*) calculating two values for the first symmetric ciphering key S1 210*b*, where a first S1 210*b*-1 can be for use by server 111 for symmetric decryption of symmetric ciphertext data received from device 101 into plaintext data. A second S1 210*b*-2 can be for use by server 111 for symmetric encryption of plaintext data for device 101 into ciphertext data. The first S1 210*b*-1 can be used by server 111 to decrypt data using the key "S1" from device 101 in a message 121, and the second S1 210*b*-2 can be used by server 111 to encrypt data using the key "S1" sent to device 101 in a message 122. In a step 210 above for device 101, the device 101 could also likewise derive two different values for the key S1 comprising the first S1 210*b*-1 for encrypting data in a message 121 using "S1" and the second S1 210*b*-2 for decrypting data from server 111 in a message 122. Likewise, server 111 in a step 214 can generate two values for MAC key MAC1 210*c*, where the first MAC1 is used by server 111 to verify MAC codes from device 101 and the second MAC1 is used by server 111 to generate MAC codes for device 101. A device 101 can likewise use the HKDF 210*a* to generate all of the same first S1 210*b*-1, the second S2 210*b*-2, the first MAC1 203-1 and the second MAC 210*c*-2.

In the exemplary embodiment for the step 215 below for server 111, the server 111 can use the first S1 210*b*-1 for decryption of symm-C1 102*s*-1, and for the step 223 below server 111 could use the second S1 210*b*-2 for encryption of the second asymmetric ciphertext C2 102*c*-2. In other words, although the present disclosure uses the term "first symmetric ciphering key S1 210*b*", the "first symmetric ciphering key S1 210*b*" output from a HKDF 210*a* in a step 214 can comprise two components of key S1 210*b*-1 for symmetric encryption by device 101 and key S1 210*b*-2 for symmetric encryption by server 111. Likewise, the server 111 can output from the same HKDF 210*a* the key S1 210*b*-1 for symmetric decryption by server 111 and the key S1 210*b*-2 for symmetric decryption by device 101. Thus, in exemplary embodiments and as contemplated herein, the term "symmetric ciphering key S1 210*b*" can comprise two related keys of S1 210*b*-1 and S1 210*b*-2. Other symmetric ciphering keys mutually derived herein can include two components of a first portion of the key for encryption by one node (and decryption by the other node) and a second portion of the key for encryption by the other node (and encryption by one node).

At step 215, server 111 can use symmetric decryption 215*a* with the first symmetric ciphertext symm-C1 102*s*-1 from a message 121 in order to read the plaintext 211*a*. A step 215*a* is also depicted and described in connection with FIG. 3 below. The symmetric decryption 215*a* can be included within server cryptographic algorithms 103*s* for server 111. The symmetric decryption 215*a* can include input of the parameters specified in metadata 212*b* from a message 121 and the first symmetric ciphering key S1 210*b* and MAC key MAC1 210*b* from a step 214 above.

At step 218, server 111 can verify the device certificate cert.device 101*c* using (i) server cryptographic algorithms 103*s* and (ii) a trusted root or intermediate certificate issuer certificate stored within server 111. In this manner, server 111 can confirm the cert.device 101*c* is signed by a trusted certificate issuer. Note that a step 218 can include multiple levels of verifying certificates or digital signatures through a stored root or intermediate certificate in server 111, including determining that cert.device 101*c* has not been revoked. After conducting a verification of device certificate cert.device 101*c*, server 111 can trust the device static public key PK.device 101*a* stored within cert.device 101*c*. For some exemplary embodiments, the use of a device certificate cert.device 101*c* in a message 121 could be omitted, and server 111 could securely receive and store the device static public key PK.device 101*a* along with device identity ID.device 101*d* in storage 111*b* before device 101 sends the message 121. Device 101 could send the message 121 with device identity ID.device 101*d* in the first symmetric ciphertext symm-C1 102*s*-1. Server 111 could select the PK.device 101*a* to use with device 101 based on the device identity ID.device 101*d* received.

At step 219*a*, server 111 can validate that the device ephemeral public key ePK.device 101*h* received within message 121 and plaintext 211*a* is properly structured and consistent with KEM parameters 101*f*-*x*. The device ephemeral public key ePK.device 101*h* can also be referred to as a key share. For example, if KEM parameters 101*f*-*x* state the key 101*h* supports the Kyber-786 algorithm, then in a step 219 server 111 could at least verify the ePK.device 101*h* is 1184 bytes long and also can be successfully input into a KEM ENCAPS function 103*k* for sever 111. Other possibilities exist as well for verification of ePK.device 101*h* in a step 219 without departing from the scope of the present disclosure.

At a step 219*a*, server 111 can also verify that KEM parameters 101*f*-*x* is supported by Server.PQC-KEM.Parameters 103*f*. In other words, in a step 219*a*, server 111 can determine the received KEM parameters 101*f*-*x* for a second KEM 103*k*/101*j* and ePK.device 101*h* are supported by server 111 by server cryptographic algorithms 103*s* and server cryptographic parameters 103*x*. The first KEM 101*k*/103*j* associated with KEM parameters 103*f*-*y* and PK/SK.server can be for (i) KEM ENCAPS 101*k* by device 101 and (ii) KEM DECAPS 103*j* by server as depicted and described in connection with FIG. 1*a* above. At a step 219*a*, server 111 can also generate a server token token2.server 219*e*, where the server token can comprise a random number issued by server 111 to device 101. The token2.server 219*c* can be used for a session identity and also for input into key derivation functions such as HKDF 221*a* as discussed below.

At step 219*a*, server 111 can also process data1.server 219*f* which could comprise at least one of several different possible data sets for server 111. The possible different data sets for data1.server 219*f* can include a registration response message for device 101 from server 111, parameters 103*g* used by server 111, firmware or configuration settings for device 101 including values for sensor 101*y* and actuator 101*z*, and other possibilities exist as well for data1.server 219*f* without departing from the scope of the present disclosure. For some embodiments, the data within data1.server 219*f* can include configuration data for device 101, such as a secondary platform bundle for PP 109.

In a preferred exemplary embodiment, for a step 219*b*, server 111 can select a fourth set of KEM parameters 103*f*-*z* that are both (i) different than the first set of KEM parameters 101*f*-*x* received in message 121 and (ii) supported by or included within the set of KEM parameters 101*f* also received in a message 121. The selection of a third set of KEM parameters 103*f*-*z* in a step 219*b* is also depicted and described in connection with FIG. 8 below. In summary, for a step 219*b* and in a preferred exemplary embodiment, server 111 selects KEM parameters 103*f*-*z* for a fourth KEM 101*k'*/103*j'* in a step 230 and step 238 below. The first KEM comprises (i) KEM ENCAPS 101*k* by device 101 using PK.server 103*d* and (ii) KEM DECAPS 103*j* by server 111 as depicted and described in connection with FIG. 1*a* above. The second KEM comprises (i) KEM ENCAPS 103*k* by server 111 using ePK.device 101*h* and (ii) KEM DECAPS 101*j* by device 101. The third KEM comprises (i) KEM ENCAPS 103*k'* by server 111 using PK.device 101*a* and (ii) KEM DECAPS 101*j'* by device 101. The fourth KEM comprises (i) KEM ENCAPS 101*k'* by device 101 using ePK.server 103*h* and (ii) KEM DECAPS 103*j'* by server 111 in a step 238 below.

In preferred exemplary embodiments, the KEM parameters 103*f*-*z* selected in a step 219*b* support at least the following criteria for KEM parameters 103*f*-*z*: (i) are included within a list or set of parameters 101*f* for device 101 received in message 121, (ii) are included within a list or set of parameters 103*f* for server 111 as supported by server 111, and (iii) support a different family or type of PQC algorithms than KEM parameters 101*f*-*x* for ePK.device 101*h*. In other words if (x) device 101 signals support of Kyber and SIKE algorithms in parameters 101*f* and selects Kyber for KEM parameters 101*f*-*x* and ePK.device 101*h*, and (y) server 111 also supports Kyber and SIKE algorithms parameters 103*f* and server cryptographic algorithms 103*s*, then for a step 219*b* server 111 in preferred embodiments can select a SIKE algorithm for KEM parameters 103*f*-*z* to use with the fourth KEM 101*k'*/103*j'* comprising KEM ENCAPS 101*k'* and KEM DECAPS 103*j'*. Other possibilities exist as well for the specific families of algorithms that could be specified in parameters 101*f* and 103*f*, received in 101*f*-*x*, and the selected in a step 219b by server 111 for KEM parameters 103f-z without departing from the scope of the present disclosure. Additional details regarding the selection of KEM parameters are depicted and described in connection with FIG. 8 below.

At step 219c, server 111 can use a PQC.KeyGen function 103q to generate a server ephemeral PKI key pair comprising a server ephemeral public key ePK.server 103h and a server ephemeral private key eSK.server 103i. The algorithm used to generate the ephemeral PKI key pair can be specified in KEM parameters 103f-z selected by server 111 in a step 219b above. In a step 219c, the server ephemeral PKI key pair can comprise a key pair supporting key exchange mechanisms specified in Round 3 of the NIST "Post Quantum Cryptography" (PQC) project. Each KEM provides details for a KeyGen function, which could be used for a PQC.KeyGen function 103q from Figure lain a step 219c. The server ephemeral public key ePK.server 103h generated in a step 219c can comprise the value of "Key Share" within a "Server Hello" message for a second message 121 below.

In some exemplary embodiments, the set of KEM parameters 103f-z (i) used in step 219c to generate a server ephemeral public key ePK.server 103h and a server ephemeral private key eSK.server 103i can be (ii) equal to or equivalent to KEM parameters 101f-x received in a message 121. In other words, some exemplary embodiments support device 101 and server 111 using the exact same algorithm for both (i) a KEM 103k/101j initiated by a device through KeyGen and sending a first public key of ePK.device 101h, and (ii) a KEM 101k'/103j' initiated by a server through KeyGen and sending a second public key of ePK.server 103h. For the embodiment described in the previous sentence, the parameters 101f-x for ePK.device 101h can specify the same algorithm (e.g. Kyber, BIKE, SIKE, etc) parameters 103f-z for ePK.server 103h. Other embodiments may use different parameters or types of cryptographic algorithms for ePK.device 101h and ePK.server 103h, which are also depicted and described in connection with FIG. 8 below.

In a preferred exemplary embodiment, which is also depicted in FIGS. 3 through 7b below, at least three separate types of post-quantum cryptography algorithms can be used for the parameters 103f-y for PK.server 103d, parameters 101f-x for ePK.device 101h, parameters 101f-a for PK.device 101a, and parameters 103f-z for ePK.server 103h. In a first embodiment, (i) a code-based algorithm such as McEliece can be used for parameters 103f-y with PK.server 103d, (ii) a lattice-based algorithm such as Kyber can be used for parameters 101f-x with ePK.device 101f-x and parameters 101f-a for PK.device 101a, and (iii) Supersingular Elliptic Curve Isogeny (SIKE) can be used for parameters 103f-z with ePK.server 103f-z. In this manner and using the steps depicted for deriving a symmetric ciphering key S4 for messages 123 and 124, the symmetric ciphering key S4 can be derived using three distinct types or families of algorithms (e.g. code-based, lattice-based, and SIKE algorithms). Even if two of the algorithms encounter weaknesses in the future, the security of the symmetric ciphering key S4 can be at least as secure as the strongest of the three algorithms.

Note that PK.server 103d using a code-based algorithm may have a longer public key length, such as an exemplary value of a megabyte or more, but the PK.server 103d can be distributed "out of band" and stored in device 101 during a configuration step 202 which can support writing large data sets to device 101, such as writing firmware or an operating system to device 101. Writing a PK.server 103d to device 101 in a step 202 would be an overall small set of the data written to device 101 during configuration of device 101. In addition, since the value PK.server 103d could be transmitted "out of band", such as with an operating system or configuration files for device 101, the value of PK.server 103d does not need to be transmitted over IP network 107 between device 101 and network 103, such that if a future weakness for code-based algorithms could potentially compromise PK.server 103d, the PK.server 103d can remain relatively secure since it could be transmitted over a secure network to device 101.

Also note in exemplary embodiments, PK.server 103d could be unique for each device 101, such that a system 200 does not depend on any single PK.server 103d. In this manner, the security of a system 200 is also further increased, since breaking a single PK.server 103d (or if the corresponding single SK.server 103b was compromised) would only affect the security of a particular or single device 101 storing that single PK.server 103d, and other devices 101 used in a system 200 could continue to record different PK.server 103d that remain secured.

In other exemplary embodiments, device 101 and server 111 use completely different algorithms for both (i) the KEM 103k/111j initiated by a device through KeyGen and sending a first ephemeral public key of ePK.device 101h in a message 121, and (ii) the KEM 101k'/103j' initiated by a server through KeyGen and sending a second ephemeral public key of ePK.server 103h.

In a first exemplary embodiment, (i) the KEM 103k'/101j' initiated or selected by device 101 using ePK.device 101h supports lattice based algorithms, and (ii) the KEM 101k'/103j' initiated or selected by server 111 using ePK.server 103h supports Supersingular Isogeny Key Encapsulation (SIKE). In a second exemplary embodiment, (i) the KEM 103k/101j initiated or selected by device 101 using ePK.device 101h supports lattice based algorithms, and (ii) the KEM 101k'/103j' initiated or selected by server 111 using ePK.server 103h supports code-based algorithms. In a third exemplary embodiment, (i) the KEM 103k/101j initiated or selected by device 101 using ePK.device 101h supports code based algorithms, and (ii) the KEM 101k'/103j' initiated or selected by server 111 using ePK.server 103h supports lattice based algorithms.

In a fourth exemplary embodiment, (i) the KEM 103k/101j initiated by device 101 using ePK.device 101h supports code based algorithms and (ii) the KEM 101k'/103j' initiated by server 111 using ePK.server 103h supports Supersingular Isogeny Key Encapsulation. In a fifth exemplary embodiment, (i) the KEM 103k/101j initiated by device 101 using ePK.device 101h supports Supersingular Isogeny Key Encapsulation and (ii) the KEM 101k'/103j' initiated by server 111 using ePK.server 103h supports code based algorithms. In a sixth exemplary embodiment, (i) the KEM 103k/101j initiated by device 101 using ePK.device 101h supports Supersingular Isogeny Key Encapsulation and (ii) the KEM 101k'/103j' initiated by server 111 using ePK-.server 103h supports lattice based algorithms.

For the six embodiments described above in the previous two paragraphs, lattice based algorithms could comprise any of CRYSTALS-KYBER, FrodoKEM, NTRU, NTRU Prime, and SABER. For the six embodiments described above in the previous two paragraphs, code based algorithms could comprise any of BIKE, Classic McEliece, and HQC. The algorithms described in the previous sentence are specified in "Round 3" of the Wikipedia PQC article.

At step 220a, server 111 can also select metadata 220m, where metadata 220m can include parameters or values used for the subsequent generation of both a second asymmetric ciphertext C2 102c-2 and a second symmetric ciphertext symm-C2 102s-2. As one example, metadata 220m could include values or a name a symmetric ciphering algorithm used to generate the second symmetric ciphertext symm-C2 102s-2 or the third symmetric ciphertext symm-C3 102s-3 for data sent by server 111 to device 101 in a message 122. As a second example, the metadata 220m could include an initialization vector for the symmetric ciphertext symm-C2 102s-2 and/or symm-C3 102s-3 and also an identity of the symmetric ciphering algorithm (such as "AES" or Blowfish) and a chaining mode (e.g. ECB, CBC, etc.). For some embodiments, initialization vectors could be mutually derived using shared secret keys and HKDF, and the initialization vectors could be omitted from metadata for messages.

At step 220b, server 111 can also select server extensions 103g-1 used by the server in generating a subsequent first response message 122, which could also comprise a "Server Hello" message. Note that server extensions 103g-1 can be a subset of the supported server extensions 103g described in FIG. 1a above. Server 111 can use both (i) the received device extensions 110g from a first message 121 and (ii) stored parameters and algorithms from for server extensions 103g in order to select a compatible and preferred set of server extensions 103g-1 that would also be supported by device 101. Server extensions 103g-1 can select subsets of algorithms or parameters offered or proposed by device 101 in the first message 121.

A portion of the subsets of subsets of algorithms or parameters offered or proposed by device 101 in the first message 121 can also be included in metadata 220m, such as specifying a specific symmetric ciphering algorithm and parameters for the second and third and fourth symmetric ciphertexts symm-C2/C3/C4 102s-2/3/4. In other words, device 101 could use metadata 220m in order to process and decrypt the second and third symmetric ciphertexts symm-C2/C3 102s-2/3 (where metadata 220m would normally be plaintext in order to device 101 to process the symmetric ciphertext). For embodiments of the present invention, the server extensions 103g-1 selected by a server 111 in a step 220a can include at least the symmetric ciphering parameters for processing a second and third symmetric ciphertexts symm C2/C3 102s-2/3.

At step 220c, server 111 can derive or generate a random number M2 220c' for use in a second KEM 103k/101j between server 111 and device 101. The function and use of a step 220c and a KEM ENCAPS function 103k is also depicted and described in FIG. 4 below, and was also depicted and described in connection with FIG. 1a above. At step 220c, server 111 can use both (i) the received device ephemeral public key of ePK.device 101h and (ii) the specified subset of parameters 101f-x for the device ephemeral public key and the second KEM 103k/101j in order to generate both (x) a second asymmetric ciphertext C2 102c-2 and (y) a second shared secret key K2 102k-2. At step 220c, server 111 can use a KEM ENCAPS function 103k with both (i) and (ii) from the previous sentence in order to generate both (x) the second asymmetric ciphertext C2 102c-2 and (y) the second shared secret key K2 102k-2. A summary of the step 220c by server 111 with a KEM ENCAPS function 103k was also depicted and described in connection with FIG. 1a above. A server 111 can use both server cryptographic algorithms 103s and server cryptographic parameters 103x in order to conduct the step 220c.

At step 221, server 111 can use a hash-based key derivation function (HKDF) 221a (depicted and described in FIG. 5 below) with at least the second shared secret key K2 102k-2 output from KEM ENCAPS function 103k in order to generate both (i) a second symmetric ciphering key of S2 221b and a second message authentication code (MAC) key MAC2 221c. Note that in some exemplary embodiments, additional data mutually shared between device 101 and server 111 besides the second shared secret key K2 102k-2 can also be input into the HKDF 221a in a step 221 in order to generate S2 221b and MAC2 221c. The additional data input into HKDF 221a can comprise data from the message 121 and the message 122, such as, but not limited to, the device ephemeral public key ePK.device 101h from device 101, device extensions 101g, parameters 101f and 101f-x, the server ephemeral public key ePK.server 103h from server 101, server extensions 103g-1, parameters 103f-y, and server certificate cert.server 103c.

In preferred exemplary embodiments, in a step 221, at least both the first shared secret key K1 102k-1 from a step 214 and the second shared secret key K2 102k-2 from step 220c are input in the HKDF 221a in order to generate keys S2 221b and MAC2 221c. In this manner, the second symmetric ciphering key S2 and MAC key MAC2 can be mutually derived with device 101 more securely by including input from two separate shared secrets (e.g. K1 and K2, which can be derived by separate KEM algorithms), compared to deriving the key S2 and MAC2 using only a single KEM algorithm. In other words, the combination of at least K1 and K2 for HKDF 221a provides security equal to at least the stronger of the first KEM (for KEM DECAPS 103j) and the second KEM (for KEM ENCAPS 103k).

At step 223, server 111 can use symmetric encryption 223a with the second asymmetric ciphertext C2 102k-2 from a step 221 above in order to generate a second symmetric ciphertext symm-C2 102s-2. A step 223 is also depicted and described in connection with FIG. 4 below. The symmetric encryption 223a can be included within server cryptographic algorithms 103s for server 111. The symmetric encryption 223a can include input of at least (i) the parameters 220m' specified in metadata 220m from a step 220a above for server 111, and (ii) the symmetric ciphering key S2 221b and MAC key MAC2 221c from a step 221 above. A step 223 can also include server processing metadata 220m, where metadata 220m can include plaintext data to conduct symmetric encryption 223a such as handshake headers, an initialization vector, an identity of the symmetric ciphering key to use, etc. Parameters 220m' can comprise a portion of the metadata 220m determined in a step 220 above. Note that the output of the step 223 can comprise a "double encrypted" second asymmetric ciphertext C2 102c-2, where (i) the first layer of encryption can be via asymmetric encryption via the second KEM 103k/101j from a step 220c, and (ii) the second layer of encryption can be via symmetric encryption 223a of the second asymmetric ciphertext C2 102c-2.

For some exemplary embodiments, a step 223 can be omitted and the second asymmetric ciphertext C2 102c-2 could be transmitted without the additional layer of symmetric encryption from a step 223. In other words, the data depicted as transmitted in a message 122 in FIG. 2 regarding the second asymmetric ciphertext C2 102c-2 could be "C2 102c-2" instead of the depicted value of "Symm-C2 102s-2 ({C2 102c-2} S1 210b)."

Although the ciphertext from the party conducting an ENCAPS function (e.g. server 111 using the device ephemeral public key ePK.device 101h) is normally secure with the first level of asymmetric encryption, additional levels of security could be obtained for the system 200 in FIG. 2 by server 111 conducting a step 223 to "double encrypt" the second asymmetric ciphertext C2 102c-2 output from KEM ENCAPS 103k also using symmetric encryption and the key S1 previously derived by server 111 in a step 214. In other words, by using "double encryption" via the second symmetric ciphertext symm-C2 102s-2, an attacker would need to break both symmetric encryption 223a and asymmetric encryption from KEM ENCAPS 103k in order to determine K2 102k-2. Without "double encryption", an attacker would need to break only asymmetric encryption from KEM ENCAPS 103k in order to determine K2 102k-2. In addition, the use of a "double encrypted" second asymmetric ciphertext C2 102c-2 by server 111 increases resistance to an attacker substituting a fake or fraudulent second asymmetric ciphertext C2 102c-2, if the attacker was able to obtain the device ephemeral public key ePK.device 101h.

Or, in some embodiments where the second asymmetric ciphertext C2 102c-2 is not "double encrypted, (i) the second asymmetric ciphertext C2 102c-2 could omit the use of the symmetric ciphering key S1 210b by server 111 in a step 223 and (ii) the second asymmetric ciphertext C2 102c-2 could be processed in a step 223a with only the first MAC key MAC1 210c (where use of MAC1 210c with a step 223 is depicted below in FIG. 3). For these embodiments, the MAC codes transmitted by server 111 along with the second asymmetric ciphertext C2 102c-2 could be verified by device 101 using the MAC key MAC1 210c derived by device 101 in a step 210. In other words, a second asymmetric ciphertext C2 102c-2 in a message 122 below could comprise a second asymmetric ciphertext C2 102c-2 with MAC codes generated using the first MAC key MAC1 210c generated by server 111 in a step 214, such that device 101 could verify the second asymmetric ciphertext C2 102c-2 was generated by server 111 that (i) conducted the KEM ENCAPS 103k and (ii) operates with the first shared secret key K1 102k-1 and SK.server 103b. For this embodiment, although the second asymmetric ciphertext C2 102c-2 is not "double encrypted", the second asymmetric ciphertext C2 102c-2 is authenticated because the MAC codes over the second asymmetric ciphertext C2 102c-2 (from MAC1 210c) could only be generated by a server 111 holding the server static private key SK.server 103b.

At step 222, server 111 can derive or generate a random number M2 222a for use in a third KEM 103k'/101j' between server 111 and device 101. The function and use of a step 222 and a KEM ENCAPS function 103k' is also depicted and described in FIG. 4 below and also FIG. 1a. At step 222, server 111 can use both (i) the received and/or previously stored device static public key of PK.device 101a and (ii) the specified subset of parameters 101f-x or 101f-a for the device static public key PK.device 101a and the third KEM 103k'/101j' in order to generate both (x) a third asymmetric ciphertext C3 102c-3 and (y) a third shared secret key K3 102k-3. At step 222, server 111 can use a KEM ENCAPS function 103k' with both (i) and (ii) from the previous sentence in order to generate both (x) the third asymmetric ciphertext C3 102c-3 and (y) the third shared secret key K3 102k-3. A summary of the step 222 by server 111 with a KEM ENCAPS function 103k' was also depicted and described in connection with FIG. 1a above. A server 111 can use both server cryptographic algorithms 103s and server cryptographic parameters 103x in order to conduct the step 220c.

At step 224, server 111 can use a hash-based key derivation function (HKDF) 224a (depicted and described in FIG. 4 below) with at least the third shared secret key K3 102k-3 output from KEM ENCAPS function 103k' in order to generate both (i) a third symmetric ciphering key of S3 224b and a third message authentication code (MAC) key MAC3 224c. Note that in some exemplary embodiments, additional data mutually shared between device 101 and server 111 besides the third shared secret key K3 102k-3 can also be input into the HKDF 224a in a step 224 in order to generate S3 224b and MAC3 224c. The additional data input into HKDF 224a can comprise data from the message 121 and the message 122, such as, but not limited to, token1 206a, token2 219e, the first asymmetric ciphertext C1 102c-1, and any data as transmitted through IP network in message 121 and message 122. Metadata 212b and/or metadata 220m could be input into the HKDF 224a as well.

In preferred exemplary embodiments, in a step 224, at least the first shared secret key K1 102k-1 from a step 214 and the second shared secret key K2 102k-2 from step 220c and the third shared secret key K3 102k-3 from step 222 are input in the HKDF 224a in order to generate keys S3 224b and MAC3 224c. In this manner, the third symmetric ciphering key S3 and MAC key MAC3 can be mutually derived with device 101 more securely by including input from three separate shared secrets (e.g. K1 and K2 and K3, which can be derived by separate KEM algorithms), compared to deriving the key S3 and MAC3 using only a single KEM algorithm. In other words, the combination of at least K1 and K2 and K3 for HKDF 224a provides security equal to at least the stronger of the first KEM (for KEM DECAPS 103j) and the second KEM (for KEM ENCAPS 103k) and the third KEM (for KEM ENCAPS 103k').

As discussed above for the generation of S2 221b from a second HKDF 221a by server 111 in a step 221, the third symmetric ciphering key S3 224b in a step 224 can comprise a first key S3 224b-1 for encryption by server 111 and a second key S3 224b-2 for decryption by server 111. The first S3 224b-1 can be used by server 111 to encrypt data using the key "S3" for symmetric ciphertext sent to device 101 in a message 122, and the second S3 221b-2 can be used by server 111 to decrypt data using the key "S3" received from device 101 in a message 123 below. In a step 228 below for device 101, the device 101 could also likewise derive two different values for the key S3 comprising the first S3 221b-1 for decrypting data in a message 122 using "S3" and the second S3 224b-2 for encrypting data sent to server 111 in a message 123 using "S3". Likewise, server 111 in a step 224 can generate two values for MAC key MAC3 224c, where the first MAC3 is used by server 111 to generate MAC codes for device 101 sent in a message 122, and the second MAC3 is used by server 111 to verify MAC codes received from device 101 in a message 123. Device 101 could also derive two values for the MAC key MAC3 in a step 228 below.

At step 223', server 111 can use symmetric encryption 223a with the third asymmetric ciphertext C3 102k-3 from a step 224 above in order to generate a third symmetric ciphertext symm-C3 102s-3. A step 223' is also depicted and described in connection with FIG. 4 below. The symmetric encryption 223a can be included within server cryptographic algorithms 103s for server 111. The symmetric encryption 223a can include input of at least (i) the parameters 220m' specified in metadata 220m from a step 220a above for server 111, and (ii) the symmetric ciphering key S3 224b and MAC key MAC3 224c from a step 224 above. A step 223' can also include server processing metadata 220m, where metadata 220m can include plaintext data to conduct symmetric encryption 223a such as handshake headers, an initialization vector, an identity of the symmetric ciphering key to use, etc. Parameters 220m' can comprise a portion of the metadata 220*m* determined in a step 220 above. Note that the output of the step 223' can comprise a "double encrypted" third asymmetric ciphertext C3 102*c*-3, where (i) the first layer of encryption can be via asymmetric encryption via the third KEM 103*k'*/101*j'* from a step 224, and (ii) the second layer of encryption can be via symmetric encryption 223*a* of the third asymmetric ciphertext C3 102*c*-3.

For some exemplary embodiments, a step 223' can be omitted and the third asymmetric ciphertext C3 102*c*-3 could be transmitted without the additional layer of symmetric encryption from a step 223'. In other words, the data depicted as transmitted in a message 122 in FIG. 2 regarding the third asymmetric ciphertext C3 102*c*-3 could be "C3 102*c*-3" instead of the depicted value of "Symm-C3 102*s*-3 ({C3 102*c*-3} S2 221*b*)."

Although the ciphertext from the party conducting an ENCAPS function (e.g. server 111 using the device static public key PK.device 101*a*) is normally secure with the first level of asymmetric encryption, additional levels of security could be obtained for the system 200 in FIG. 2 by server 111 conducting a step 223' to "double encrypt" the third asymmetric ciphertext C3 102*c*-3 output from KEM ENCAPS 103*k'* also using symmetric encryption and the key S2 previously derived by server 111 in a step 222. In other words, by using "double encryption" via the third symmetric ciphertext symm-C3 102*s*-3, an attacker would need to break both symmetric encryption 223*a* and asymmetric encryption from KEM ENCAPS 103*k'* in order to determine K3 102*k*-3. Without "double encryption", an attacker would need to break only asymmetric encryption from KEM ENCAPS 103*k'* in order to determine K3 102*k*-3. In addition, the use of a "double encrypted" third asymmetric ciphertext C3 102*c*-3 by server 111 increases resistance to an attacker substituting a fake or fraudulent third asymmetric ciphertext C3 102*c*-3, if the attacker was able to obtain the device static public key PK.device 101*a*.

Or, in some embodiments where the third asymmetric ciphertext C3 102*c*-3 is not "double encrypted, (i) the third asymmetric ciphertext C3 102*c*-3 could omit the use of the symmetric ciphering key S3 224*b* by server 111 in a step 223' and (ii) the third asymmetric ciphertext C3' 102*c*-3' could be processed in a step 223*a* in 233' with only the MAC key MAC2 221*c* (where MAC2 221*c* is depicted below in FIG. 4). For these embodiments, the MAC codes transmitted by server 111 along with the third asymmetric ciphertext C3 102*c*-3 could be verified by device 101 using the MAC key MAC2 221*c* derived by device 101 in a step 226 below. In other words, a third asymmetric ciphertext C3 102*c*-3 in a message 122 below could comprise a third asymmetric ciphertext C3 102*c*-3 with MAC codes generated using the second MAC key MAC2 221*c* generated by server 111 in a step 221, such that device 101 could verify the third asymmetric ciphertext C3 102*c*-3 was generated by server 111 in a step 227 that (i) conducted the KEM ENCAPS 103*k'* and (ii) operates with the first shared secret key K1 102*k*-1 and second shared key K2 102*k*-1. For this embodiment, although the third asymmetric ciphertext C3 102*c*-3 is not "double encrypted", the third asymmetric ciphertext C3 102*c*-3 is authenticated because the MAC codes over the third asymmetric ciphertext C3 102*c*-3 (from MAC2 221*c*) could only be generated by a server 111 holding or storing both (i) the server static private key SK.server 103*b* and (ii) the device ephemeral public key ePK.device 101*h*.

Note that the steps 220*c* through 223' are depicted in FIG. 2 as listed "220*c*, 221, 223, 222, 224, 223'". Step 222 could be conducted before or after step 223. At step 225, server 111 can select and process a plaintext 225*b* for encryption into a fourth symmetric ciphertext symm-C4 102*s*-4. A step 225 for a server 111 is also depicted and described in connection with FIG. 5 below. Note that the third symmetric ciphertext symm-C3 102*s*-3 could be previously output from the step 223' above. For embodiments where the second or third symmetric ciphertext symm-C3 102*s*-2 is omitted, then a system 200 depicted in FIG. 2 could include a first symmetric ciphertext symm-C1 102*s*-1 in a first message 121 and then a symmetric ciphertext symm-C4 102*s*-4 in a second message 122.

For a step 225, the selection and processing of data for plaintext 225*b* can include data for (i) the server ephemeral public key ePK.server 103*h* generated in a step 219*c* above, (ii) the KEM parameters 103*f*-*z* for the server ephemeral public key ePK.server 103*h*, where the KEM parameters 103*f*-*z* can be selected in a step 219*b* above, (iii) the device 101 token token1.device 206*a* which was received in a message 121 above, and (iv) data for server 111 of data1.server 219*f* from a step 219*a* above. For some embodiments, the device 101 token token1.device 206*a* could be omitted from a plaintext 225*b*. But, by including the device 101 token token1.device 206*a* in a plaintext 225*b*, the subsequent message 122 and a system 200 can operate in a manner that is more robust against replay attacks.

At step 225, server 111 can use symmetric encryption 225*a* with the plaintext 225*b* in order to generate the fourth symmetric ciphertext C4 102*s*-4. A step 225 is also depicted and described in connection with FIG. 5 below. The symmetric encryption 225*a* can be included within server cryptographic algorithms 103*s* for server 111. The symmetric encryption 225*a* can include input of at least (i) the parameters 220*m*' specified in metadata 220*m* from a step 220 above for server 111, and (ii) the fourth symmetric ciphering key S4 224*b* and MAC key MAC3 224*c* from a step 224 above. A step 225 can also include server 111 processing metadata 220*m*, where metadata 220*m* can include handshake headers, an initialization vector, an identity of the algorithm for symmetric encryption 225*a*, etc. Metadata 220*m* and parameters 220*m*' can comprise a portion of the metadata 212*b* received in a message 121 from device 101. Or metadata 220*m* and parameters 220*m*' can comprise values for operating a symmetric encryption by server 111 and decryption by device 101 that a distinct and different than within the metadata 212*b* (such as metadata 212*b* specifying a first symmetric ciphering algorithm for data from device 101 and metadata 220*m* specifying a second and different symmetric ciphering algorithm for data from server 111).

For the exemplary embodiment depicted in FIG. 2, the second symmetric ciphertext symm-C2 102*s*-2 can be encrypted using the first symmetric ciphering key S1 2101*b* and the third symmetric ciphertext symm-C3 102*s*-3 can be encrypted using the second symmetric ciphering key S2 221*b* and the fourth symmetric ciphertext symm-C4 can be encrypted using the third symmetric ciphering key S3 224*b*. The derivation and use of the first symmetric ciphering key S 210*b* by server 111 is depicted and described in connection with FIG. 3 below. The derivation and use of the second symmetric ciphering key S2 221*b* by server 111 is depicted and described in connection with FIG. 4 below. The derivation and use of the third symmetric ciphering key S3 224*b* by server 111 is depicted and described in connection with FIG. 4 below.

In an exemplary embodiment, the KEM parameters 101*f*-*x* for ePK.device and KEM parameters 103*f*-*z* for ePK.server can be the same, and the second KEM 103*k*/101*j* and the KEM 101*k'*/103*j'* could be conducted using the same PQC KEM algorithm. Although the benefits of increased security from conducting two different types of PQC KEM algorithms for the second KEM and the fourth KEM are not provided in this embodiment described within this paragraph, several benefits of the present disclosure are achieved to address the identified needs in the art. First, both the device and server can generate ephemeral PKI key pairs, such that the security after the second and fourth KEM depends on more than one KEM ENCAPS/DECAPS step. Second, even with the same KEM parameters for both 101f-x and 103f-z, two distinct shared secret keys K2 and K4 can be generated and both keys K2 and K4 can be used for HKDF 231a below in FIG. 6. In general, the use of two distinct shared secret keys K2 and K4 compared to the use of a single shared secret key will provide a higher level of security for deriving a fourth symmetric ciphering key S4 231b.

As depicted in FIG. 2, server 111 can then send device 101 a response second message 122, where the second message 122 can also comprise a "Server Hello" message. The second message 122 can include at least (i) a server token of token2.server 219e, (ii) metadata 220m from a step 220a above, (ii) the second asymmetric ciphertext C2 102c-2 output from the KEM ENCAPS function 103k (where the second asymmetric ciphertext C2 102c-2 can be optionally encrypted into a second symmetric ciphertext symm-C2 102s-2 in a step 223 as depicted and described in connection with FIG. 4 below), and (iii) the third symmetric ciphertext symm-C3 102s-3 output from step 223'.

Although FIG. 2 depicts the third symmetric ciphertext symm-C3 102s-3 as external or separate from the second symmetric ciphertext 102s-2, in some embodiments, the third symmetric ciphertext symm-C3 102s-3 could be included within the second symmetric ciphertext symm-C2 102s-2. For this embodiment, then server 101 could (i) conduct a step 223' before a step 223, and then (ii) include the third symmetric ciphertext symm-C3 102s-3 with the plaintext second asymmetric ciphertext C2 102c-2 in a step 223, such that the third symmetric ciphertext symm-C3 102s-3 is also "wrapped" or encrypted in a step 223a of step 223 with the first symmetric ciphering key S1 210b. For this embodiment, then the third symmetric ciphertext symm-C3 102s-3 would not need to be sent separately or "outside" the second symmetric ciphertext symm-C2 102s-2. For this embodiment, then the relevant data within message 122 would be sent as "Symm-C2 102s-2 ([C2 102c-2, Symm-C3 102s-3 ({C3 102c-3} S2 221b)] S1 210b), for the second and third symmetric ciphertexts C2 102s-2 and C3 102s-3. Device 101 could extract the third symmetric ciphertext 102s-3 from a step 215' below, and then decrypt the third symmetric ciphertext symm-C3 102s-3 using a step 227 below. Although FIG. 2 depicts the fourth symmetric ciphertext symm-C4 102s-4 as external or separate from the third symmetric ciphertext 102s-3, in some embodiments, the fourth symmetric ciphertext symm-C4 102s-4 could be included within the third symmetric ciphertext symm-C3 102s-3. For this embodiment, then server 101 could (i) conduct a step 225 before a step 223', and then (ii) include the fourth symmetric ciphertext symm-C4 102s-4 with the plaintext third asymmetric ciphertext C3 102c-3 in a step 223', such that the fourth symmetric ciphertext symm-C4 102s-4 is also "wrapped" or encrypted in a step 223a of step 223' with the second symmetric ciphering key S2 221b. For this embodiment, then the fourth symmetric ciphertext symm-C4 102s-4 would not need to be sent separately or "outside" the third symmetric ciphertext symm-C3 102s-3. For this embodiment, then the relevant data within message 122 would be sent as "Symm-C3 102s-3 ([C3 102c-3, Symm-C4 102s-4 ({ePK.server 101h . . . } S3 224b)] S2 221b), for the third and fourth symmetric ciphertexts C3 102s-3 and C4 102s-4. Device 101 could extract the fourth symmetric ciphertext 102s-4 from a step 227 below, and then decrypt the fourth symmetric ciphertext symm-C4 102s-4 using a step 229 below.

In an exemplary embodiment, both (i) the third symmetric ciphertext symm-C3 102s-3 could be included within the second symmetric ciphertext symm-C2 102s-2, and (ii) the fourth symmetric ciphertext symm-C4 102s-4 could be included within the third symmetric ciphertext symm-C3 102s-3. The steps described in the paragraph above could apply for generating the third symmetric ciphertext and then the steps described in two paragraphs above could apply for generating the second symmetric ciphertext. For this embodiment, then server 111 could perform step 225 before step 223', and then also step 233' before step 233. For this embodiment, a single second symmetric ciphertext symm-C2 102s-2 could include the third symmetric ciphertext symm-C3 102s-3, and then also the third symmetric ciphertext could include the fourth symmetric ciphertext symm-C4 102s-4. For this embodiment, then the relevant data within message 122 would be sent as Symm-C2 102s-2 ([C2 102c-2, Symm-C3 102s-3 ({C3 102c-3, Symm-C4 "ePK.server 101h . . . " S3 224b} S2 221b)] S1 210b). Device 101 could extract the third symmetric ciphertext 102s-3 (which can also contain the fourth symmetric ciphertext symm-C4 102s-4 as shown in the paragraph above) from a step 215' below, and then decrypt the third symmetric ciphertext symm-C3 102s-3 using a step 227 below. Device 101 could extract the fourth symmetric ciphertext 102s-4 from a step 227 below, and then decrypt the fourth symmetric ciphertext symm-C4 102s-4 using a step 229 below.

Additional data could be included in a response message 122 without departing from the scope of the present disclosure. For some embodiments, the portions of data for a response second message 122 of (i) metadata 220m, (ii) token2 219e, (iii) the second symmetric ciphertext symm-C2 102s-2 (or possibly second asymmetric ciphertext C2 102c-2 without "double encryption" and a step 223), (iv) the third symmetric ciphertext symm-C3 102s-3, and (v) the fourth symmetric ciphertext C4 102s-4 could be sent as separate segments, portions, or sub-messages, The aggregate delivery of the data for items (i) through (iv) in the previous sentence can represent the response second message 122. As one example, the metadata 220m could include three separate values of parameters 220m', such as (i) a first parameters 220m' for second symmetric ciphertext symm-C2 102s-2, (ii) second parameters 220m' for the third symmetric ciphertext symm-C3 102s-3, and (iii) third parameters 220m' for the fourth symmetric ciphertext C4 102s-4. Each of the parameters 220m' could include an initialization vector and MAC codes for each of the respective symmetric ciphertexts. Note the first message 121 and the messages 123 and 124 below could likewise be separated into different segments, where the collective segments for each message represent the full message.

Device 101 can receive the second message 122 and conduct a series of steps in order to process the message and securely receive data from the server. For embodiments where the second message includes a "double encrypted" second symmetric ciphertext symm-C2 102s-2, device 101 could conduct a step 215' as depicted and described in connection with FIG. 5 below in order to decrypt the second symmetric ciphertext symm-C2 102s-2 using the first symmetric key S1 210b in order to read a plaintext value for the second asymmetric ciphertext C2 102c-2. Device 101 could process the "double encrypted" second symmetric ciphertext symm-C2 102s-2 using the metadata 220m that was received by device 101 in a message 122 (such as specifying a symmetric ciphering algorithms as well as parameters such as AES-128 or AES-192, etc.).

In other words, for a step 215' the device 101 could (i) use the first symmetric ciphering key S1 210b and MAC key MAC1 210c (from a step 209) in order to (ii) decrypt the second symmetric ciphertext symm-C2 102s-2 in order to read the plaintext value for the second asymmetric ciphertext C2 102c-2 (e.g. remove the first layer of symmetric encryption on the "double encrypted" data of symm-C2 102s-2). As described above for a step 210 by device 101, the step 210 could derive two values for the key S1, where device 101 (i) encrypted the first symmetric ciphertext symm-C1 102s-1 using a key S1 210b-1 and decrypts the second symmetric ciphertext symm-C2 102s-2 using a key S1 210b-2. For some embodiments, the use of a first symmetric ciphering key S1 210b could be omitted in a step 215' (and also corresponding step 223 by server 111), and the second ciphertext symm-C2 102s-2 could comprise the second asymmetric ciphertext C2 102c-2 with MAC codes that could be verified by device 101 with the first MAC key MAC1 210c. In other words, for some embodiments, the second symmetric ciphertext 102s-2 may not be "double encrypted" and alternatively include MAC codes for verification and authentication with the MAC key MAC1 210c.

At step 226, device 101 can use the specified KEM parameters 101f-x transmitted in message 121 along with device cryptographic algorithms 101s to conduct the KEM DECAPS 101j function with the received second asymmetric ciphertext C2 102c-2 (which could have symmetric encryption using key S1 102s-1 removed in a step 215' above). The device can use the device ephemeral private key of eSK.device 101i with the KEM DECAPS 101j and the received second ciphertext 102c-2 (where the first layer of symmetric encryption can be removed in a step 215') in order to generate the second shared secret key K2 102k-2. A step 226 for device 101 is also depicted and described in connection with FIG. 5 below. Note that for some PQC algorithms, the KEM DECAPS 101j function could fail for a small frequency of messages 224 and second asymmetric ciphertext C2 102c-2, such as less than one failure per million or billion KEM, and if a step 226 fails, then device 101 could send server 111 an error message and request regeneration and retransmission of a message 122.

A step 226 can also include device 101 using at least the second shared secret key K2 102k-2 with the HKDF 221a (depicted in FIG. 5 below) in order to generate the second symmetric ciphering key S2 221b and the second MAC key MAC1 221c. Note that the HKDF 221a in a step 226 can be the same HKDF 221a in a step 221 used by server 111, in order to derive the exact same values by device 101 as server 111. In some exemplary embodiments, the HKDF 221a can also include input of at least the first shared secret key K1 102k-1 in addition to the second shared secret key K2 102k-2 in order to generate the second symmetric ciphering key S2 221b and the MAC key MAC1 221c. In this manner and by including the first shared secret key K1 102k-1, the symmetric ciphering key S2 and MAC key MAC2 can be mutually derived with server 111 more securely by (x) including input from two separate shared secrets (e.g. K1 and K2, which can also be derived by separate types of KEM algorithms, such as, but not limited to, a first type of McEliece for K1 and a second type Kyber for K2), compared to (y) deriving the keys S2 and MAC2 using only a single KEM algorithm (e.g. using either (i) K2 only or (ii) a single, same KEM algorithm for K1 and K2). In other words, the combination of (x) K1 output from a first KEM 101k/103j and K2 output from a second KEM 103k/101j for (y) HKDF 221a provides security equal to at least the stronger of the first KEM (for KEM ENCAPS 101k) and the second KEM (for KEM ENCAPS 103k). At the conclusion of a step 226, device 101 can store the second symmetric ciphering key S2 221b and MAC key MAC2 221c, which are mutually and secretly shared between device 101 and server 111.

At step 227, device 101 can use symmetric decryption 227a with the third symmetric ciphertext symm-C3 102s-3 from the second message 122, in order to read a plaintext value for the third asymmetric ciphertext C3 102c-3. A step 227 for device 101 is also depicted and described in connection with FIG. 5 below. The symmetric decryption 227 can be included within device cryptographic algorithms 101s for device 101. The symmetric decryption 227 can include input of the parameters 220m' specified in metadata 220m from the second message 122 and the second symmetric ciphering key S2 221b and second MAC key MAC2 221c from a step 226 above. Note that metadata 220m can include parameters for a symmetric decryption 226a.

At step 228, device 101 can use the specified KEM parameters 101f-a for the device static public key PK.device 101a stored by device 101 (possibly also transmitted in a message 121) along with device cryptographic algorithms 101s to conduct the KEM DECAPS 101j' function with the received third asymmetric ciphertext C3 102c-3. The device can use the device static private key of SK.device 101v with the KEM DECAPS 101j' and the received third asymmetric ciphertext C3 102c-3 (where the first layer of symmetric encryption can be removed in a step 227) in order to generate the third shared secret key K3 102k-3. A step 228 for device 101 is also depicted and described in connection with FIG. 6 below. Note that for some PQC algorithms, the KEM DECAPS 101j' function could fail for a small frequency of messages 122 and third asymmetric ciphertext C3 102c-3, such as less than one failure per million or billion KEM, and if a step 228 fails, then device 101 could send server 111 an error message and request regeneration and retransmission of a message 122.

At step 228, device 101 can use a hash-based key derivation function (HKDF) 224a (depicted and described in FIG. 6 below) with at least the third shared secret key K3 102k-3 output from KEM DECAPS function 101j' in order to generate both (i) a third symmetric ciphering key of S3 224b and a third message authentication code (MAC) key MAC3 224c. The same HKDF 224a can be used by server 111 in a step 224 above. Note that in some exemplary embodiments, additional data mutually shared between device 101 and server 111 besides the third shared secret key K3 102k-3 can also be input into the HKDF 224a in a step 228 in order to generate S3 224b and MAC3 224c. The additional data input into HKDF 224a can comprise data from the message 121 and the message 122, such as, but not limited to, token1 206a, token2 219e, the first asymmetric ciphertext C1 102c-1, and any data as transmitted through IP network in message 121 and message 122. As one example, the HKDF 224 could include input any or all of the data from the first, second, and third symmetric ciphertexts symm-C1/C2/C3, including either (i) plaintext data previously decrypted from the first, second, and third symmetric ciphertexts symm-C1/C2/C3 or (ii) the symmetric ciphertexts symm-C1/C2/C3. As another example, the HKDF 224 could also include input of the second asymmetric ciphertext C2

102c-2 and the third asymmetric ciphertext C3 102c-3. Metadata 212b and/or metadata 220m could be input into the HKDF 224a as well.

In preferred exemplary embodiments, in a step 228, at least the first shared secret key K1 102k-1 from a step 210 and the second shared secret key K2 102k-2 from step 226 and the third shared secret key K3 102k-3 from step 228 are input in the HKDF 224a in order to generate keys S3 224b and MAC3 224c. In this manner, the third symmetric ciphering key S3 and MAC key MAC3 can be mutually derived with server 111 more securely by including input from three separate shared secrets (e.g. K1 and K2 and K3, which can be derived by separate KEM algorithms), compared to deriving the key S3 and MAC3 using only a single KEM algorithm. In other words, the combination of at least K1 and K2 and K3 for HKDF 224a provides security equal to at least the stronger of the first KEM (for KEM ENCAPS 101k) and the second KEM (for KEM DECAPS 101j) and the third KEM (for KEM DECAPS 101j').

As discussed above for the generation of S2 221b from a second HKDF 221a by server 111 in a step 221, the third symmetric ciphering key S3 224b in a step 228 can comprise a first key S3 224b-1 for decryption by device 101 and a second key S3 224b-2 for encryption by device 101. The first S3 224b-1 can be used by device to decrypt data using the key "S3" for symmetric ciphertext sent to device 101 in a message 122, and the second S3 224b-2 can be used by device 101 to encrypt data using the key "S3" for symmetric ciphertext sent by device 101 in a message 123 below. Likewise, device 101 in a step 228 can generate two values for MAC key MAC3 224c, where the first MAC3 is used by device 101 to verify MAC codes from server 111 sent in a message 122, and the second MAC3 is used by device 101 to generate MAC codes transmitted from device 101 in a message 123. Both device 101 and server 111 could also derive (i) two values for the MAC key MAC4 and (ii) two values for the symmetric ciphering key S4 in a step 231 below.

At step 229, device 101 can use symmetric decryption 229a with the fourth symmetric ciphertext symm-C4 102s-4 from the second message 122, in order to read plaintext data 224a. A step 229 for device 101 is also depicted and described in connection with FIG. 6 below. The symmetric decryption 229 can be included within device cryptographic algorithms 101s for device 101. The symmetric decryption 229 can include input of the parameters 220m' specified in metadata 220m from the second message 122 and the third symmetric ciphering key S3 224b and third MAC key MAC3 224c from a step 228 above. Note that metadata 220m can include parameters for a symmetric decryption 229a The data for plaintext 224a can comprise the same plaintext 224a generated by server 111 in a step 224 above. The plaintext data can include (i) the server ephemeral public key ePK.server 103h, (ii) the KEM parameters 103f-z for the server ephemeral public key ePK.server 103h, where the KEM parameters 103f-z can be a subset of parameters 101f transmitted by device 101 in a message 121, (iii) the device 101 token token1.device 206a which was transmitted by device 101 in a message 121 above, and (iv) data for server 111 of data1.server 219f. At step 229, device 101 could process the server data data1.server 219f, which could include instructions for device 101 from server 111.

At step 230, device 101 can derive or generate a random number M4 230a for use in a fourth KEM 101k'/103j' between device 101 and server 111. The random number M4 230a can be used for a subsequent KEM in a step 230. The function and use of a step 230 and a KEM ENCAPS function 101k is also depicted and described in FIG. 6 below. At step 230, device 101 can use both (i) the received server ephemeral public key of ePK.server 103h and (ii) the specified subset of parameters 103f-z for the server ephemeral public key and the fourth KEM 101k'/103j' in order to generate both (x) a fourth asymmetric ciphertext C4 102c-4 and (y) a fourth shared secret key K4 102k-4. At step 230, device 101 can use a KEM ENCAPS function 101k' with both (i) and (ii) from the previous sentence in order to generate both (x) the fourth asymmetric ciphertext C4 102c-4 and (y) the fourth shared secret key K4 102k-4. A summary of the step 230 by device 101 with a KEM ENCAPS function 101k' was also depicted and described in connection with FIG. 1a above. A device 101 can use both device cryptographic algorithms 101s and device cryptographic parameters 101x in order to conduct the step 230.

At step 231, device 101 can use a hash-based key derivation function (HKDF) 231a (depicted and described in FIG. 6 below) with at least the third shared secret key K3 102k-3 output from KEM ENCAPS function 101k' in order to generate both (i) a fourth symmetric ciphering key of S4 231b and (ii) a fourth message authentication code (MAC) key MAC4 231c. Note that in some exemplary embodiments, additional data mutually shared between device 101 and server 111 besides the fourth shared secret key K4 102k-4 can also be input into the HKDF 231a in a step 231 in order to generate S4 231b and MAC4 231c. The additional data input into HKDF 231a can comprise data from the message 121 and the message 122 and the message 123 such as, but not limited to, token1 206a, token2 219e, the first asymmetric ciphertext C1 102c-1, and any data as transmitted through IP network in message 121 and message 122. As one example, the HKDF 231a could include input any or all of the first, second, third, and fourth symmetric ciphertexts symm-C1/C2/C3/C4. As another example, the HKDF 231a could also include input of the second asymmetric ciphertext C2 102c-2 and/or the third asymmetric ciphertext C3 102c-3 and/or the fourth ciphertext 102c-4. Metadata 212b and/or metadata 220m could be input into the HKDF 231a as well.

In preferred exemplary embodiments, in a step 231, at least all of the first shared secret key K1 102k-1, the second shared secret key K2 102k-2, the third shared secret key K3 102k-3, and the fourth shared secret key K4 102k-4 are input in the HKDF 231a in order to generate keys S4 231b and MAC4 231c. In this manner, the fourth symmetric ciphering key S4 and MAC key MAC4 can be mutually derived with server 111 more securely by including input from four separately generated shared secrets (e.g. K1 and K2 and K3 and K4, which may be derived by separate KEM algorithms for some embodiments), compared to deriving the key S4 and MAC4 using only a single KEM algorithm. In other words, the combination of K1 and K2 and K3 and K4 for HKDF 231a provides security equal to at least the stronger of the first KEM (for KEM ENCAPS 101k with PK.server 103d) and the second KEM (for KEM DECAPS 101j with eSK.device) and the third KEM (for KEM DECAPS 101j' with SK.device 101v) and the fourth KEM (for KEM ENCAPS 101k' with ePK.server 103h).

As discussed above for the generation of S3 224b from a HKDF 224a by device 101 in a step 228, the output of a HKDF 231a and the fourth symmetric ciphering key S4 231b can comprise a first key S4 231b-1 for encryption by device 101 and a second key S4 231b-2 for encryption by server 111 (and decryption by device 101). The first key S4 231b-1 can be used by device 101 in an encryption step 235 below and the first key S4 231-b could be used by server 111 in a decryption step 239 below. The second key S4 231b-2 could be used by server 111 in an encryption step 241 below and by device 101 in a decryption step 242.

In an exemplary embodiment, the KEM parameters 110f-x for ePK.device and KEM parameters 103f-z for ePK.server can be the same, and the second KEM 103k/101j (with ENCAPS and ePK.device 101h) and the fourth KEM 110k'/103j' (with ENCAPS and ePK.server 103h) could be conducted using the same PQC KEM algorithm. Although the benefits of increased security from conducting two different types of PQC KEM algorithms for the second KEM and the fourth KEM are not provided in this embodiment described within this paragraph, several benefits of the present disclosure are achieved to address the identified needs in the art. First, both the device and server can generate ephemeral PKI key pairs, such that the security after the first and second KEM depends on more than one KEM ENCAPS/DECAPS step. Second, even with the same KEM parameters for both 101f-x and 103f-z, two distinct shared secret keys K2 and K4 can be generated and both keys K2 and K4 can be used for HKDF 231a. In general, the use of two distinct shared secret keys K2 and K4 compared to the use of a single shared secret key will provide a higher level of security for deriving a fourth symmetric ciphering key S4 231b. In exemplary embodiments, at least two different classes of KEM algorithms from the set of code-based algorithms, lattice based algorithms, and SIKE are used in the generation of K1 in a step 210, K2 in a step 226, and K3 in a step 228, and K4 in a step 230. In another exemplary embodiment, at least three different classes of KEM algorithms from the set of code-based algorithms, lattice based algorithms, and SIKE are used in the generation of K1 in a step 210, K2 in a step 226, and K3 in a step 228, and K4 in a step 230.

At step 232, device 101 can use symmetric encryption 232a with the fourth asymmetric ciphertext C4 102c-4 from a step 230 above in order to generate a fifth symmetric ciphertext symm-C5 102s-5. A step 232 is also depicted and described in connection with FIG. 7a below. The symmetric encryption 232a can be included within device cryptographic algorithms 101s for device 101. The symmetric encryption 232a can be equivalent or the same as the symmetric encryption 239a used by a server 111 in a step 239 depicted in FIG. 7b below. The symmetric encryption 232a can include input of at least (i) the parameters 220m' specified in metadata 220m from a message 122 (or parameters 212b selected by device 101 in a step 212), and (ii) the symmetric ciphering key S3 224b and MAC key MAC3 224c from a step 231 above.

A step 232 can also include device 101 processing metadata 220m from message 122, where metadata 220m can include plaintext data to conduct symmetric encryption 232a such as handshake headers, an initialization vector, an identity of the symmetric ciphering key to use, etc. Parameters 220m' can comprise a portion of the metadata 220m. Note that the output of the step 232 can comprise a "double encrypted" fourth asymmetric ciphertext C4 102c-4, where (i) the first layer of encryption can be via asymmetric encryption via the third KEM 101k'/103j' using SK.device 101v, and (ii) the second layer of encryption can be via symmetric encryption 232a of the fourth asymmetric ciphertext C4 102c-4 using keys S3 224b and MAC3 224c.

For some exemplary embodiments, a step 232 can be omitted and the third asymmetric ciphertext C3 102c-3 could be transmitted without the additional layer of symmetric encryption from a step 232. In other words, the data depicted as transmitted in a message 123 in FIG. 2 regarding the fourth asymmetric ciphertext C4 102c-4 could be "C4 102c-4" instead of the depicted value of "Symm-C5 102s-5 ({C4 102c-4} S3 224b)."

Although the ciphertext from the party conducting an ENCAPS function (e.g. device 101 using the server ephemeral public key ePK.server 103h in a step 230) is normally secure with the first level of asymmetric encryption, additional levels of security could be obtained for the system 200 in FIG. 2 by device 101 conducting a step 232 to "double encrypt" the fourth asymmetric ciphertext C4 102c-4 output from KEM ENCAPS 101k' with ePK.server 103h also using symmetric encryption. In other words, by using "double encryption" via the fifth symmetric ciphertext symm-C5 102s-5, an attacker would need to break at least both symmetric encryption 232a and asymmetric encryption from KEM ENCAPS 101k' in order to determine K4 102k-4. Without "double encryption", an attacker would need to break only asymmetric encryption from KEM ENCAPS 101k' in order to determine K4 102k-4. In addition, the use of a "double encrypted" fourth asymmetric ciphertext C4 102c-4 by device 101 increases resistance to an attacker substituting a fake or fraudulent fourth asymmetric ciphertext C4 102c-4, if the attacker was able to obtain the server ephemeral public key ePK.server 103h.

Or, in some embodiments where the fourth asymmetric ciphertext C4 102c-4 is not "double encrypted, (i) the fifth symmetric ciphertext symm-C5 102c-5 could omit the use of the symmetric ciphering key S3 224b by device 101 in a step 232 and (ii) the fourth asymmetric ciphertext C4 102c-4 could be processed in a step 232a during a step 232 with only the third MAC key MAC3 224c (where the use of MAC3 224c depicted below in a step 232 in FIG. 7a). For these embodiments, the MAC codes transmitted by device 101 along with the fourth asymmetric ciphertext C4 102c-4 could be verified by server 111 using the MAC key MAC3 224c derived by server 111 in a step 224. In other words, a fourth asymmetric ciphertext C4 102c-4 in a message 123 below could comprise a fourth asymmetric ciphertext C4 102c-4 with MAC codes generated using the third MAC key MAC3 224c generated by device 101 in a step 228, such that server 111 could verify the fourth asymmetric ciphertext C4 102c-4 was generated by device 101 that (i) conducted the KEM ENCAPS 101k' with ePK.server 103h and (ii) operates with at least the third shared secret key K3 102k-3.

At step 233, device 101 can process application data 233a. The application data 233a could comprise a sensor measurement from sensor 101y in FIG. 1b, a registration message from device 101 to server 111, a set of configuration data for device 101 such as parameters used by device 101 for operating an application with server 111. For some embodiments, the application data 233a in a step 233 could comprise data formatted according to any one of the following protocols: SIP, IPSec, HTTP, JSON, XML, SSH, MQTT, etc.

At step 234, device 101 can select and process a plaintext 234a for encryption into a sixth symmetric ciphertext symm-C6 102c-6. A step 234 for a device 101 is also depicted and described in connection with FIG. 7a below. In exemplary embodiments, the plaintext 234a can include application data 233a from a step 233 above and also the device token token1.device 206a and the server token token2.server 219e. In some exemplary embodiments for mutual authentication between device 101 and server 111, then the plaintext 234a can also include a device certificate of cert.device 101c (instead of including cert.device 101c in plaintext 211a), and/or a digital signature over plaintext 233a (but excluding the digital signature itself) using the private key corresponding to the public key in cert.device 101*c*. For a step 234, device 101 can also (i) calculate a hash value over data in both the first message 121 and the response second message 122, and (ii) include the hash value in the plaintext 234*a*.

At step 235, device 101 can use symmetric encryption 235*a* with the plaintext 234*a* from a step 234 in order to generate the sixth symmetric ciphertext symm-C6 102*s*-6. A step 235 is also depicted and described in connection with FIG. 7*a* below. The symmetric encryption 235*a* can be included within device cryptographic algorithms 101*s* for device 101. The symmetric encryption 235*a* can include input of at least (i) the parameters specified in metadata 212*b* from a step 212 above for device 101 or parameters 220*m*' received from server 111 in a message 122, and (ii) the symmetric ciphering key S4 231*b* and MAC key MAC4 231*c* from a step 231 above. A step 235 can also include device 101 processing metadata 212*b*, where metadata 212*b* can include handshake headers, parameters 103*f*-*y*, an initialization vector, etc. Metadata 212*b* in a step 235 can be equivalent (e.g. formatted the same but with different values) than the metadata 212*b* transmitted in a message 121 by device 101.

As depicted in FIG. 2, device 101 can then send server 111 a third message 123. For some embodiments, the third message 123 can also comprise a "Client Finished" message. The third message 123 can include at least (i) metadata 212*b* from a step 235 above (or metadata 220*m*' if metadata 220*m*' is used to generate symm-C5 102*s*-5 or symm-C6 102*s*-6), (ii) the fifth symmetric ciphertext symm-C5 102*s*-4 with fourth asymmetric ciphertext C4 102*c*-4 output from the KEM ENCAPS function 101*k*' in a step 230, and (iii) the sixth symmetric ciphertext symm-C6 102*c*-6 output from step 235.

For some embodiments, a message 123 could include a plaintext value of the fourth asymmetric ciphertext C4 102*c*-4 instead of "double encryption" into the fifth symmetric ciphertext symm-C5 102*s*-5. For these embodiments then both (i) the fifth symmetric ciphertext symm-C5 102*s*-5 could be omitted and (ii) the step 232 could be omitted as well. As described above, the fourth asymmetric ciphertext C4 102*c*-4 could comprise the fourth asymmetric ciphertext C4 102*c*-4 from a step 230 by device 101 that has been either (i) encrypted with the third symmetric ciphering key S3 224*b* and MAC key MAC3 224*c*, or (ii) "MACed" only with the second MAC key MAC3 224*c* (such as for authentication only from device 101).

Although FIG. 2 depicts the sixth symmetric ciphertext symm-C6 102*s*-6 as external or separate from the fifth symmetric ciphertext 102*s*-4, in some embodiments, the sixth symmetric ciphertext symm-C4 102*s*-4 could be included within the fifth symmetric ciphertext symm-C5 102*s*-5. For this embodiment, then device could (i) conduct a step 235 before a step 232, and then (ii) include the sixth symmetric ciphertext symm-C6 102*s*-6 with the plaintext fourth asymmetric ciphertext C4 102*c*-4 in a step 232, such that the sixth symmetric ciphertext symm-C6 102*s*-6 is also "wrapped" or encrypted in a step 232*a* of step 232 with the third symmetric ciphering key S3 224*b*. For this embodiment, then the sixth symmetric ciphertext symm-C6 102*s*-6 would not need to be sent separately or "outside" the fifth symmetric ciphertext symm-C5 102*s*-5. For this embodiment, then the relevant data within message 123 would be sent as "Symm-C5 102*s*-5 ([C4 102*c*-4, Symm-C6 102*s*-6 ({233*a* . . . } S4 221*b*)] S3 224*b*), for the fifth and sixth symmetric ciphertexts C5 102*s*-5 and C6 102*s*-6. Server 111 could extract the sixth symmetric ciphertext 102*s*-6 from a step 237 below, and then decrypt the sixth symmetric ciphertext symm-C6 102*s*-6 using a step 239 below.

Server 111 can receive the third message 123 and take steps to process the data. At step 237 server 111 can use the metadata/parameters 212*b* from a message 123 as well as the keys S3 224*b* and MAC3 224*c* from a step 224 in FIG. 4 below in order to decrypt the fifth symmetric ciphertext symm-C5 102*s*-5. A step 237 is depicted and described in connection with FIG. 7*b* below. Server 111 could use symmetric decryption 237*a*. The output of a step 237 by server 111 can be a plaintext value of the fourth asymmetric ciphertext C4 102*c*-4 for use with a KEM DECAPS 103*j*'. For some embodiments, the use of a symmetric ciphering key S3 224*b* could be omitted and the step 237 could use the MAC key MAC3 224*c* in order to verify a MAC code in message 123 for the fourth ciphertext C3 102*c*-4.

At step 238, server 111 can use (i) the KEM parameters 101*f*-*z* sent in message 122 along with (ii) server cryptographic algorithms 103*s* to conduct the KEM DECAPS 103*j*' function with the received fourth asymmetric ciphertext C4 102*c*-4. The server 111 can use the server ephemeral private key of eSK.server 103*i* with the KEM DECAPS 103*j*' and the received third asymmetric ciphertext C4 102*c*-4 in order to generate the fourth shared secret key K4 102*k*-4. A step 238 for server 111 is also depicted and described in connection with FIG. 7*a* below. Note that for some PQC algorithms, the KEM DECAPS 103*j*' function could fail for a small frequency of messages 123, such as less than one failure per million or billion KEM messages or ciphertext C4, and if a step 238 fails, then server 111 could send device 101 an error message and request device 101 generates a different message 123.

A server 111 could then conduct a step 231 using at least the fourth shared secret key K4 102*k*-4 output from a step 238. The step 231 for a server 111 can be identical to a step 231 for device 101 in order for server 111 to mutually derive a fourth symmetric ciphering key S4 231*b* and MAC key MAC4 231*c*. Note that in exemplary embodiments the step 231 also includes input of (i) shared keys K1 102*k*-1, K2 102*k*-2, and K3 102*k*-3, plus (ii) additional data shared between device 101 and server 111 with a HKDF 231*a* in order to generated the fourth symmetric ciphering key S4 231*b* and MAC key MAC4 231*c*. At the conclusion of a step 231 by server 111, server 111 can store the fourth symmetric ciphering key S4 231*b* and fourth MAC key MAC4 231*c*, which are mutually and secretly shared between server 111 and device 101.

At step 239, server 111 can use symmetric decryption 239*a* with the received sixth ciphertext C6 102*s*-6 from a message 123 in order to read the plaintext 234*a*. A step 239 is also depicted and described in connection with FIG. 7*b* below. The symmetric decryption 239*a* can be included within server cryptographic algorithms 103*s* for server 111. The symmetric decryption 239*a* can include input of at least (i) the parameters specified in metadata 212*b* (or parameters 220*m*') received above from device 101 in a message 123, and (ii) the fourth symmetric ciphering key S4 231*b* and MAC key MAC4 231*c* from a step 231 in the paragraph above by server 111. The output of symmetric decryption 239*a* can be the plaintext data 234*a* which was processed by a device in a step 234 above.

The plaintext data 234*a* can include device application data 233*a* which was described above for a step 233 for device 101. The device application data 233*a* could include could comprise data formatted according to any one of the following protocols: SIP, IPSec, HTTP, JSON, XML, SSH, MQTT, etc. Note that plaintext data 234*a* can also include the device token token1.device 206*a* from a message 121 above and also the server token token2.server 219*e*. In a step 239, server 111 could verify that the received and decrypted values for device token token1.device 206*a* and also the server token token2.server 219*e* match or are equal to the values for (i) device token token1.device 206*a* received in a message 121 and (ii) server token token2.server 219*e* transmitted in a message 122.

At step 240, server 111 can then process the plaintext device application data 233*a*, such as storing the application data in RAM 111*m* or storage memory 111*b*, and prepare server application data 106*b* below in response to the received device application data 233*a* from message 123. A step 240 could comprise server 111 conducting steps according to the protocol of device application data 233*a* in order to process the device application data 233*a*, such as generating a HTTP response, parsing the JSON or XML data, generating an SSH server response, etc., and other possibilities exist as well for server 111 to conduct a step 240 to process device application data 233*a* and generate server application data 106*b* without departing from the scope of the present disclosure.

As depicted in FIG. 2, server 111 could then in a step 241 generate a response message 124 to the device application data 233*a* and send a response message with encrypted server application data 106*b* in the message 124 in order to continue the secure communications between device 101 and server 111 depicted in FIG. 2. At step 241, server 111 can use symmetric encryption 241*a* with the plaintext 241*a* comprising at least server application data 106*b* in order to generate the seventh symmetric ciphertext symm-C7 102*s*-7. A step 241 is also depicted and described in connection with FIG. 7*b* below. The symmetric encryption 241*a* can be included within server cryptographic algorithms 103*s* for server 111. The symmetric encryption 241*a* can include input of at least (i) the parameters specified in metadata 212*b* received from device 101 in a message 121 or parameters 220*m*' generated by server 111 in a step 220*a*, and (ii) the symmetric ciphering key S4 231*b* and MAC key MAC4 231*c* from a step 231 above. A step 241 can also include server 111 processing parameters 220*m*', where parameters 220*m*' can include handshake headers, an initialization vector, etc. At the conclusion of step 241, server 111 can send device 101 the seventh symmetric ciphertext symm-C7 102*s*-7 in a message 124.

Device 101 can receive the message 124 and conduct a step 242 in order to decrypt and process the message. Device 101 can use the symmetric ciphering algorithm specified in metadata 220*m* and the fourth symmetric ciphering key S4 231*b* and MAC key MAC4 231*c* in order to read the plaintext values of server application data 106*b*. In a step 242, device 101 can then process the server application data 106*b*. Server application data 106*b* can comprise data formatted according to any one of the following protocols: SIP, IPSec, HTTP, JSON, XML, SSH, MQTT, etc.

Although a system 200 depicted in FIG. 2 and also the system 100*a* depicted in FIG. 1*a* include the use of four separated KEM conducted by device 101 and server 111, in some exemplary embodiments not all four KEM are required, and some KEM could be omitted from exemplary embodiments. As a first exemplary embodiment, the KEM ENCAPS function 103*k* using the device ephemeral public key ePK.device 101*h* could be omitted and the use of a device ephemeral public key ePK.device 101*h* could be omitted as well. For these embodiments, then three separate KEM could be conducted of (i) KEM ENCAPS 101*k* by device 101 using PK.server 101*d* (and corresponding KEM 103*j*), (ii) KEM ENCAPS 103*k*' by server 111 using PK.device 101*a* (and corresponding KEM 101*j*'), and (iii) KEM ENCAPS 101*k*' by device 101 using ePK.server 103*h* (and corresponding KEM 103*j*'). For this embodiment, then the use of a second shared secret key K2 102*k*-2 with HKDF could also be omitted, as well as the use of a second asymmetric ciphertext C2 102*c*-2.

As a second exemplary embodiment, the KEM ENCAPS function 101*k*' using the server ephemeral public key ePK.server 103*h* could be omitted and the use of a server ephemeral public key ePK.server 103*h* could be omitted as well. For these embodiments, then three separate KEM could be conducted of (i) KEM ENCAPS 101*k* by device 101 using PK.server 101*d* (and corresponding KEM 103*j*), (ii) KEM ENCAPS 103*k* by server 111 using ePK.device 101*h* (and corresponding KEM 101*j*), and (iii) KEM ENCAPS 103*k*' by server 111 using PK.device 101*a* (and corresponding KEM 10'*j*'). For this embodiment, then the use of a fourth shared secret key K4 102*k*-4 with HKDF could also be omitted, as well as the use of a fourth asymmetric ciphertext C4 102*c*-4. Other possibilities exist as well for omitting one or two of the four exemplary KEM in a system 200 or system 100*a* without departing from the scope of the present disclosure.

FIG. 3

FIG. 3 is a flow chart illustrating exemplary steps for a device and server conducting (i) a key encapsulation mechanism to mutually derive a symmetric ciphering key, and (ii) symmetric ciphering using the derived symmetric ciphering key, in accordance with exemplary embodiments. The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

FIG. 3 in the left column depicts exemplary steps for a device 101 to conduct steps 208 through 212 in order (i) to conduct a first key exchange mechanism (KEM) KEM 101k with server III in order to mutually derive a first shared secret K1 102k-1 and (ii) generate a first symmetric ciphertext of symm-C1 102s-1 from device 101 for server 111 using at least the first shared secret key K1 102k-1. The steps 208 through 212 were also depicted and described above in connection with FIG. 2. At step 208, device 111 can generate a first random number M1 208a for input into the first KEM ENCAPS 101k function. Random number M1 208a can comprise a message or a number that's used with KEM ENCAPS 101k in order to generate the first shared secret key K1 102k-1. For some embodiments, the value M1 208a could include additional data that is not random and a portion of M1 208a could be a random number. Note the value M1 208a is not transmitted as plaintext to server 111.

The first shared secret key K1 102k-1 can comprise a shared secret key for both the device 101 and server 111 to conduct a first hash-based key derivation function (HKDF) 210a in order to derive a first symmetric ciphering key S1 210b and a first MAC key MAC1 210c. Note the first symmetric ciphering key S1 210b could comprise two values, where a first value is used by device 101 for encryption and a second value is used by server 111 for encryption. Likewise, a first MAC key MAC1 210c could comprise two values, where a first value is used by device 101 for message authentication for messages sent by device 101 and a second value is used by server 111 for message authentication for messages sent by server 111.

Value M1 208a can be input into the first KEM ENCAPS 101k function at step 209. The following example within FIG. 3 will follow the steps for operating a McEliece KEM as summarized in the Wikipedia article "McEliece cryptosystem" dated Nov. 19, 2020 ("McEliece Wikipedia article"), which is incorporated by reference in its entirety, but other and different cryptographic algorithms could be utilized as well. In an exemplary embodiment, the PQC KEM ENCAPS 101k function could follow the KEM steps specified by the McEliece algorithm. Additional details for conducting the KEM ENCAPS 101k with parameters 103f-y specifying McEliece are within the presentation titled "Classic McEliece: conservative code-based cryptography Round 2" dated Aug. 24, 2019, which is also herein incorporated by reference in its entirety (McEliece NIST presentation).

The message "m" in step 1 for "message encryption" in the McEliece Wikipedia article can be the value M1 208a. The server static public key of PK.server 103d can have an exemplary length of 1,357,824 bytes from the McEliece NIST presentation. The KEM ENCAPS 101k function can use values of n=8192 and t=128, with a resulting ciphertext length of 240 bytes for the first asymmetric ciphertext C1 102c-1. Steps for the KEM ENCAPS 101k function can comprise the steps 2-4 for "message encryption" in the McEliece Wikipedia article. The first asymmetric ciphertext C1 102c-1 can be the output or result from step 4 for "message encryption" in the McEliece Wikipedia article. Parameters 103f-y could also specify different values for n, t, the length of PK.server 103d in bytes, as well as the length of the ciphertext C1 102c-1.

Note that when using McEliece based algorithms, the depicted value of a shared secret key K, (such as K1 in FIG. 3 for a step 209) can be the same as the value M1 208a. In general a message M input into a KEM ENCAPS function 101k/103k can be a random number. Other algorithms, such as Kyber, BIKE, SIKE, etc. can generate a shared secret key K that is different than the message M input into the KEM ENCAPS function 101k/103k. In other words, when using McEliece based algorithms, the use of a separate shared secret key K is not required, and the random number input as M into KEM ENCAPS 101k/103k can be used also as the shared secret K.

At step 210, device 101 can use a hash-based key derivation function or an HMAC-based Extract-and-Expand Key Derivation Function (HKDF) 210a with at least the first shared secret key K1 102k-1 (which could be the same as M1 208a for McEliece algorithms) output from KEM ENCAPS function 101k in order to generate both (i) a first symmetric ciphering key of S1 210b and a first message authentication code (MAC) key MAC1 210c. Note that in some exemplary embodiments, additional data 210d mutually shared between device 101 and server 111 besides the first shared secret key K1 102k-1 can also be input into the HKDF 210a in a step 210 in order to generate S1 210b and MAC1 210c. The additional data 210d input into HKDF 210a can comprise plaintext data from the message 121, such as, but not limited to, token1 206a, H(PK.Server 103d) 206b, server ID 111a and/or metadata 212b. Note that separate data commonly shared between device 101 and server 111, such as values specified in a protocol for a secure session could specify plaintext data input into the HKDF 210a as shared data 210d along with the first shared secret key K1 102k-1. The HKDF 210a could be included in device cryptographic algorithms 101s for device 101, as depicted and described in connection with FIG. 1a above.

Although not depicted in FIG. 3, the additional shared data 210d input into HKDF 210a with the first shared secret key K1 102k-1 could include strings or values specified in parameters 103x and 101x for a secure session between device 101 and server 111. In other words, strings, values or numbers mutually shared between device 101 and server 111 before a message 121 from device (such as values specified in standards for a secure session) could be input into the HKDF 210a with the first shared secret key K1 102k-1. In a first exemplary embodiment, the strings, values, or numbers mutually shared between device 101 and server 111 before a message 121 from device 101 could be stored in both device cryptographic algorithms 101s and server cryptographic algorithms 103s. In a second exemplary embodiment, the strings, values, or numbers mutually shared between device 101 and server 111 before a message 121 from device 101 could be stored in both device cryptographic parameters 101x and server cryptographic parameters 103x.

Other data from a message 121 can be used as shared data 210d for input into a HKDF 210a, in addition to the first shared secret key K1 102k-1, without departing from the scope of the present disclosure, such as, but not limited to, (i) a network ID 103a or a server ID 111a that can be included in a message 121, as well as (ii) portions of metadata 212b. For other embodiments, the input of additional data from a message 121 into a HKDF 210a besides K1 102k-1 could be omitted, and S1 210b and MAC1 210c could be derived from K1 102k-a using the HKDF 210a. A HKDF 210a could also derive additional keys besides S1 210b and MAC1 210c, such as, but not limited to an initialization vector for both a server 111 and a device 101.

In addition, although a single HKDF 210a is depicted in FIG. 3, a step 210 by device 101 could use multiple different HKDF 210a in sequence to derive different keys for symmetric encryption 212a by device 101 and symmetric decryption 215a (depicted for server 111 in FIG. 3), such as a first HKDF 210a to derive the mutually shared symmetric ciphering key S1 210b, a second HKDF 210a to derive the MAC key MAC1 210c, and a third HKDF 210a to derive an initialization vector. Further, although a single HKDF 210a is depicted in FIG. 3, a step 210 by device 101 could use multiple different HKDF 210a in sequence to derive different keys for encryption by device 101, such as a first HKDF 210a to derive the a shared symmetric ciphering key S1 210b for device 101, a second HKDF 210a to derive a MAC key MAC1 210c for device 101, and a third HKDF 210a to derive an initialization vector for device 101.

At step 211, device 101 can select and process a plaintext 211a for encryption into a first symmetric ciphertext symm-C1 102s-1. A step 211 is also depicted and described in connection with FIG. 2 above. Note that the first asymmetric ciphertext C1 102c-1 could be previously output from the KEM ENCAPS function 101k (where server uses the first asymmetric ciphertext C1 102c-1 for the first KEM 101k/103j). In exemplary embodiments the data or values for the plaintext 211a selected in a step 211 can include at least the device ephemeral public key ePK.Device 101h, the associated parameters for the ephemeral public key of Params-ePK.device 110f-x, the supported KEM parameters for device 101 of Device.PQC-KEM.Parameters 101f, the device certificate of Cert.Device 101c, the device identity of ID.Device 101d (which could also be in the device certificate), first device data of Data1.Device 106a from a step 206, the Network ID 103a, and a timestamp from device 101 of Timestamp.device 206d. Additional data could be included in plaintext 211a or some data listed above could be omitted from plaintext 211a without departing from the scope of the present disclosure.

At step 212, device 101 can use symmetric encryption 212a with the plaintext 211a from a step 211 in order to generate the first symmetric ciphertext symm-C1 102s-1. A step 212 is also depicted and described in connection with FIG. 2 above. The symmetric encryption 212a can be included within device cryptographic algorithms 101s for device 101. The symmetric encryption 212a can include input of the parameters specified in metadata 212a and the symmetric ciphering key S1 210b and MAC key MAC1 210c from a step 210 above. In a step 212, device 101 can also use an initialization vector for the symmetric encryption 212a, where the initialization vector can be included with metadata 212a. Note that a HKDF 210a could also derive the initialization vector for use by device 101 with symmetric encryption 212a, and the resulting initialization vector could either be (i) included with plaintext metadata 212a, or (ii) omitted from plaintext metadata 212a and server 111 could mutually derive the same initialization vector using the HKDF in a step 214 below. The resulting first symmetric ciphertext symm-C1 102s-1 could be included in the first message 121 sent or transmitted from device 101 to server 111 as depicted in FIG. 2 above.

A step 214 can comprise a KEM decapsulation step by server 111 (or secure server 111' for embodiments where secure server 111' stores and operates with the server static private key SK.server 103b) in order to mutually derive the first shared secret K1 102k-1. Note that FIG. 2 depicted and described the use of a secure server 111' storing and operating with the server static private key SK.server 103b, but for some embodiments such as those depicted in FIG. 3, a server 111 could (i) store and operate with the server static private key SK.server 103b and (ii) conduct the step 214. The following example within FIG. 3 will follow the steps for operating a McEliece KEM as summarized in the Wikipedia article "McEliece cryptosystem" dated Nov. 19, 2020 ("McEliece Wikipedia article"), which is incorporated by reference in its entirety, but other and different cryptographic algorithms could be utilized as well. In an exemplary embodiment, the PQC KEM ENCAPS 101k function could follow the KEM steps specified by the McEliece algorithm. Additional details for conducting the KEM ENCAPS 101k with parameters 103f-y specifying McEliece are within the presentation titled "Classic McEliece: conservative code-based cryptography Round 2" dated Aug. 24, 2019, which is also herein incorporated by reference in its entirety (McEliece NIST presentation).

At step 214, server 111 (or secure server 111' for embodiments where secure server 111' stores SK.server 103b) can input the received first asymmetric ciphertext C1 102c-1 into the KEM DECAPS function 103j. The KEM DECAPS 103j function depicted in FIG. 3 can comprise the function/step of "message decryption" from the McEliece Wikipedia article. The private key SK.server 103b can be stored by server 111 and correspond to the server static public key of PK.server 103d. Note that server 111 could select the private key SK.server 103b based on identity information in message 121 such as the secure hash value H(PK.Server 103d) 206b.

The KEM parameters 103f-y could be both (i) stored by server 111 with SK.server 103b and (ii) correspond to a row from the pages entitled "parameters sets" from the McEliece NIST presentation. The length of "c" and the first asymmetric ciphertext C1 102c-1 can be an exemplary 260 bytes, for KEM parameters 103f-y which specify an exemplary parameter set of n=8192 and t=128. The output of KEM DECAPS 103j and "message decryption" can be the message M1 208 (depicted as K1 102k-1 in FIG. 3 in order to illustrate KEM DECAPS 103j can be generic for Kyber, BIKE, SIKE, etc.), which is also shown as "m" in step 4 of "message decryption" in the McEliece Wikipedia article. Note that other PQC KEM algorithms such as, but not limited to, Kyber and SIKE can be used to derive the first shared secret key K1 102k-1, which could correspond to a key K. In other words, and also as described in FIG. 1a above, the first KEM 101k/103j could be conducted by server 111 with a server static private key SK.server 103b and KEM parameters 103f-y that support any of lattice, multivariate, or SIKE based algorithms without departing from the scope of the present disclosure.

At step 214, server 111 can use a hash-based key derivation function or an HMAC-based Extract-and-Expand Key Derivation Function (HKDF) 210a with at least the first shared secret key K1 102k-1 (or K1=M1 208a in McEliece) output from KEM DECAPS function 103j in order to mutually derive both (i) the first symmetric ciphering key of S1 210b and the first message authentication code (MAC) key MAC1 210c. The server 111 can derive the first symmetric ciphering key S1 210b and MAC key MAC1 210c in a step 210 as depicted and described in connection with FIG. 3 above and also in FIG. 2. In other words, the value of S1 210b calculated by both device 101 and server 111 can be equal, and also the value of MAC1 210c calculated by both device 101 and server 111 can be equal as well.

Note that in some exemplary embodiments, additional shared data 210d mutually shared between device 101 and server 111 besides the first shared secret key K1 102k-1 (or K1=M1 208a in McEliece) can also be input into the HKDF 210a in a step 214 in order to generate S1 210b and MAC1 210c. The additional shared data 210d input into HKDF 210a can comprise data from the message 121, such as, but not limited to, token1 206a, H(PK.Server 103d) 206b, server ID 111a and/or metadata 212b from message 121. Note that separate shared data 210d commonly shared between device 101 and server 111, such as values specified in a protocol for a secure session could specify plaintext data input into the HKDF along with the first shared secret key K1 102k-1. The HKDF 210a could be included in device cryptographic algorithms 101s for device 101, as depicted and described in connection with FIG. 1a above. As contemplated herein, the shared data 210d for a HKDF 210a does not need to be secret, although the shared secret key K2 102k-1 preferably is secret for device 101 and network 103.

Although not depicted in FIG. 3, the additional shared data 210d input into HKEF 210a with the first shared secret key K1 102k-1 could include strings or values specified in parameters 103x and 101x for a secure session between device 101 and server 111. In other words, strings, values or numbers mutually shared between device 101 and server 111 before a message 121 from device (such as values specified in standards for a secure session) could be input into the HKDF 210a in a step 214 by server 111 with the first shared secret key K1 102k-1.

Other data from a message 121 can be used as shared data 210d for input into a HKDF 210a, in addition to the first shared secret key K1 102k-1, without departing from the scope of the present disclosure, such as, but not limited to, (i) a network ID 103a or a server ID 111a that can be included in a message 121, as well as (ii) portions of metadata 212b. For other embodiments, the input of additional shared data 210d from a message 121 into a HKDF 210a in a step 214 besides K1 102k-1 could be omitted, and S1 210b and MAC1 210c could be derived from K1 102k-a using the HKDF 210a. In summary, both device 101 and server 111 can select identical information or bytes, as well as identical sequence of bytes for the additional information from message 121 and/or token1.device 206a and/or metadata 212b for input into HKDF 210a in order for both device 101 and server 111 to mutually derive the same values for S 210b and MAC1 210c. A HKDF 210a in a step 214 for server 111 and step 210 for device 101 could also derive additional keys besides S1 210b and MAC1 210c, such as, but not limited to an initialization vector for both a server 111 and a device 101. As discussed above with a step 210, the key S1 210b could comprise a first key S1 210b-1 for encryption by a device 101 (and decryption by a server 111), and a second key S1 210b-2 for encryption by a server 111 (and decryption by a device 101).

At step 215, server 111 can use symmetric decryption 215a with the first symmetric ciphertext symm-C1 102s-1 received in message 121 in FIG. 2 above in order to read the plaintext 211a. A step 215 is also depicted and described in connection with FIG. 2 above. The symmetric decryption 215a can be included within server cryptographic algorithms 103s for server 111. The symmetric decryption 215a can include input of the parameters specified in metadata 212b from a message 121 and the symmetric ciphering key S1 210b and MAC key MAC1 210c from a step 214 above.

In a step 215, server 111 can also use an initialization vector for the symmetric decryption 215a, where the initialization vector can be included with metadata 212b. Note that a HKDF 210a could also derive the initialization vector for use by server 111 with symmetric decryption 215a, and the resulting initialization vector could either be (i) included with plaintext metadata 212b, or (ii) omitted from plaintext metadata 212b and server 111 could mutually derive the same initialization vector as device 101 using the HKDF 210a from a step 214 above. The resulting plaintext 211a from a step 215 can be stored by server 111 in memory 111m. The plaintext data 211a from a step 215 can be the same as plaintext 211a processed by a device 101 as described for a step 211 above in FIG. 3 and also FIG. 2.

FIG. 4

Figure 4:
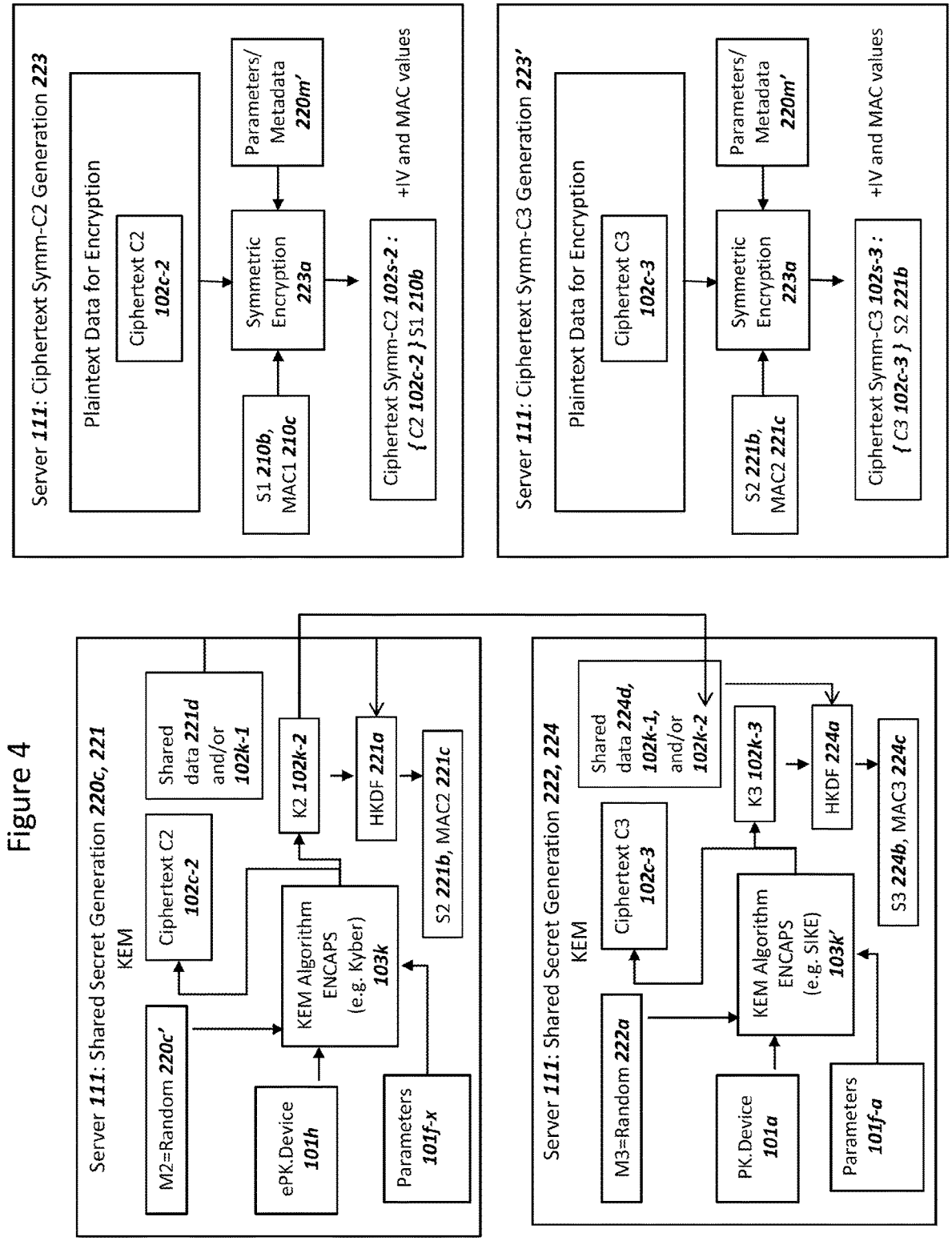
FIG. 4 is a flow chart illustrating exemplary steps for a server conducting (i) a key encapsulation mechanism to mutually derive symmetric ciphering keys, and (ii) symmetric ciphering using the derived symmetric ciphering keys, in accordance with exemplary embodiments.

FIG. 4 is a flow chart illustrating exemplary steps for a server conducting (i) a key encapsulation mechanism to mutually derive symmetric ciphering keys, and (ii) symmetric ciphering using the derived symmetric ciphering keys, in accordance with exemplary embodiments. FIG. 4 in the left column depicts exemplary steps for a server 111 to conduct steps in order to conduct (i) the key exchange mechanism (KEM) ENCAPS 103k with device 101 in order to mutually derive the second shared secret K2 102k-2 and (ii) the KEM ENCAPS 103k' with device 101 in order to mutually derive the third shared secret K3 102k-3. FIG. 4 in the right column depicts exemplary steps for server 111 to (i) process the second symmetric ciphertext symm-C2 102s-2 using the first shared secret key in order encrypt the second asymmetric ciphertext C2 102c-2, and (ii) process the third symmetric ciphertext symm-C3 102s-3 using the second shared secret key in order encrypt the third asymmetric ciphertext C3 102c-3.

As depicted in FIG. 4, a server 111 can conduct a second KEM 103k/101j in a step 220c using both (i) the device ephemeral public key ePK.device 101h received in the first symmetric ciphertext symm-C1 102s-1 (or as plaintext in a message 121), and (ii) the KEM parameters Params-ePK.device 101f-x from device 101 in the first message 121. The output of the second KEM 103k/101j can include a second shared secret key of K2 102k-2 and a second asymmetric ciphertext C2 102c-2. Server 111 can then in steps 222 and 223 generate a third symmetric ciphertext symm-C3 102s-3 using at least the second shared secret key of K2 102k-2. Note that the second symmetric ciphertext symm-C2 102s-2 is depicted and described in connection with FIG. 5b below.

At step 220c, server 111 can use both (i) the received device ephemeral public key of ePK.device 101h from message 121 and (ii) the specified subset of parameters 101f-x for the device ephemeral public key and the second KEM 103k/101j in order to generate both (x) a second asymmetric ciphertext C2 102c-2 and (y) a second shared secret key K2 102k-2. At step 220c, server 111 can use a KEM ENCAPS function 103k with both (i) and (ii) from the previous sentence and a random number for M2 220c' in order to generate both (x) the second asymmetric ciphertext C2 102c-2 and (y) the second shared secret key K2 102k-2. A summary of the step 220c by server 111 with a KEM ENCAPS function 103k was also depicted and described in connection with FIG. 1a and FIG. 2 above. A server 111 can use both device cryptographic algorithms 101s and device cryptographic parameters 101x in order to conduct the step 220.

Note that the operation of a step 220c and KEM ENCAPS function 103k by server 111 can be equivalent to the step 209 and KEM ENCAPS function 101k by device 101, except that (i) server 111 operates with the device ephemeral public key ePK.device 101h and (ii) the KEM parameters 101f-x. Also note that the KEM parameters 101f-x in a step 220c can specify a different PQC KEM algorithm than the PQC KEM algorithm specified for a step 209 by device 101 and KEM parameters 103f-y. Consequently, the detailed steps for a KEM ENCAPS function 103k in a step 220c can be equivalent to the steps for a KEM ENCAPS function 101k in a step 209 (but with a different public key and different PQC KEM parameters and/or algorithm).

In an exemplary embodiment, the parameters 103f-y for PK.server 103d and SK.server 103b can support code-based algorithms, such as, but not limited to, the depicted "McEliece" algorithms in FIG. 3. As mentioned above, the relatively long public key can be distributed to device 101 "out of band" before device 101 communicates with network 103. For these embodiments, the parameters 101f-x selected by device 101 for the device ephemeral public key ePK.device 101h can support lattice based algorithms, such as, but not limited to, the depicted "Kyber" algorithm in FIG. 4. With a "Kyber" algorithm for a KEM ENCAPS function 103k in a step 220c, the operation of the step 220c can follow proposed standards for operation of the Kyber algorithm.

In the paper "CRYSTALS—Kyber: a CCA-secure module-lattice-based KEM" (referred to herein as Kyber paper), the message "m" can be the value M2 220c' which is 256 bits in length for this embodiment. The step 103k depicted in FIG. 4 can comprise the function/step of "Kyber.Encaps" in the Kyber paper with the device ephemeral public key ePK.device 101h. The KEM parameters 101f-x associated with the device ephemeral public key ePK.device 101h could be received with ePK.device 101h in the message 121 in FIG. 2. The KEM parameters 101f-x associated with the device ephemeral public key ePK.device 101h can correspond to a row from Table 1 of the Kyber paper such as, but not limited to, Kyber768. The output of KEM ENCAPS 103k and "Kyber.Encaps" can be the value "c" in the Kyber paper or the second asymmetric ciphertext C2 102c-2 in FIG. 4. The length of "c" and the second asymmetric ciphertext C2 102c-2 can be an exemplary 1152 bytes, for parameters 101f-x which specify an exemplary parameter set of Kyber768.

As depicted in FIG. 4, the output of KEM ENCAPS 103k and "Kyber.Encaps" can also be the first shared secret K in the Kyber paper or the second shared secret key K2 102k-2 in FIG. 4. Note that other PQC KEM algorithms such as, but not limited to, Classic McEliece and SIKE can be used to derive a second shared secret key K2 102k-2, which could correspond to a key K. As noted above in a step 209 for device 101, a shared secret key with the Classic McEliece algorithm can be the same as the message M. The device ephemeral public key ePK.device 101h could support the other PQC KEM algorithms besides Kyber. In other words, and also as described in FIG. 1a above, the KEM 103k/101j could be conducted by server 111 with the device ephemeral public key ePK.device 101h and KEM parameters 101f-x that support any of lattice, code-based, or SIKE based algorithms without departing from the scope of the present disclosure, and support for other PQC KEM algorithms are possible as well without departing from the scope of the present disclosure. Exemplary options for combinations of KEM algorithms are depicted in FIG. 8 below with KEM algorithm options 806.

At step 221, server 111 can use a hash-based key derivation function or an HMAC-based Extract-and-Expand Key Derivation Function (HKDF) 221a with at least the second shared secret key K2 102k-2 output from KEM ENCAPS function 103k in order to generate both (i) a second symmetric ciphering key of S2 221b and a second message authentication code (MAC) key MAC2 221c. Note that in some exemplary embodiments, additional data mutually shared between device 101 and server 111 besides the second shared secret key K2 102k-2 can also be input into the HKDF 221a in a step 221 in order to generate S2 221b and MAC2 221c. In preferred embodiments as depicted in FIG. 4, the first shared secret key K1 102k-1 generated by server 111 in a step 214 in FIG. 3 and FIG. 2 can also be input into the HKDF 221a.

For a step 221, other data input into HKDF 221a besides shared secret keys K2 and/or K1 can comprise shared data 221d. Shared data 221d can include data from the message 121, such as, but not limited to, plaintext data transmitted in message 121 and 122 below. In exemplary embodiments, the additional data as shared data 221d input into HKDF 221a can include the device token token1.device 206a, the server token token2.server 219e, data 121' from message 121 (described for a step 209 in FIG. 3), and also data 122' from a message 122 below. The plaintext data 122' could include metadata 220m and server token token2.server 219e. For other embodiments, the input of (i) the first shared secret key K1 102k-1 and/or (ii) plaintext data from message 121 (e.g. 122') and message 122 (e.g. 122') could be omitted from inclusion in the calculation of HKDF 221a, and the keys S2 221b and MAC2 221c could be derived from the second shared secret key K2 102k-2 from a step 220.

As depicted in FIG. 4, a server 111 can conduct a third KEM 103k'/101j' in steps 220c and 224 using both (i) the device static public key PK.device 101a. The device static public key PK.device 101a could be either (i) received in a message 121 such as within the first symmetric ciphertext symm-C1 102s-1, or (ii) previously stored by server 111 in a database 244. For embodiments where server 111 stores the device static public key PK.device 101a in a database 244, then server 111 could select the device static public key PK.device 101a using (i) the identity of device 101 from ID.device 101d received in message 121 and (ii) parameters 101f-x received in message 121. The output of the third KEM 103k'/101j' can include a third shared secret key of K3 102k-3 and a third asymmetric ciphertext C3 102c-3. Server 111 can then in steps 223' generate a third symmetric ciphertext symm-C3 102s-3 using at least the second shared secret key of K2 102k-2 and second symmetric ciphering key S3 221b.

At step 222, server 111 can use both (i) the device static public key of PK.device 101a from message 121 (or previously stored by server 111) and (ii) the specified subset of parameters 101f-a for the device static public key and the third KEM 103k'/101j' in order to generate both (x) a third asymmetric ciphertext C3 102c-3 and (y) a third shared secret key K3 102k-3. At step 222, server 111 can use a KEM ENCAPS function 103k' with both (i) and (ii) from the previous sentence and a random number for M3 222a in order to generate both (x) the third asymmetric ciphertext C3 102c-3 and (y) the third shared secret key K3 102k-3. A summary of the step 222 by server 111 with a KEM ENCAPS function 103k' was also depicted and described in connection with FIG. 1a and FIG. 2 above. A server 111 can use both device cryptographic algorithms 101s and device cryptographic parameters 101x in order to conduct the step 222.

Note that the operation of a step 222 and KEM ENCAPS function 103k' by server 111 can be equivalent to the step 209 and KEM ENCAPS function 103k by server 111, except that (i) server 111 operates with the device static public key PK.device 101a and (ii) the KEM parameters 101f-a. Also note that the KEM parameters 101f-a in a step 222 can specify a different PQC KEM algorithm than the PQC KEM algorithm specified for a step 220 by server 111 and KEM parameters 101f-x. Consequently, the detailed steps for a KEM ENCAPS function 103k' in a step 222 can be equivalent to the steps for a KEM ENCAPS function 103k in a step 220 (but with a different public key and different PQC KEM parameters and/or algorithm).

At step 222, server 111 can derive or generate a random number M2 222a for use in a third KEM 103k'/101j' between server 111 and device 101. At step 222, server 111 can use both (i) the received and/or previously stored device static public key of PK.device 101a and (ii) the specified subset of parameters 101f-x or 101f-a for the device static public key and the third KEM 103k'/101j' in order to generate both (x) a third asymmetric ciphertext C3 102c-3 and (y) a third shared secret key K3 102k-3. At step 222, server 111 can use a KEM ENCAPS function 103k' with both (i) and (ii) from the previous sentence in order to generate both (x) the third asymmetric ciphertext C3 102c-3 and (y) the third shared secret key K3 102k-3. A summary of the step 222 by server 111 with a KEM ENCAPS function 103k' was also depicted and described in connection with FIG. 1a above. A server 111 can use both server cryptographic algorithms 103s and server cryptographic parameters 103x in order to conduct the step 220c.

At step 224, server 111 can use a hash-based key derivation function or an HMAC-based Extract-and-Expand Key Derivation Function (HKDF) 224a with at least the third shared secret key K3 102k-3 output from KEM ENCAPS function 103k' in order to generate both (i) a third symmetric ciphering key of S3 224b and a third message authentication code (MAC) key MAC3 224c. Note that in some exemplary embodiments, additional data comprising shared data 224d mutually shared between device 101 and server 111 besides the third shared secret key K3 102k-3 can also be input into the HKDF 224a in a step 224 in order to generate S3 224b and MAC3 224c. The additional shared data 224d input into HKDF 224a can comprise data from the message 121 and the message 122, such as, but not limited to, token1 206a, token2 219e, the first asymmetric ciphertext C1 102c-1, and any data as transmitted through IP network in message 121 and message 122. Metadata 212b and/or metadata 220m could be input into the HKDF 224a as well.

In preferred exemplary embodiments, in a step 224, at least the first shared secret key K1 102k-1 from a step 214 and the second shared secret key K2 102k-2 from step 220c and the third shared secret key K3 102k-3 from step 222 are input in the HKDF 224a in order to generate keys S3 224b and MAC3 224c. In this manner, the third symmetric ciphering key S3 and MAC key MAC3 can be mutually derived with device 101 more securely by including input from three separate shared secrets (e.g. K1 and K2 and K3, which can be derived by separate KEM algorithms), compared to deriving the key S3 and MAC3 using only a single KEM algorithm. In other words, the combination of at least K1 and K2 and K3 for HKDF 224a provides security equal to at least the stronger of the first KEM (for KEM DECAPS 103j) and the second KEM (for KEM ENCAPS 103k) and the third KEM (for KEM ENCAPS 103k').

As discussed above for the generation of S2 221b from a second HKDF 221a by server 111 in a step 221, the third symmetric ciphering key S3 224b in a step 224 can comprise a first key S3 224b-1 for encryption by server 111 and a second key S3 224b-2 for decryption by server 111. The first S3 224b-1 can be used by server 111 to encrypt data using the key "S3" for symmetric ciphertext sent to device 101 in a message 122, and the second S3 221b-2 can be used by server 111 to decrypt data using the key "S3" received from device 101 in a message 123 below. In a step 228 below for device 101, the device 101 could also likewise derive two different values for the key S3 comprising the first S3 221b-1 for decrypting data in a message 122 using "S3" and the second S3 224b-2 for encrypting data sent to server 111 in a message 123 using "S3". Likewise, server 111 in a step 224 can generate two values for MAC key MAC3 224c, where the first MAC3 is used by server 111 to generate MAC codes for device 101 sent in a message 122, and the second MAC3 is used by server 111 to verify MAC codes received from device 101 in a message 123. Device 101 could also derive two values for the MAC key MAC3 in a step 228 below.

At step 223, server 111 can use symmetric encryption 223a with the second shared secret key K2 102k-2 from a step 221 above in order to generate a second symmetric ciphertext symm-C2 102s-2. The symmetric encryption 223a can be included within server cryptographic algorithms 103s for server 111. The symmetric encryption 223a can include input of at least (i) the parameters 220m' specified in metadata 220m from a step 220a above for server 111, and (ii) the symmetric ciphering key S2 221b and MAC key MAC2 221c from a step 221 above. A step 223 can also include server processing metadata 220m, where metadata 220m can include plaintext data to conduct symmetric encryption 223a such as handshake headers, an initialization vector, an identity of the symmetric ciphering key to use, etc. Parameters 220m' can comprise a portion of the metadata 220m determined in a step 220 above. Note that the output of the step 223 can comprise a "double encrypted" second asymmetric ciphertext C2 102c-2, where (i) the first layer of encryption can be via asymmetric encryption via the second KEM 103k/101j from a step 220c, and (ii) the second layer of encryption can be via symmetric encryption 223a of the second asymmetric ciphertext C2 102c-2.

For some exemplary embodiments, a step 223 can be omitted and the second asymmetric ciphertext C2 102c-2 could be transmitted without the additional layer of symmetric encryption from a step 223. In other words, the data depicted as transmitted in a message 122 in FIG. 2 regarding the second asymmetric ciphertext C2 102*c*-2 could be "C2 102*c*-2" instead of the depicted value of "Symm-C2 102*s*-2 ({C2 102*c*-2} S1 210*b*)."

At step 223', server 111 can use symmetric encryption 223*a* with the third asymmetric ciphertext C3 102*k*-3 from a step 224 above in order to generate a third symmetric ciphertext symm-C3 102*s*-3. A step 223' is also depicted and described in connection with FIG. 4 below. The symmetric encryption 223*a* can be included within server cryptographic algorithms 103*s* for server 111. The symmetric encryption 223*a* can include input of at least (i) the parameters 220*m*' specified in metadata 220*m* from a step 220*a* above for server 111, and (ii) the symmetric ciphering key S3 224*b* and MAC key MAC3 224*c* from a step 224 above. A step 223' can also include server processing metadata 220*m*, where metadata 220*m* can include plaintext data to conduct symmetric encryption 223*a* such as handshake headers, an initialization vector, an identity of the symmetric ciphering key to use, etc. Parameters 220*m*' can comprise a portion of the metadata 220*m* determined in a step 220 above. Note that the output of the step 223' can comprise a "double encrypted" third asymmetric ciphertext C3 102*c*-3, where (i) the first layer of encryption can be via asymmetric encryption via the third KEM 103*k*'/101*j*' from a step 224, and (ii) the second layer of encryption can be via symmetric encryption 223*a* of the third asymmetric ciphertext C3 102*c*-3.

For some exemplary embodiments, a step 223' can be omitted and the third asymmetric ciphertext C3 102*c*-3 could be transmitted without the additional layer of symmetric encryption from a step 223'. In other words, the data depicted as transmitted in a message 122 in FIG. 2 regarding the third asymmetric ciphertext C3 102*c*-3 could be "C3 102*c*-3" instead of the depicted value of "Symm-C3 102*s*-3 ({C3 102*c*-3} S2 221*b*)."

FIG. 5

Figure 5:
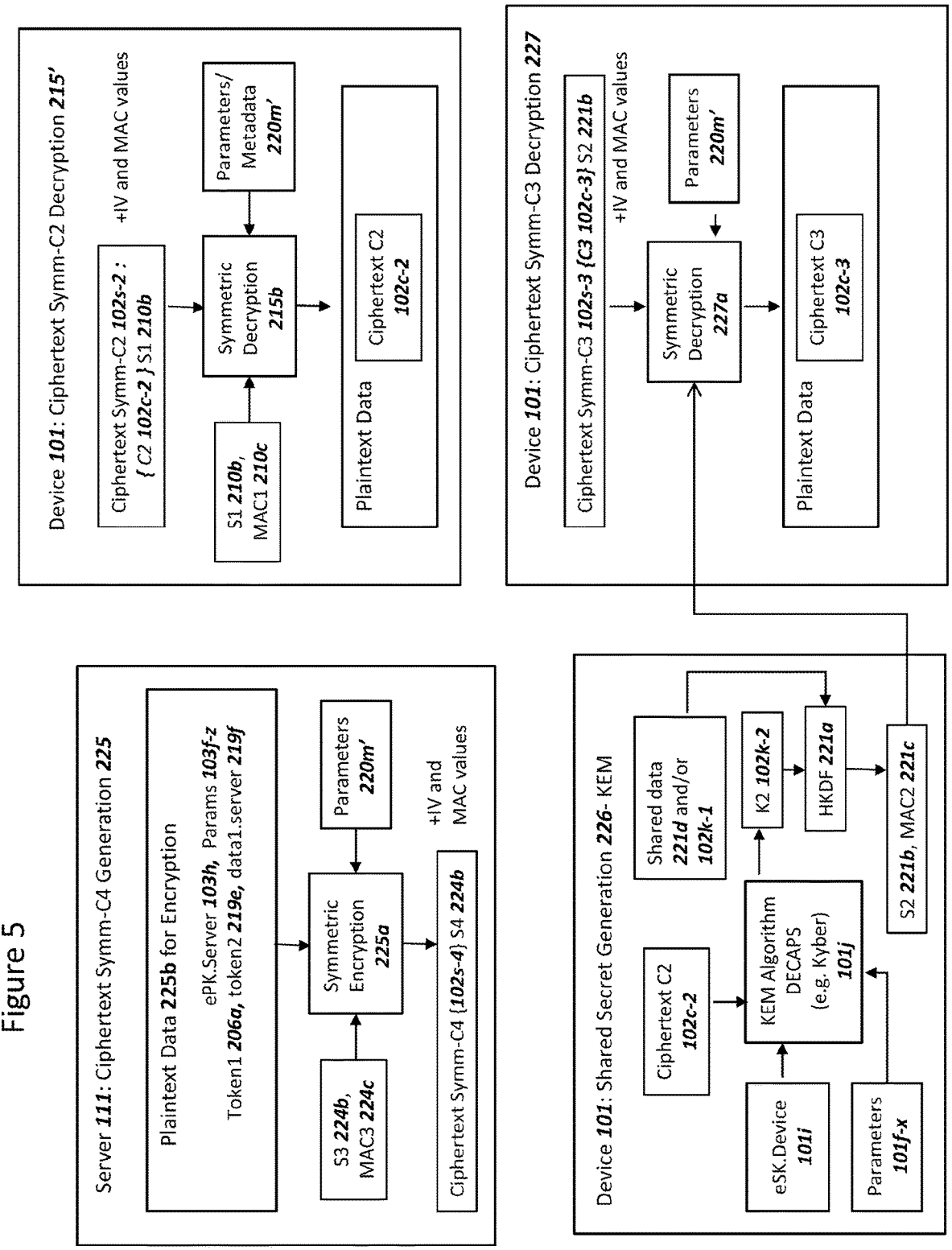
FIG. 5 is a flow chart illustrating exemplary steps for a server conducting symmetric ciphering, and a device conducting (i) a key encapsulation mechanism to mutually derive a symmetric ciphering key, and (ii) symmetric ciphering using the derived symmetric ciphering key, in accordance with exemplary embodiments.

FIG. 5 is a flow chart illustrating exemplary steps for a server conducting symmetric ciphering, and a device conducting (i) a key encapsulation mechanism to mutually derive a symmetric ciphering key, and (ii) symmetric ciphering using the derived symmetric ciphering key, in accordance with exemplary embodiments.

For a step 225, server 111 can generate a fourth symmetric ciphertext symm-C4 102*s*-4 using the third symmetric ciphering key S3 224*b*. In a step 225, server 111 can select and process data for plaintext 225*b*, where the plaintext 225*b* can include data for (i) the server ephemeral public key ePK.server 103*h* generated in a step 219*c* in FIG. 2 above, (ii) the KEM parameters 103*f-z* for the server ephemeral public key ePK.server 103*h*, where the KEM parameters 103*f-z* can be selected in a step 219*b* in FIG. 2 above, (iii) the device 101 token token1.device 206*a* which was received in a message 121 above, and (iv) data for server 111 of data1.server 219*f* from a step 219*a* above in FIG. 2. For some embodiments, the device 101 token token1.device 206*a* could be omitted from a plaintext 225*b*. But, by including the device 101 token token1.device 206*a* in a plaintext 225*b*, the subsequent message 122 and a system 200 can operate in a manner that is more robust against replay attacks.

Although not depicted for a step 225 in FIG. 5, plaintext 222*a* could also include a secure hash value over the data previously communicated between device 101 and server 111 in message 121. Additional data mutually shared between device 101 and server 111 outside of messages 121 and 122 could be included in the generation of the secure hash value. For some exemplary embodiments, then the secure hash value can also be over the first shared secret key K1 102*k*-1.

At step 225, server 111 can use symmetric encryption 225*a* with the plaintext 225*b* in order to generate the fourth symmetric ciphertext C4 102*s*-4. The symmetric encryption 225*a* can be included within server cryptographic algorithms 103*s* for server 111. The symmetric encryption 225*a* can include input of at least (i) the parameters 220*m*' specified in metadata 220*m* from a step 220*a* in above for server 111, and (ii) the third symmetric ciphering key S3 224*b* and MAC key MAC3 224*c* from a step 224 above.

A step 225 can also include server 111 processing metadata 220*m*, where metadata 220*m* can include handshake headers, an initialization vector, an identity of the algorithm for symmetric encryption 225*a*, etc. Metadata 220*m* and parameters 220*m*' can comprise a portion of the metadata 212*b* received in a message 121 from device 101. Or metadata 220*m* and parameters 220*m*' can comprise values for operating a symmetric encryption by server 111 and decryption by device 101 that a distinct and different than within the metadata 212*b* (such as metadata 212*b* specifying a first symmetric ciphering algorithm for data from device 101 and metadata 220*m* specifying a second and different symmetric ciphering algorithm for data from server 111). In a step 225, server 111 can also use an initialization vector for the symmetric encryption 225*a*, where the initialization vector can be either (i) included with metadata 220*m*, or (ii) mutually derived with device 101 using the KEM 103*k*'/101*j*' and HKDF 224*a*.

For embodiments where the second message includes a "double encrypted" second symmetric ciphertext symm-C2 102*s*-2, device 101 could conduct a step 215' as depicted and described in connection with FIG. 5 in order to decrypt the second symmetric ciphertext symm-C2 102*s*-2 using at least the first symmetric key S1 210*b* in order to read a plaintext value for the second asymmetric ciphertext C2 102*c*-2. Device 101 could process the "double encrypted" second symmetric ciphertext symm-C2 102*s*-2 using the metadata 212*b* that was transmitted by device 101 in a message 122 (such as specifying a symmetric ciphering algorithms as well as parameters such as AES-128 or AES-192, etc.). Or, device 101 could use parameters 220*m*' from a message 122 with a step 215'. Device 101 could use a symmetric ciphering algorithm 215*b* in a step 215' in order to convert the second symmetric ciphertext symm-C2 102*s*-2 into a plaintext value for the second asymmetric ciphertext C2 102*c*-2.

In other words, for a step 215' the device 101 could (i) use the first symmetric ciphering key S1 210*b* and MAC key MAC1 210*c* (from a step 209 in FIG. 2 and FIG. 3) in order to (ii) decrypt the second symmetric ciphertext symm-C2 102*s*-2 in order to read the plaintext value for the second asymmetric ciphertext C2 102*c*-2 (e.g. remove the first layer of symmetric encryption on the "double encrypted" data of symm-C2 102*s*-2). As described above for a step 210 by device 101, the step 210 could derive two values for the key S1, where device 101 (*i*) encrypted the first symmetric ciphertext symm-C1 102*s*-1 using a key S 210*b*-1 and decrypts the second symmetric ciphertext symm-C2 102*s*-2 using a key S1 210*b*-2. For some embodiments, the use of a first symmetric ciphering key S1 210*b* could be omitted in a step 215' (and also corresponding step 223 by server 111), and the second ciphertext symm-C2 102*s*-2 could comprise the second asymmetric ciphertext C2 102*c*-2 with MAC codes that could be verified by device 101 with the first MAC key MAC1 210*c*. In other words, for some embodiments, the second symmetric ciphertext 102s-2 may not be "double encrypted" and alternatively include MAC codes for verification and authentication with the MAC key MAC1 210c.

At step 226, device 101 can use (i) the specified KEM parameters 101f-x transmitted in message 121 along with (ii) device cryptographic algorithms 101s to conduct the KEM DECAPS 101j function with the received second asymmetric ciphertext C2 102c-2 (which could have symmetric encryption using key S1 102s-1 removed in a step 215' above). The device can use the device ephemeral private key of eSK.device 101i with the KEM DECAPS 101j and the received second ciphertext 102c-2 (where the first layer of symmetric encryption can be removed in a step 215') in order to generate the second shared secret key K2 102k-2. Note that for some PQC algorithms, the KEM DECAPS 101j function could fail for a small frequency of messages 224 and second asymmetric ciphertext C2 102c-2, such as less than one failure per million or billion KEM, and if a step 226 fails, then device 101 could send server 111 an error message and request regeneration and retransmission of a message 122.

A step 226 can also include device 101 using at least the second shared secret key K2 102k-2 with the HKDF 221a in order to generate the second symmetric ciphering key S2 221b and the second MAC key MAC1 221c. Note that the HKDF 221a in a step 226 can be the same HKDF 221 in a step 221 used by server 111 in FIG. 4 above, in order to derive the exact same values by device 101 as server 111. In some exemplary embodiments, the HKDF 221a can also include input of at least the first shared secret key K1 102k-1 in addition to the second shared secret key K2 102k-2 in order to generate the second symmetric ciphering key S2 221b and the MAC key MAC1 221c. In this manner and by including the first shared secret key K1 102k-1, the symmetric ciphering key S2 and MAC key MAC2 can be mutually derived with server 111 more securely by including input from two separate shared secrets (e.g. K1 and K2, which can also be derived by separate types of KEM algorithms, such as an example first type of McEliece for K1 and an example second type Kyber for K2), compared to deriving the keys S2 and MAC2 using only a single KEM algorithm (e.g. using either (i) K2 only or (ii) a single, same KEM algorithm for K1 and K2). In other words, the combination of (x) K1 output from a first KEM 101k/103j and K2 output from a second KEM 103k/101j for (y) HKDF 221a provides security equal to at least the stronger of the first KEM (for KEM ENCAPS 101k by device 101) and the second KEM (for KEM DECAPS 101j). At the conclusion of a step 226, device 101 can store the second symmetric ciphering key S2 221b and MAC key MAC2 221c, which are mutually and secretly shared between device 101 and server 111.

At step 227, device 101 can use symmetric decryption 227a with the third symmetric ciphertext symm-C3 102s-3 from the second message 122, in order to read a plaintext value for the third asymmetric ciphertext C3 102c-3. The symmetric decryption 227 can be included within device cryptographic algorithms 101s for device 101. The symmetric decryption 227 can include input of the parameters 220m' specified in metadata 220m from the second message 122 and the second symmetric ciphering key S2 221b and second MAC key MAC2 221c from a step 226 above. Note that metadata 220m can include parameters for a symmetric decryption 226a.

FIG. 6

Figure 6:
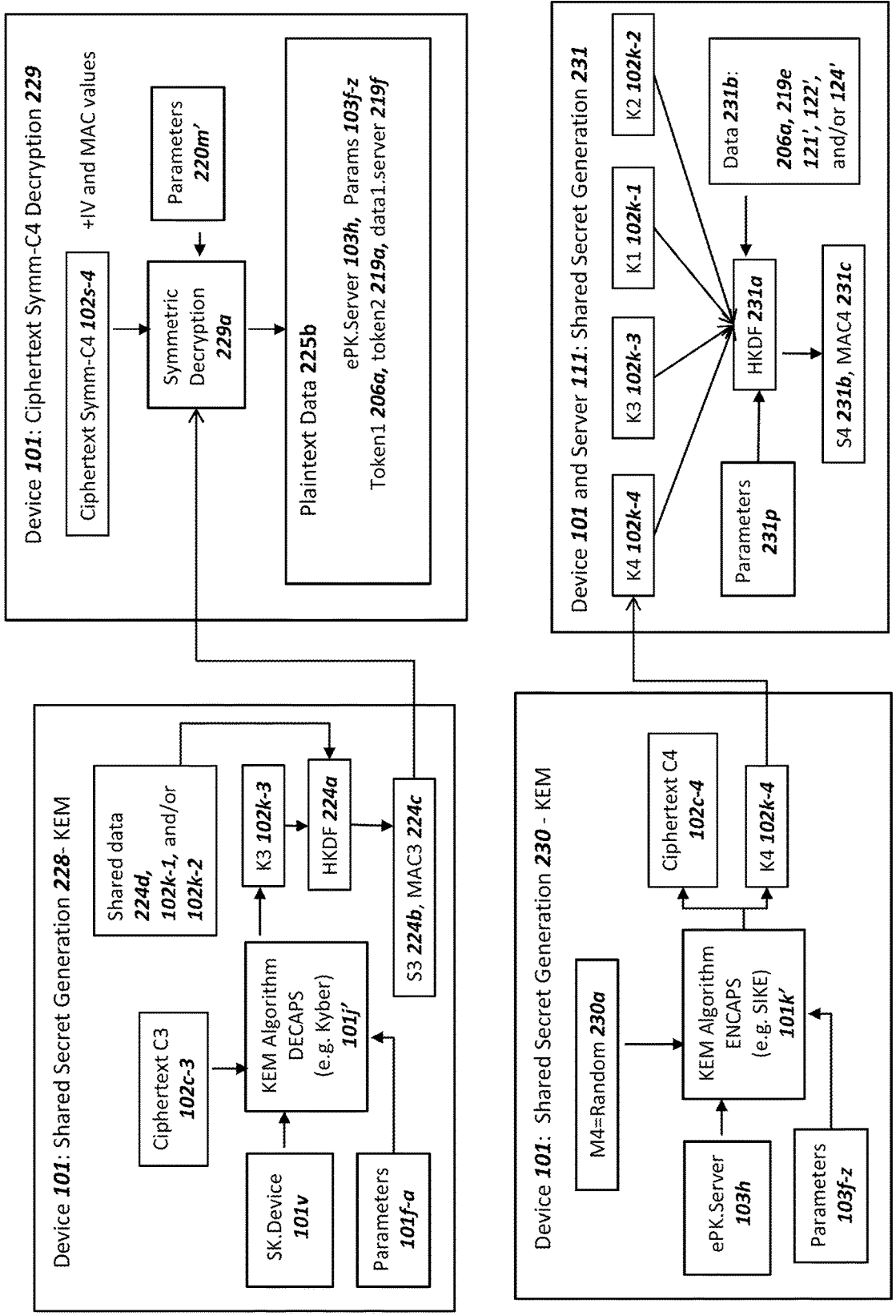
FIG. 6 is a flow chart illustrating exemplary steps for a device conducting (i) a key encapsulation mechanism to mutually derive symmetric ciphering keys, (ii) symmetric ciphering using a derived symmetric ciphering key, and (iii) the generation of shared secrets for the device and a server, in accordance with exemplary embodiments.

FIG. 6 is a flow chart illustrating exemplary steps for a device conducting (i) a key encapsulation mechanism to mutually derive symmetric ciphering keys, (ii) symmetric ciphering using a derived symmetric ciphering key, and (iii) the generation of shared secrets for the device and a server, in accordance with exemplary embodiments.

At step 228, device 101 can use the specified KEM parameters 101f-a for the device static public key PK.device 101a stored by device 101 (possibly also transmitted in a message 121) along with device cryptographic algorithms 101s to conduct the KEM DECAPS 101j' function with the received third asymmetric ciphertext C3 102c-3. The device can use the device static private key of SK.device 101v with the KEM DECAPS 101j' and the received third ciphertext 102c-3 (where the first layer of symmetric encryption can be removed in a step 227) in order to generate the third shared secret key K3 102k-3. Note that for some PQC algorithms, the KEM DECAPS 101j' function could fail for a small frequency of messages 122 and third asymmetric ciphertext C3 102c-3, such as less than one failure per million or billion KEM, and if a step 228 fails, then device 101 could send server 111 an error message and request regeneration and retransmission of a message 122.

At step 228, device 101 can use a hash-based key derivation function or an HMAC-based Extract-and-Expand Key Derivation Function (HKDF) 224a with at least the third shared secret key K3 102k-3 output from KEM DECAPS function 101j' in order to generate both (i) a third symmetric ciphering key of S3 224b and a third message authentication code (MAC) key MAC3 224c. The same HKDF 224a can be used by server 111 in a step 224 above. Note that in some exemplary embodiments, additional shared data 224d mutually shared between device 101 and server 111 besides the third shared secret key K3 102k-3 can also be input into the HKDF 224a in a step 228 in order to generate S3 224b and MAC3 224c. The additional shared data 224d input into HKDF 224a can comprise data from the message 121 and the message 122, such as, but not limited to, token1 206a, token2 219e, the first asymmetric ciphertext C1 102c-1, and any data as transmitted through IP network in message 121 and message 122. As one example, the HKDF 224 could include input any or all of the data from first, second, and third symmetric ciphertexts symm-C1/C2/C3. As another example, the HKDF 224 could also include input of the second asymmetric ciphertext C2 102c-2 and the third asymmetric ciphertext C3 102c-3. Metadata 212b and/or metadata 220m could be input into the HKDF 224a as well.

In preferred exemplary embodiments, in a step 228, at least the first shared secret key K1 102k-1 from a step 210 and the second shared secret key K2 102k-2 from step 226 and the third shared secret key K3 102k-3 from step 228 are input in the HKDF 224a in order to generate keys S3 224b and MAC3 224c. In this manner, the third symmetric ciphering key S3 and MAC key MAC3 can be mutually derived with server 111 more securely by including input from three separate shared secrets (e.g. K1 and K2 and K3, which can be derived by separate KEM algorithms), compared to deriving the key S3 and MAC3 using only a single KEM algorithm. In other words, the combination of at least K1 and K2 and K3 for HKDF 224a provides security equal to at least the stronger of the first KEM (for KEM ENCAPS 101k) and the second KEM (for KEM DECAPS 101j) and the third KEM (for KEM DECAPS 101j').

As discussed above for the generation of S2 221b from a second HKDF 221a by server 111 in a step 221, the third symmetric ciphering key S3 224b in a step 228 can comprise a first key S3 224*b*-1 for decryption by device 101 and a second key S3 224*b*-2 for encryption by device 101. The first S3 224*b*-1 can be used by device to decrypt data using the key "S3" for symmetric ciphertext sent to device 101 in a message 122, and the second S3 224*b*-2 can be used by device 101 to encrypt data using the key "S3" for symmetric ciphertext sent by device 101 in a message 123 below. Likewise, device 101 in a step 228 can generate two values for MAC key MAC3 224*c*, where the first MAC3 is used by device 101 to verify MAC codes from server 111 sent in a message 122, and the second MAC3 is used by device 101 to generate MAC codes transmitted from device 101 in a message 123. Both device 101 and server 111 could also derive (i) two values for the MAC key MAC4 and (ii) two values for the symmetric ciphering key S4 in a step 231 below.

At step 229, device 101 can use symmetric decryption 229*a* with the fourth symmetric ciphertext symm-C4 102*s*-4 from the second message 122, in order to read plaintext data 224*a*. The symmetric decryption 229 can be included within device cryptographic algorithms 101*s* for device 101. The symmetric decryption 229 can include input of the parameters 220*m*' specified in metadata 220*m* from the second message 122 and the third symmetric ciphering key S3 224*b* and third MAC key MAC3 224*c* from a step 228 above. Note that metadata 220*m* can include parameters for a symmetric decryption 229*a*

The data for plaintext 224*a* can comprise the same plaintext 224*a* generated by server 111 in a step 224 above. The plaintext data can include (i) the server ephemeral public key ePK.server 103*h*, (ii) the KEM parameters 103*f*-*z* for the server ephemeral public key ePK.server 103*h*, where the KEM parameters 103*f*-*z* can be a subset of parameters 101*f* transmitted by device 101 in a message 121, (iii) the device 101 token token1.device 206*a* which was transmitted by device 101 in a message 121 above, and (iv) data for server 111 of data1.server 219*f*. At step 229, device 101 could process the server data data1.server 219*f*, which could include instructions for device 101 from server 111.

At step 230, device 101 can derive or generate a random number M4 230*a* for use in a fourth KEM 101*k*'/103*j*' between device 101 and server 111. The random number M4 230*a* can be used for a subsequent KEM in a step 230. The function and use of a step 230 and a KEM ENCAPS function 101*k* is also depicted and described in FIG. 6 below. At step 230, device 101 can use both (i) the received server ephemeral public key of ePK.server 103*h* and (ii) the specified subset of parameters 103*f*-*z* for the server ephemeral public key and the fourth KEM 101*k*'/103*j*' in order to generate both (x) a fourth asymmetric ciphertext C4 102*c*-4 and (y) a fourth shared secret key K4 102*k*-4. At step 230, device 101 can use a KEM ENCAPS function 101*k*' with both (i) and (ii) from the previous sentence in order to generate both (x) the fourth asymmetric ciphertext C4 102*c*-4 and (y) the fourth shared secret key K4 102*k*-4. A summary of the step 230 by device 101 with a KEM ENCAPS function 101*k*' was also depicted and described in connection with FIG. 1*a* above. A device 101 can use both device cryptographic algorithms 101*s* and device cryptographic parameters 101*x* in order to conduct the step 230.

At step 231, device 101 can use a hash-based key derivation function (HKDF) 231*a* with at least the third shared secret key K3 102*k*-3 output from KEM ENCAPS function 101*k*' in order to generate both (i) a fourth symmetric ciphering key of S4 231*b* and a fourth message authentication code (MAC) key MAC4 231*c*. Note that in some exemplary embodiments, additional data mutually shared between device 101 and server 111 besides the fourth shared secret key K4 102*k*-4 can also be input into the HKDF 231*a* in a step 231 in order to generate S4 231*b* and MAC4 231*c*. The additional data input into HKDF 231*a* can comprise data from the message 121 and the message 122 and the message 123 such as, but not limited to, token1 206*a*, token2 219*e*, the first asymmetric ciphertext C1 102*c*-1, and any data as transmitted through IP network in message 121 and message 122. As one example, the HKDF 231*a* could include input any or all of the first, second, third, and fourth symmetric ciphertexts symm-C1/C2/C3/C4, as well as plaintext data from any of the first, second, third, and fourth symmetric ciphertexts symm-C1/C2/C3/C4. As another example, the HKDF 231*a* could also include input of the second asymmetric ciphertext C2 102*c*-2 and/or the third asymmetric ciphertext C3 102*c*-3 and/or the fourth ciphertext 102*c*-4. Metadata 212*b* and/or metadata 220*m* could be input into the HKDF 231*a* as well.

In preferred exemplary embodiments, in a step 231, at least all of the first shared secret key K1 102*k*-1, the second shared secret key K2 102*k*-2, the third shared secret key K3 102*k*-3, and the fourth shared secret key K4 102*k*-4 are input in the HKDF 231*a* in order to generate keys S4 231*b* and MAC4 231*c*. In this manner, the fourth symmetric ciphering key S4 and MAC key MAC4 can be mutually derived with server 111 more securely by including input from four separately generated shared secrets (e.g. K1 and K2 and K3 and K4, which may be derived by separate KEM algorithms for some embodiments), compared to deriving the key S4 and MAC4 using only a single KEM algorithm. In other words, the combination of K1 and K2 and K3 and K4 for HKDF 231*a* provides security equal to at least the stronger of the first KEM (for KEM ENCAPS 101*k* with PK.server 103*d*) and the second KEM (for KEM DECAPS 101*j* with eSK.device) and the third KEM (for KEM DECAPS 101*j*' with SK.device 101*v*) and the fourth KEM (for KEM ENCAPS 101*k*' with ePK.server 103*h*).

As discussed above for the generation of S3 224*b* from a HKDF 224*a* by device 101 in a step 228, the output of a HKDF 231*a* and the fourth symmetric ciphering key S4 231*b* can comprise a first key S4 231*b*-1 for encryption by device 101 and a second key S4 231*b*-2 for encryption by server 111 (and decryption by device 101). The first key S4 231*b*-1 can be used by device 101 in an encryption step 235 below and the first key S4 231-*b* could be used by server 111 in a decryption step 239 below. The second key S4 231*b*-2 could be used by server 111 in an encryption step 241 below and by device 101 in a decryption step 242.

As depicted for a step 231 in FIG. 6, a HKDF 231*a* can also include parameters 231*p*. The parameters 230*p* could specify values and settings for operation of the HKDF 231*a*, such as a secure hash algorithm 804 (depicted and described in connection with FIG. 8 below) to use with the HKDF 231*a*. Other values could be included in parameters 231*p*, such as, but not limited to, the sequence of values for input into the HKDF 231*a*, the use or omission of padding values, the use of "big endian" or "little endian" for the byte order of values such as shared secret keys input into the HKDFR 231*a*, etc. Both server 111 and device 101 could store and use a commonly shared set of parameters 231*p*. For some embodiments, the parameters 231*p* (or a value specifying or identifying the parameters 231*a*) could be included within metadata transmitted by device 101 or server 111 with symmetric ciphertext in messages 121, 122, 123, etc. In addition, although the use of parameters 231*p* are depicted with HKDF 231*a*, other HKDF in the present disclosure could use parameters equivalent to parameters 231*p*, such as (i) HKDF 210a using a first set of parameters (which could be included within or specified by metadata 212b), and (ii) HKD 221b using a second set of parameters (which could be included within or specified by metadata 220m, etc.

FIG. 7a

Figure 7A:
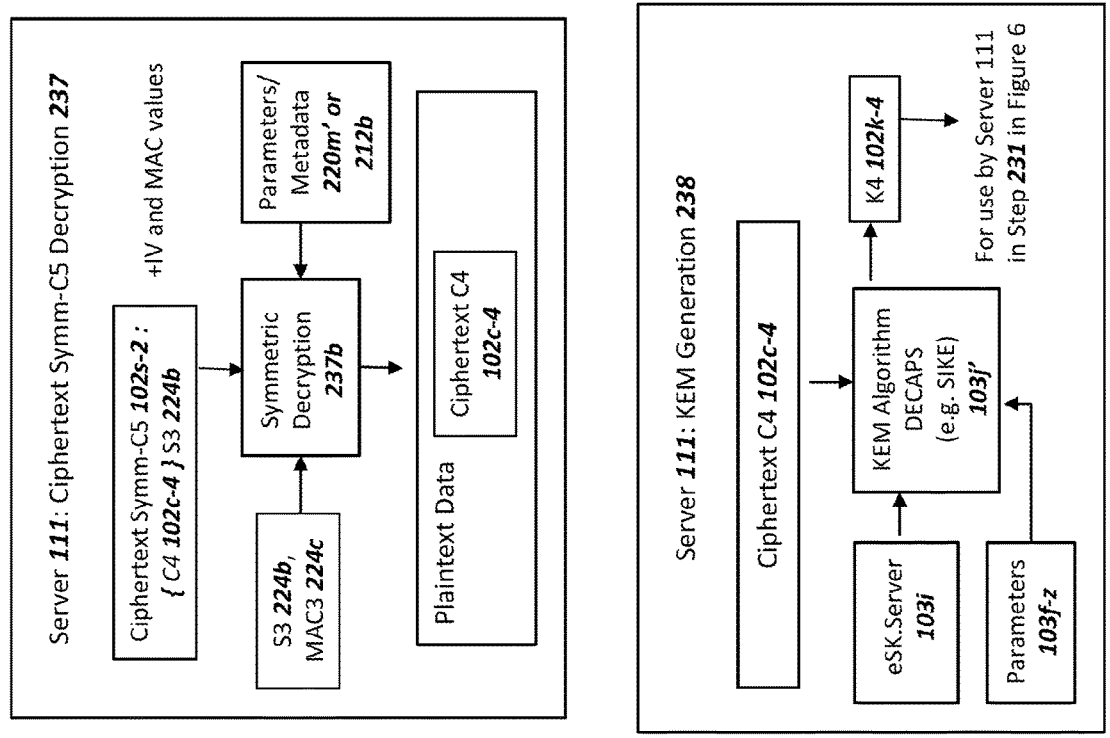
FIG. 7a is a flow chart illustrating exemplary steps for a device conducting symmetric ciphering using symmetric ciphering keys mutually derived with a server, and for a server conducting (i) symmetric ciphering using a mutually derived symmetric ciphering key and (ii) a key encapsulation mechanism to mutually derive a symmetric ciphering key, in accordance with exemplary embodiments.
Figure 7A:
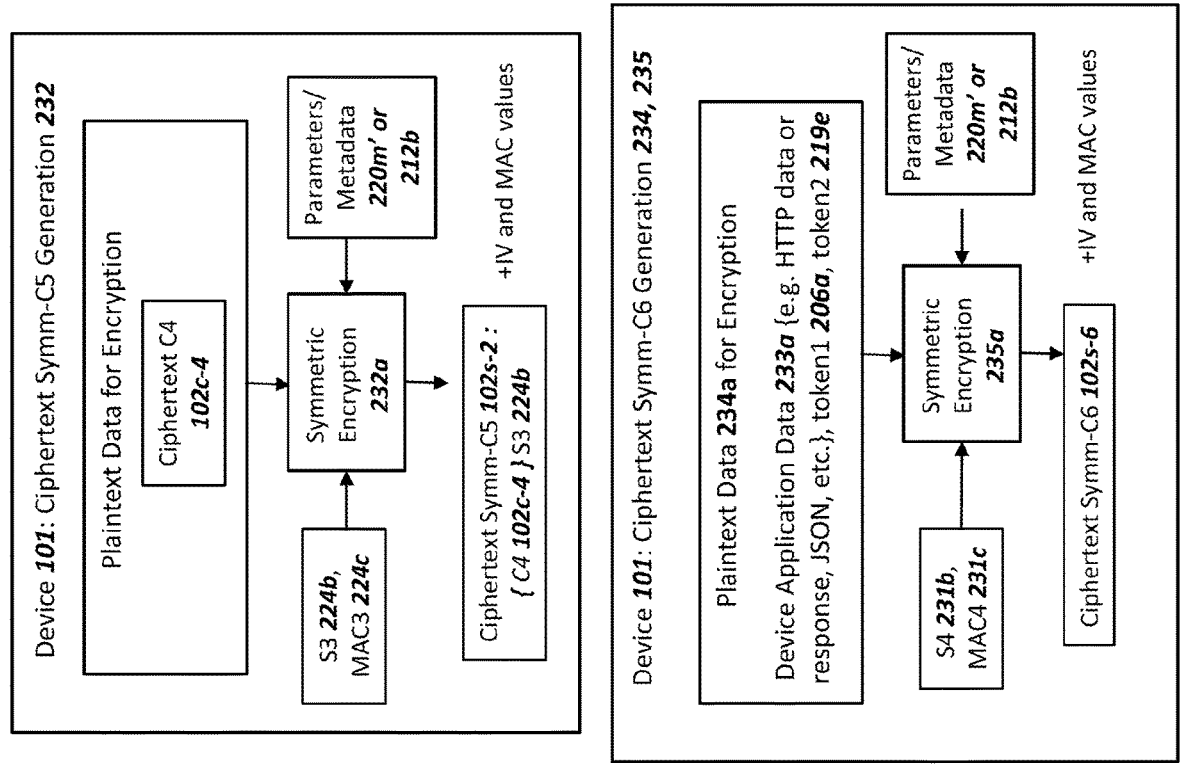

FIG. 7a is a flow chart illustrating exemplary steps for a device conducting symmetric ciphering using symmetric ciphering keys mutually derived with a server, and for a server conducting (i) symmetric ciphering using a mutually derived symmetric ciphering key and (ii) a key encapsulation mechanism to mutually derive a symmetric ciphering key, in accordance with exemplary embodiments.

At step 232, device 101 can use symmetric encryption 232a with the fourth asymmetric ciphertext C4 102c-4 from a step 230 above in order to generate a fifth symmetric ciphertext symm-C5 102s-5. A step 232 is also depicted and described in connection with FIG. 7a below. The symmetric encryption 232a can be included within device cryptographic algorithms 101s for device 101. The symmetric encryption 232a can be equivalent or the same as the symmetric encryption 239a used by a server 111 in a step 239 depicted in FIG. 7b below. The symmetric encryption 232a can include input of at least (i) the parameters 220m' specified in metadata 220m from a message 122 (or parameters 212b selected by device 101 in a step 212), and (ii) the symmetric ciphering key S3 224b and MAC key MAC3 224c from a step 231 above.

A step 232 can also include device 101 processing metadata 220m from message 122, where metadata 220m can include plaintext data to conduct symmetric encryption 232a such as handshake headers, an initialization vector, an identity of the symmetric ciphering key to use, etc. Parameters 220m' can comprise a portion of the metadata 220m. Note that the output of the step 232 can comprise a "double encrypted" fourth asymmetric ciphertext C4 102c-4, where (i) the first layer of encryption can be via asymmetric encryption via the third KEM 101k'/103j' using SK.device 101v, and (ii) the second layer of encryption can be via symmetric encryption 232a of the fourth asymmetric ciphertext C4 102c-4 using keys S3 224b and MAC3 224c.

For some exemplary embodiments, a step 232 can be omitted and the third asymmetric ciphertext C3 102c-3 could be transmitted without the additional layer of symmetric encryption from a step 232. In other words, the data depicted as transmitted in a message 123 in FIG. 2 regarding the fourth asymmetric ciphertext C4 102c-4 could be "C4 102c-4" instead of the depicted value of "Symm-C5 102s-5 ({C4 102c-4} S3 224b)."

Although the ciphertext from the party conducting an ENCAPS function (e.g. device 101 using the server ephemeral public key ePK.server 103h in a step 230) is normally secure with the first level of asymmetric encryption, additional levels of security could be obtained for the system 200 in FIG. 2 by device 101 conducting a step 232 to "double encrypt" the fourth asymmetric ciphertext C4 102c-4 output from KEM ENCAPS 101k' with ePK.server 103h also using symmetric encryption. In other words, by using "double encryption" via the fifth symmetric ciphertext symm-C5 102s-5, an attacker would need to break at least both symmetric encryption 232a and asymmetric encryption from KEM ENCAPS 101k' in order to determine K4 102k-4. Without "double encryption", an attacker would need to break only asymmetric encryption from KEM ENCAPS 101k' in order to determine K4 102k-4. In addition, the use of a "double encrypted" fourth asymmetric ciphertext C4 102c-4 by device 101 increases resistance to an attacker substituting a fake or fraudulent fourth asymmetric ciphertext C4 102c-4, if the attacker was able to obtain the server ephemeral public key ePK.server 103h.

Or, in some embodiments where the fourth asymmetric ciphertext C4 102c-4 is not "double encrypted, (i) the fifth symmetric ciphertext symm-C5 102c-5 could omit the use of the symmetric ciphering key S3 224b by device 101 in a step 232 and (ii) the fourth asymmetric ciphertext C4 102c-4 could be processed in a step 232a during a step 232 with only the third MAC key MAC3 224c (where the use of MAC3 224c depicted below in a step 232 in FIG. 7a). For these embodiments, the MAC codes transmitted by device 101 along with the fourth asymmetric ciphertext C4 102c-4 could be verified by server 111 using the MAC key MAC3 224c derived by server 111 in a step 224. In other words, a fourth asymmetric ciphertext C4 102c-4 in a message 123 below could comprise a fourth asymmetric ciphertext C4 102c-4 with MAC codes generated using the third MAC key MAC3 224c generated by device 101 in a step 228, such that server 111 could verify the fourth asymmetric ciphertext C4 102c-4 was generated by device 101 that (i) conducted the KEM ENCAPS 101k' with ePK.server 103h and (ii) operates with at least the third shared secret key K3 102k-3.

As depicted and described in connection with a step 233 in FIG. 2 above, a device 101 can process application data 233a in a step 233. The application data 233a could comprise a sensor measurement from sensor 101y in FIG. 1b, a registration message from device 101 to server 111, a set of configuration data for device 101 such as parameters used by device 101 for operating an application with server 111. For some embodiments, the application data 233a in a step 233 could comprise data formatted according to any one of the following protocols: SIP, IPSec, HTTP, JSON, XML, SSH, MQTT, etc.

At step 234, device 101 can select and process a plaintext 234a for encryption into a sixth symmetric ciphertext symm-C6 102c-6. In exemplary embodiments, the plaintext 234a can include application data 233a from a step 233 above and also the device token token1.device 206a and the server token token2.server 219e. In some exemplary embodiments for mutual authentication between device 101 and server 111, then the plaintext 234a can also include a device certificate of cert.device 101c (instead of including cert.device 101c in plaintext 211a), and/or a digital signature over plaintext 233a (but excluding the digital signature itself) using the private key corresponding to the public key in cert.device 101c. For a step 234, device 101 can also (i) calculate a hash value over data in both the first message 121 and the response second message 122, and (ii) include the hash value in the plaintext 234a.

At step 235, device 101 can use symmetric encryption 235a with the plaintext 234a from a step 234 in order to generate the sixth symmetric ciphertext symm-C6 102s-6. The symmetric encryption 235a can be included within device cryptographic algorithms 101s for device 101. The symmetric encryption 235a can include input of at least (i) the parameters specified in metadata 212b from a step 212 above for device 101 or parameters 220m' received from server 111 in a message 122, and (ii) the symmetric ciphering key S4 231b and MAC key MAC4 231c from a step 231 above. A step 235 can also include device 101 processing metadata 212b, where metadata 212b can include handshake headers, parameters 103f-y, an initialization vector, etc. Metadata 212b in a step 235 can be equivalent (e.g. formatted the same but with different values) than the metadata 212b transmitted in a message 121 by device 101.

At step 237 server 111 can use the metadata/parameters 212b from a message 123 as well as the keys S3 224b and MAC3 224c from a step 224 in FIG. 4 above in order to decrypt the fifth symmetric ciphertext symm-C5 102s-5. Server 111 could use symmetric decryption 237a. The output of a step 237 by server 111 can be a plaintext value of the fourth asymmetric ciphertext C4 102c-4 for use with a KEM DECAPS 103j'. For some embodiments, the use of a symmetric ciphering key S3 224b could be omitted and the step 237 could use the MAC key MAC3 224c in order to verify a MAC code in message 123 for the fourth ciphertext C3 102c-4.

At step 238, server 111 can use (i) the KEM parameters 101f-z sent in message 122 along with (ii) server cryptographic algorithms 103s to conduct the KEM DECAPS 103j' function with the received fourth asymmetric ciphertext C4 102c-4 (which could be read or output from a step 237 above). The server 111 can use the server ephemeral private key of eSK.server 103i with the KEM DECAPS 103j' and the received third asymmetric ciphertext C4 102c-4 in order to generate the fourth shared secret key K4 102k-4. Note that for some PQC algorithms, the KEM DECAPS 103j' function could fail for a small frequency of messages 123, such as less than one failure per million or billion KEM messages or ciphertext C4, and if a step 238 fails, then server 111 could send device 101 an error message and request device 101 generates a different message 123.

A server 111 could then conduct a step 231 using at least the fourth shared secret key K4 102k-4 output from a step 238. The step 231 for a server 111 can be identical to a step 231 for device 101 in order for server 111 to mutually derive a fourth symmetric ciphering key S4 231b and MAC key MAC4 231c. Note that in exemplary embodiments the step 231 also includes input of (i) shared keys K1 102k-1, K2 102k-2, and K3 102k-3, plus (ii) additional data shared between device 101 and server 111 with a HKDF 231a in order to generated the fourth symmetric ciphering key S4 231b and MAC key MAC3 231c. At the conclusion of a step 231 by server 111, server 111 can store the fourth symmetric ciphering key S4 231b and fourth MAC key MAC4 231c, which are mutually and secretly shared between server 111 and device 101.

FIG. 7b

Figure 7B:
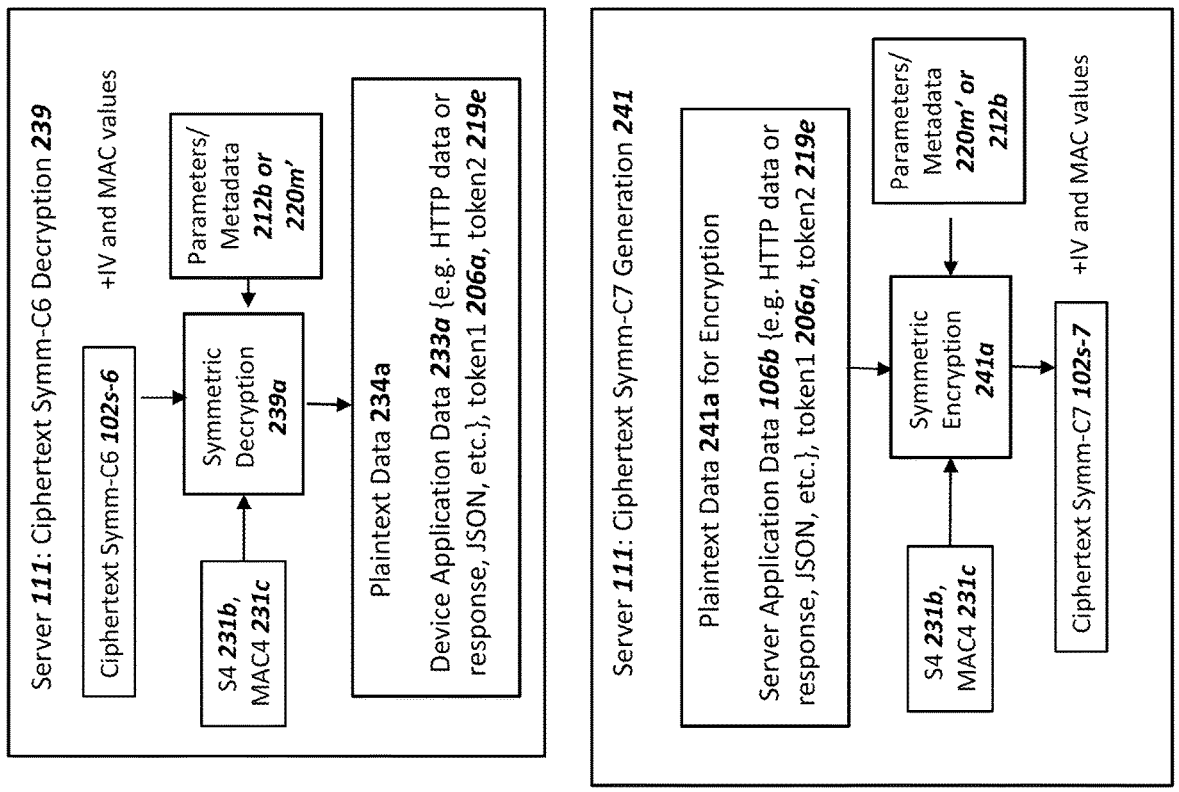
FIG. 7b is a flow chart illustrating exemplary steps for a server conducting symmetric ciphering using symmetric ciphering keys mutually derived with a device, in accordance with exemplary embodiments.

FIG. 7b is a flow chart illustrating exemplary steps for a server conducting symmetric ciphering using symmetric ciphering keys mutually derived with a device, in accordance with exemplary embodiments. At step 239, server 111 can use symmetric decryption 239a with the received sixth ciphertext C6 102s-6 from a message 123 in order to read the plaintext 234a. The symmetric decryption 239a can be included within server cryptographic algorithms 103s for server 111. The symmetric decryption 239a can include input of at least (i) the parameters specified in metadata 212b (or parameters 220m') received above from device 101 in a message 123, and (ii) the fourth symmetric ciphering key S4 231b and MAC key MAC4 231c from a step 231 in FIG. 7a above by server 111. The output of symmetric decryption 239a can be the plaintext data 234a which was processed by a device in a step 234 above.

The plaintext data 234a can include device application data 233a which was described above for a step 233 for device 101. The device application data 233a could include could comprise data formatted according to any one of the following protocols: SIP, IPSec, HTTP, JSON, XML, SSH, MQTT, etc. Note that plaintext data 234a can also include the device token token1.device 206a from a message 121 above and also the server token token2.server 219e. In a step 239, server 111 could verify that the received and decrypted values for device token token1.device 206a and also the server token token2.server 219e match or are equal to the values for (i) device token token1.device 206a received in a message 121 and (ii) server token token2.server 219e transmitted in a message 122.

At step 241, server 111 can use symmetric encryption 241a with the plaintext 241a comprising at least server application data 106b from a step 240 in FIG. 2 in order to generate the seventh symmetric ciphertext symm-C7 102s-7. The symmetric encryption 241a can be included within server cryptographic algorithms 103s for server 111. The symmetric encryption 241a can include input of at least (i) the parameters specified in metadata 212b received from device 101 in a message 121 or parameters 220m' generated by server 111 in a step 220a, and (ii) the symmetric ciphering key S4 231b and MAC key MAC4 231c from a step 231 above. A step 241 can also include server 111 processing parameters 220m', where parameters 220m' can include handshake headers, an initialization vector, etc. At the conclusion of step 241, server 111 can send device 101 the seventh symmetric ciphertext symm-C7 102s-7 in a message 124

FIG. 8

FIG. 8 is an illustration of (i) an exemplary set of cryptographic parameters for multiple key exchange mechanism (KEM) stored and used by a device and a server, and (ii) exemplary options for the cryptographic parameters, and (iii) exemplary options for cryptographic algorithms associated with the cryptographic parameters, in accordance with exemplary embodiments. As depicted and described above in connection with FIG. 1a, a device 101 can store a set of device cryptographic parameters 101x for conducting supported key exchange mechanisms (KEM), and a server 111 can also store a set of server cryptographic parameters 103x for conducting supported KEM. The cryptographic parameters can specify sets of values for cryptographic algorithms that are supported by device 101 and network 103 or server 111 in order to support the systems and methods depicted herein.

Device cryptographic parameters 101x and 103x or subsets thereof can be recorded in nonvolatile memory in each of device 101, and server 111 or network 103. Device cryptographic parameters 101x and 103x can include values for an identification for a collection or subset of a KEM set identifier 801, a key length 802, a type or name 803, and a secure hash algorithm 804. The depicted parameters in FIG. 8 focus on parameters relevant to conducting a KEM, and different parameters could be used for symmetric ciphering algorithms and also digital signature algorithms. FIG. 8 also depicts exemplary options 806 for combinations of cryptographic parameters for KEM in system 100a and system 200 as well as exemplary options 807 for combinations of cryptographic algorithms for KEM in system 100a and system 200.

As contemplated herein, when a selected set of cryptographic parameters such as using the words or description "parameters 101f" or "cryptographic parameters 101f" can specify a set of rows in the parameters for FIG. 8. An individual row of parameters or values can specify sufficient information such that both (i) a device 101 and a server 111 can conduct a KEM.KeyGen function to generate a PKI key pair, and (ii) using the PKI keys to conduct either KEM ENCAPS or KEM DECAPS functions (such as those depicted and described in connection with FIG. 1a). KEM parameters ID 801 can be an identity for a row or set of values for device cryptographic parameters 101x and 103x. PK key length 802 could represent the length of a public key in bits or bytes. Device cryptographic parameters 101x and 103x could include the length of a private key in bits or bytes as well.

The type or name 803 for a set of cryptographic parameters can specify the cryptographic algorithms to use with PKI keys, such as the exemplary names for post-quantum cryptography cryptographic algorithms. The field of post-quantum cryptography continues to develop with proposed algorithms currently undergoing revisions for standardization as of November 2020. In general, the leading candidates for post-quantum cryptography key exchange mechanisms propose using (i) lattice-based cryptography, (ii) code-based cryptography, or (iii) Supersingular elliptic curve isogeny cryptography, as described by the Wikipedia article for "Post-Quantum Cryptography" dated Aug. 31, 2020, which is hereby incorporated by reference.

Hash algorithm 804 in device cryptographic parameters 101x and 103x can be the name of a secure hash algorithm, such as the exemplary SHA-256 algorithm depicted, which may also be referred to as "SHA-2". Hash algorithm 804 can also be used in a hash-based key derivation function within the KEM ENCAPS and KEM DECAPS function to generate keys K1 102k-1 and K2 102k-2 and K3 102k-3. In exemplary embodiments, the hash algorithm 804 can also specify the secure hash algorithm for use with hash-based key derivation functions (e.g. HKDF 210a, HKDF 221a, HKDF 224a, and HKDF 231a) to calculate symmetric ciphering keys such as S1/S2/S3/S4 and also corresponding MAC keys.

Although not depicted in FIG. 8, settings or parameters for a symmetric ciphering algorithms can specify (i) the identity or name of a symmetric ciphering algorithm such as "AES", "AES-SIV", 3DES, Blowfish, etc, and (ii) settings for the symmetric ciphering algorithm. Other possibilities exist as well for data within cryptographic parameters, such as the specification of point compression, encoding rules such as distinguished encoding rules (DER), ASN or CSN syntax notation, padding rules, byte or bit orders such as big endian, little endian, etc.

The specific steps, calculations, and logic for a key exchange mechanism (KEM) can be specified according to the name 803. In general a key exchange mechanism or key exchange specified by a name 803 can comprise using a public key from a remote entity and a local private key in order to derive a shared secret. The key exchange mechanism could also comprise (i) encrypting a message "m" or random number for deriving a symmetric ciphering key (or value for the key) with a public key and (ii) decrypting the message "m" or random number for deriving the symmetric ciphering key (or value for the key) with a corresponding private key. Note the name 803 can support different types. In exemplary embodiments depicted in FIG. 8, a first KEM 101k/103j specified by server 111 or device 101 for the server static public key PK.server 103d with the KEM parameters 103f-y and ID 801 of "5" can support a type of Classic McEliece (where a different type would be "SIKE" for the ID of "4" in parameters 101f).

Note that any or all of the first KEM 101k/103j and second KEM 103k/101j and third KEM 103k'/103j' and fourth KEM 101k'/103j' can use a different type of KEM (e.g. completely different algorithm such as a first type based on lattices and a second type based on SIKE, etc.) For some exemplary embodiments, the first KEM 101k/103j and second KEM 103k/101j could use the same type or name 803 for the algorithm of the first and second KEM. As another example, the first KEM 101k/103j could use KEM parameters 103f-y that specifies an exemplary name 803 of "Classic McEliece" and the second KEM 103k/101 could also use KEM parameters 101f-x that specifies the exemplary name 803 of "Kyber-1024". For the embodiment described in the previous sentence, the KEM parameters 103f-y from FIG. 2 would be different than the KEM parameters 101f-x. In addition, the third KEM 103k'/101j' could use a different set of parameters, such as KEM parameters 101f-a, which can specify an exemplary name of BIKE. Further, the fourth KEM 101k'/103j' could use a different set of parameters, such as KEM parameters 103f-z, which can specify an exemplary name of SIKE.

In this manner and in some exemplary embodiments, all of the first KEM, the second KEM, the third KEM, and the fourth KEM can use different algorithms. In other embodiments, the first KEM associated with the static server public and private keys, the first KEM can use Classic McEliece, since the public key can be distributed out of band with a device 101 before device 101 connects to server 111, and then the second and third KEM can use a different algorithm such as Kyber, and the fourth KEM can use a different algorithm such as SIKE. Other possibilities or combinations for the use of different KEM algorithms are possible as well without departing from the scope of the present disclosure.

As depicted in FIG. 8, device 101 in a step 202 from FIG. 2 can store a set of supported cryptographic KEM parameters 101f, which can comprise a list of all parameters supported by device 101 for conducting the first, second, and third key exchange mechanism with server 111. The set of supported cryptographic KEM parameters 101f could be recorded or stored in device 101 in nonvolatile memory during a device configuration step 202. In exemplary embodiments, this set of supported cryptographic KEM parameters 101f comprises at least three rows with distinct KEM parameter identities 801. Each KEM parameter ID 801 could be designated a unique byte code for a field in specifications or standards for a secure session between device 101 and server 111. For the depicted parameters 101f in FIG. 8, device 101 could support an exemplary list of KEM parameters IDs 801 of "1" through "6".

As depicted in FIG. 8, the first set of KEM parameters 101f supported by device 101 can overlap 807 or have a matching subset of the second set of KEM parameters 103f supported by server 111. Although the device 101 and server 111 could potentially not communicate between the nodes before the communication in FIG. 2, a protocol or standard could determine or specify that at least some different KEM parameter values and associated algorithm support could be required between device 101 and server 111, such as the exemplary overlap 807 of supported algorithms depicted in FIG. 8 for KEM parameters 101f (for device 101) and 103f (for server 111). Or, device 101 could receive the set of KEM parameters 103f before device 101 sends the message 121 for some embodiments, such as if device 101 and server 111 had previously communicated.

As depicted in FIG. 8, device 101 in a step 202 from FIG. 2 can store a at least one set of cryptographic KEM parameters 103f-y from parameters 101f, where the specific set of parameters 103f-y can be used with the server static public key PK.server 101d. In a step 203b, device 101 can select KEM parameters 103f-y and an associated server static public key PK.server 101d. As depicted in FIG. 8, device 101 in a step 203b from FIG. 2 can select a specific set of cryptographic KEM parameters 101f-x from parameters 101f, where the specific set of parameters 101f-x can be used with the device ephemeral public key ePK.device 101h. KEM parameters 101f-x can be used to derive the device ephemeral public key ePK.device 101h and associated private key eSK.device 101*i*. As depicted and described in connection with FIG. 2, both the selected set of cryptographic KEM parameters 101*f* and the specific KEM parameters 101*f-x* for ePK.device 101*h* can be included in a message 121 in FIG. 2 above. For the exemplary embodiment depicted in FIG. 8, the KEM parameters 101*f-x* can be a subset of parameters 101*f* and could have and ID 801 of "3". In exemplary embodiments, the selected KEM parameters 101*f-x* for ePK.device 101*h* can also be a subset of server KEM parameters 103*f*, which is depicted in FIG. 8.

As depicted in FIG. 8, server 111 can store a set of supported cryptographic KEM parameters 103*f* in storage memory 111*b* during a server configuration step 203*a*, which is depicted and described in connection with FIG. 2. The KEM parameters 103*f* can comprise a list of all parameters supported by server 111 for conducting a first KEM 101*k*/103*j* and a second KEM 103*k*/101*j* and a third KEM 103*k'*/101*j'* and a fourth KEM 103*j'*/101*k'*. In some exemplary embodiments, this set of supported cryptographic KEM parameters 103*f* comprises at least three rows with distinct KEM parameter identities 801. For the depicted parameters 103*f* in FIG. 8, server 111 could support an exemplary list of KEM parameters IDs 801 of "3" through "7". In preferred exemplary embodiments, the received and specified KEM parameters 101*f-x* can match a row or KEM parameters ID 801 for KEM parameters 103*f*.

As depicted in FIG. 8, device 101 in a step 202 from FIG. 2 can store a specific set of cryptographic KEM parameters 101*f-a* with parameters 101*f*, where the specific set of parameters 101*f-a* can be used with the device static public key PK.device 101*a*. For some embodiments, the device static public key PK.device 101*a* could be stored by device 101 in a device certificate cert.device 101*c*, where the device certificate specifies the KEM parameters 101*f-a* for the PK.device 101*a*. Or, the parameters 101*f-a* could be stored by device 101 in nonvolatile memory within memory 101*m*-2 along the key PK.device 101*a*, and the use of a device certificate 101*c* is not required for some exemplary embodiments. For the exemplary embodiment depicted in FIG. 8, the KEM parameters 110*f-a* can be a subset of parameters 101*f* and could have and ID 801 of "4" and also be associated with the SIKE post-quantum cryptography algorithm. In exemplary embodiments, the selected or stored KEM parameters 110*f-a* for PK.device 101*a* can also be a subset of server KEM parameters 103*f*, which is depicted in FIG. 8.

After receipt of the supported device KEM parameter 101*f* in a message 121, server 111 in a step 219*b* can select a third set of KEM parameters 103*f-z* that are both (i) different than the first set of KEM parameters 101*f-x* received in message 121 and (ii) supported by or included within the set of KEM parameters 101*f* also received in a message 121. In summary, for a step 219*b* and in a preferred exemplary embodiment, server 111 selects KEM parameters 103*f-z* for a fourth KEM 101*k'*/103*j'*. The first KEM comprises (i) KEM ENCAPS 101*k* by device 101 using PK.server 103*d* and (ii) KEM DECAPS 103*j* by server 111 as depicted and described in connection with FIG. 1*a* above. The second KEM comprises (i) KEM ENCAPS 103*k* by server 111 using ePK.device 101*h* and (ii) KEM DECAPS 101*j* by device 101. The third KEM comprises (i) KEM ENCAPS 103*k'* by server 111 using PK.device 101*a* and (ii) KEM DECAPS 101*j'* by device 101. The fourth KEM comprises (i) KEM ENCAPS 101*k'* by device 101 using ePK.server 103*h* and (ii) KEM DECAPS 103*j'* by server 111 in a step 230. As noted above, some KEM and associated keys and parameters could be omitted for some exemplary embodiments. In addition, although FIG. 8 and the sentences above in this paragraph describe the use of KEM parameters 103*f-z* that are different than KEM parameters 101*f-x* and KEM parameters 103*f-y*, in some embodiments the third KEM parameters 103*f-z* can be the same as KEM parameters 101*f-x* or KEM parameters 103*f-y*.

As described in a step 219*b* in FIG. 2, a server 111 can select a row or set of KEM parameters 103*f-z* that matches all of the following conditions: (i) is supported by the received KEM parameters 101*f*, (ii) is supported by the stored KEM parameters 103*f*, (iii) is different than the specified and received KEM parameters 101*f-x* for ePK.device 101*h*, and (iv) KEM parameters 103*f-y* use a different type than KEM parameters 103*f-z* (e.g. different algorithm such as lattice-based for 103*f-z* if 103*f-y* specifies code-based algorithms, etc). For the exemplary data depicted in FIG. 8, a server 111 can select the row with ID 801 of "6" for KEM parameters 103*f-z*, which meets all of the criteria (i) through (iv) from the above sentence. All of KEM parameters 101*f*, 103*f*, 101*f-x*, 101*f-a*, 103*f-y*, and 103*f-z* could represent different data or values than that depicted in FIG. 8 without departing from the scope of the present disclosure, such as including or specifying different KEM mechanisms and parameters. But in an exemplary embodiment, the parameters 103*f-z* for the fourth KEM 101*k'*/103*j'* support all of the criteria for (i) through (iv) as described in this paragraph.

For other exemplary embodiments, such as for devices 101 with more restricted memories that can support a single KEM algorithms such as a single row in the table depicted in FIG. 8, then the first KEM 101*k*/103*j* and the second KEM 103*k*/101*j* and the third KEM 103*k'*/101*j'* and the fourth KEM 101*k'*/101*j'* could be conducted with the same KEM parameters. In other words, for the embodiment described in this paragraph, the parameters 101*f*, 101*f-x*, 103*f-y*, 101*f-a*, and 103*f-z* could be the same and use the same values and settings for all of the first KEM 101*k*/103*j* and the second KEM 103*k*/101*j* and the third KEM 103*k'*/101*j'* and fourth KEM 101*k'*/103*j'*.

For other exemplary embodiments, such as for devices 101 with less restricted memories than embodiments in the above paragraph, then the devices 101 can support a two KEM algorithms such as two rows in the table depicted in FIG. 8, then (i) the first KEM 101*k*/103*j* and the third KEM 103*k'*/101*j'* could support KEM parameters that are equal, such as KEM parameters 103*f-y* and 101*f-a* being the same, and (ii) the second KEM 103*k*/101*j* and the fourth KEM 101*k'*/101*j'* could support KEM parameters that are equal, such as KEM parameters 101*f-x* and 103*f-z* being the same. In other words, for embodiments described within this paragraph, then (i) PK.server 103*d* and PK.device 101*a* could use the same set or values for parameters for 103*f-y* and 101*f-a* (e.g. the same first overlapping 807 row in parameters 101*f* and 103*f* in FIG. 8), and (ii) ePK.device 101*h* and ePK.server 103*h* could use the same set or values for parameters for 110*f-x* and 103*f-x* (e.g. the same second overlapping 807 row in parameters 101*f* and 103*f* in FIG. 8). For the embodiments described within this paragraph, the static public keys can use different parameters then the ephemeral public keys, such that the first and second overlapping 807 rows in parameters 101*f* and 103*f* in FIG. 8 are different.

FIG. 8 also depicts exemplary KEM parameters options 805. In exemplary embodiments, a server 111 and a device 101 could use various combinations of KEM parameters for each of the server static public key PK.server 101*d*, the device ephemeral public key ePK.device 101*h*, the device static public key PK.device 101a, and the server ephemeral public key ePK.server 103h. For the exemplary embodiment for the column "option" and row "2", the use of (i) Classic McEliece for the server static public key PK.server 101d and (ii) Kyber for the device ephemeral public key ePK.device 101h and the server ephemeral public key ePK.server 103h can represent the embodiment described in the paragraph immediately above. Other combinations of KEM parameters for the PKI keys in a system 100a, 100b, and 200 for exemplary embodiments are depicted in FIG. 8, and other possibilities exist as well without departing from the scope of the present invention. In general, the exemplary KEM parameters options 805 illustrate the flexibility of systems 100a, 100b, and 200 to support a variety of PQC KEM parameters. Other PQC KEM algorithms and combinations could be supported as well, in addition to those depicted.

FIG. 8 also depicts exemplary KEM algorithm options 806. In exemplary embodiments, a server 111 and a device 101 could use various combinations of KEM algorithms for each of the server static public key PK.server 101d, the device ephemeral public key ePK.device 101h, the device static public key PK.device 101a, and the server ephemeral public key ePK.server 103h. For the exemplary embodiment for the column "option" and row "6", the use of "Lattice" algorithms can represent the embodiment described three paragraphs above (e.g. where the same algorithm and parameters are used for all of the depicted PKI keys for server 111 and device 101). Other combinations of KEM algorithms for the PKI keys in a system 100a, 100b, and 200 for exemplary embodiments are depicted in FIG. 8, and other possibilities exist as well without departing from the scope of the present invention. In general, the exemplary KEM algorithm options 806 illustrate the flexibility of systems 100a, 100b, and 200 to support a variety of PQC KEM algorithms. Other PQC KEM algorithms and combinations could be supported as well, in addition to those depicted.

Consequently, in an exemplary embodiment for the first row in KEM algorithm options 806, the first KEM 101k/103j with PK.server 103d can use a first algorithm type (e.g. code based) for parameters 103f-y that is completely different than a second algorithm type for the second KEM 103k/101j for ePK.device 101h (e.g. lattice-based) and parameters 101f-x. The third KEM 103k'/101j for PK.device 101a can use the first algorithm type (e.g. code based) for parameters 101f-a. The fourth KEM 103k'/101j' for ePK.server 103h can use a third algorithm type for parameters 103f-z that is different than the algorithm types for the first, second, and third KEM, where the depicted third algorithm type on the first row is SIKE for the ePK.server 103h used in the fourth KEM 103k'/101j'. In this manner and by using the technology and steps described above in FIG. 1a through FIG. 8, the security of a system 200 or system 100b or system 100a for application data can be (x) at least as strong as the strongest algorithm type for the first KEM 101k/103j and the second KEM 103k/101j and the third KEM 103k'/101j' and the fourth KEM 101k'/103j' for (y) data encrypted and decrypted with the fourth symmetric ciphering key S4 231b and MAC key MAC4 231c.

Or, in other exemplary embodiments, such as depicted in the fifth row of KEM parameters options 805, the first KEM 101k/103j can use SIKE for the cryptographic parameters of the PKI keys (e.g. PK.server 103d and SK.server 103b) for the first KEM 101k/103j and parameters 103f-y. Although not depicted in FIG. 8, the SIKE algorithm in the 5' row could also specify a specific subset of values for conducting a SIKE algorithm, such as, but not limited to, and exemplary value of SIKEp751. For this embodiment, the second KEM 103k/101j and third KEM 101k'/103j' could use the same type or name 803 for the algorithm of the KEM, which is different than the KEM parameters 103f-y for the first KEM 101k/103j. For example, the second KEM 103k/101j could use KEM parameters 101f-x that specifies an exemplary name 803 of "Kyber-1024" and the third KEM 103k'/101j' could also use the same KEM parameters for parameters 101f-a that specifies the same exemplary name 803 of "Kyber-1024". For the embodiment described in the previous sentence, the KEM parameters 101f-a from FIG. 2 for the device static public key PK.device 101a would be the same as KEM parameters 101f-x T Thus, in preferred exemplary embodiments, the first KEM 103k/101j can use a first type (e.g. code based) that is completely different than a second type for the second KEM 103k/101j and third KEM 103k'/101j' (e.g. lattice-based), which is depicted as Option 4 in KEM algorithm options 806 in FIG. 8. The fourth KEM 101j'/103k' using the ePK.server 103h could use a set of KEM parameters 103f-z specifying values and numbers for the BIKE algorithm, which is also depicted in row 5 of KEM parameter options 805 and row 4 of KEM algorithm options 806. In other words, the rows for options in KEM parameter options 805 do not need to match or correspond to the same row within KEM algorithm options. In this manner for the embodiment described within this paragraph and the paragraph immediately above, the security of a system 200 for application data 233a and 106b can be at least as strong as the stronger of the algorithm type for (i) the first KEM 101k/103j and (ii) the second KEM 103k/101j and third KEM 103k'/101j' (which can use the same algorithm in the embodiment for this paragraph), and (iii) the fourth KEM 101k'/103j'. Other possibilities as depicted in FIG. 8 for KEM parameter options 805 and KEM algorithm options 806 as well in order to increase the security of communications between device 101 and server 111 beyond a single PQC KEM algorithm using the PKI keys and KEM steps described herein.

As depicted in FIG. 8, such as with exemplary KEM parameter options 805 and KEM algorithm options 806, some KEM parameter or KEM algorithms can have a depicted value of "none". For these embodiments, the depicted key could be omitted from systems 100a, 100b, and 200. In addition to the depicted key being omitted (via the designation of "none"), associated sets of parameters and/or algorithms could be omitted as well. As one example and embodiment, the device could omit the use of a device ephemeral public key ePK.device 101h in row 7 of KEM parameter options 805. For this embodiment, then a KEM 103k/101j could be omitted from system 100a and 200. For this embodiment, then the second asymmetric ciphertext C2 102c-2 could be omitted, as well as a second symmetric ciphertext symm-C2 102s-2. For this embodiment, then (i) the third symmetric ciphertext symm-C3 102s-3 could be encrypted with the first shared symmetric ciphering key S1 210b, and (ii) the third symmetric ciphering key S3 could be derived with shared secret keys K1 102k-1 and K3 102k-3 (but not with shared secret key K2 102k-2). Likewise, for this embodiment, the fourth symmetric ciphering key S4 231b could be derived using K1 102k-1, K3 102k-3, and K4 102k-4 (but not with shared secret key K2 102k-2).

As another example and embodiment, the device could omit the use of a device static public key PK.device 101a in row 7 of KEM algorithm options 806. For this embodiment, then a KEM 103k'/101j' could be omitted from system 100a and 200. For this embodiment, then the third asymmetric ciphertext C3 102c-3 could be omitted, as well as a third symmetric ciphertext symm-C3 102s-3. For this embodiment, then the third symmetric ciphering key S3 could be derived with shared secret keys K1 102k-1 and K2 102k-2 (but not with shared secret key K3 102k-3). Likewise, for this embodiment, the fourth symmetric ciphering key S4 231b could be derived using K1 102k-1, K2 102k-2, and K4 102k-4 (but not with shared secret key K3 102k-3). Other possibilities exist as well for a device 101 or a server 111 to omit the use of KEM and associated public or private key and conduct the remaining steps depicted for a system 100a and 200, without departing from the scope of the present disclosure.

FIG. 9a

Figure 9B:
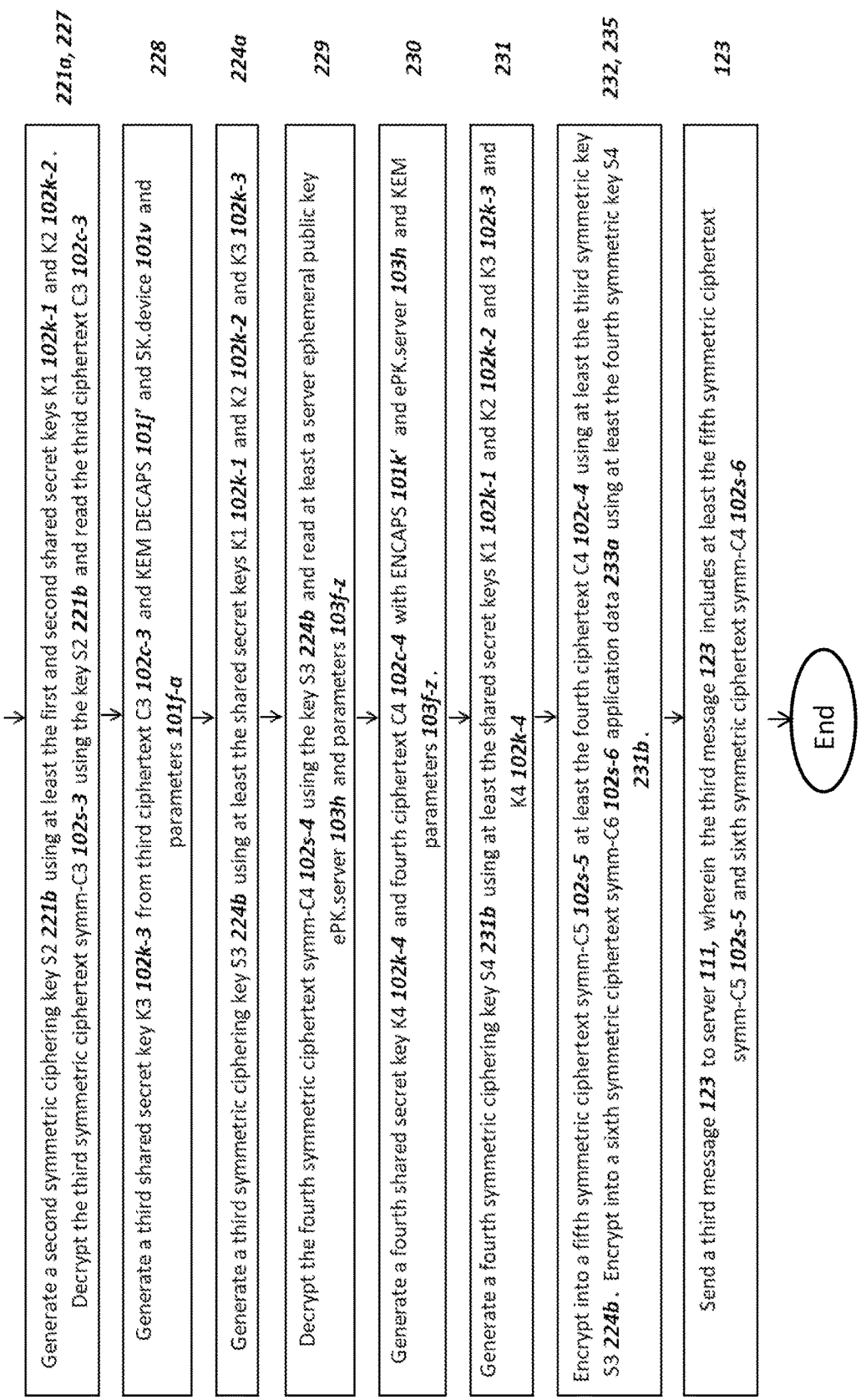
FIG. 9b is a flow chart illustrating exemplary steps for a device to conduct multiple different KEM algorithms in order to efficiently secure communications with a server, in accordance with exemplary embodiments.

FIG. 9a is a flow chart illustrating exemplary steps for a device to conduct multiple different KEM algorithms in order to efficiently secure communications with a server, in accordance with exemplary embodiments. The steps and components depicted in FIG. 9a for a device 101 are also depicted and described in connection with FIG. 2 and additional Figures above. The steps and data for device 101 to securely conduct multiple different KEM algorithms can comprise (i) a first portion depicted in FIG. 9a and also (ii) a continuing, second portion depicted in FIG. 9b below. Device 101 can use the electrical components for device 101 depicted and described in connection with FIG. 1b in order to conduct the steps in FIGS. 9a and 9b. Note that a device 101 can conduct the additional steps than the steps shown in FIG. 9a, as depicted in FIG. 2 and additional Figures above. FIG. 9a provides a summary of the primary steps for a preferred embodiment where a device 101 can use multiple types of KEM algorithms or parameters for multiple different KEM with a server 111.

At step 202, device 101 can store in nonvolatile memory for device memory 101m-2 (i) first a set of KEM parameters 101f, (ii) device cryptographic algorithms 101s, and (iii) a server static public key PK.server 103d with KEM parameters 103f-y, and (iv) a device static public key PK.device 101a with KEM parameters 101f-a. Note that a second set of KEM parameters 103f can be stored within server 103, and the first and second sets of KEM parameters 101f and 103f can have a common subset as depicted and described in connection with FIG. 8, which is depicted and described in FIG. 8 as overlap 807. The first set of KEM parameters 101f can be a subset of device cryptographic parameters 101x for device 101. The data stored in device 101 can be stored during a configuration step for device 101. An example of the first set of KEM parameters 101f are depicted and described in connection with FIG. 8 above.

At step 204, device 101 can select (i) server ID 111a and/or a network ID 103a, and (ii) a first subset 101f-x of KEM parameters 101f from the nonvolatile memory. Device 101 can use a memory bus 101t-m (which can be a type of data bus 101t in device 101 in FIG. 1b) in order to read the data from nonvolatile memory. Device 101 can use a processor 101p to write (i) a first memory address for server ID 111a and (ii) a second memory address for KEM parameters 101f to a memory controller for nonvolatile memory 101m-2. The memory controller for nonvolatile memory 101m-2 can read from the physical memory for nonvolatile memory 101m-2 the values for server ID 111a and the first subset KEM parameters 101f. The steps described in the previous three sentences can apply to steps within the present disclosure for a device 101 to access and read data from memory 101m in order to perform operations on the data. A processor 101p in device 101 can select the first subset 101f-x of KEM parameters 101f based on (i) a priority list for a protocol or application running within an operating system of device 101 and (ii) overlap 807 (depicted in FIG. 8).

Device 101 can generate a device ephemeral private key eSK.device 101i-x and device ephemeral public key ePK.device 101h-x using the selected first subset 110f-x of KEM parameters 101f. As contemplated herein, the first subset 101f-x of the second set of KEM parameters 101f can be referred to as KEM parameters 110f-x or parameters 110f-x. The KEM parameters 110f-x can specify a first type of KEM algorithm (e.g. lattice-based, code-based, or SIKE), such as, but not limited to, the KEM parameters 101f-x depicted FIG. 8. The KEM parameters 101f-x can be selected in a step 204 based on device 101 anticipating or previously storing that server 111 supports the KEM parameters 110f-x in order to conduct a first KEM 101k/103j as depicted and described in connection with FIG. 8. A protocol for conducting secure communications between device 101 and server 111 could specify support for or the use of KEM parameters 101f-x.

At step 205, device 101 can generate an ephemeral private key 101h and ephemeral public key 101i using the first subset 101f-x of KEM parameters 101f, which are also referred to herein as KEM parameters 101f-x. At step 205, device 101 can use a PQC.KeyGen function 101q to generate a device ephemeral PKI key pair comprising a device ephemeral public key ePK.device 101h and a device ephemeral private key eSK.device 101i. In exemplary embodiments, device 101 can include a random number from a hardware random number generator 128 (depicted and described in connection with FIG. 1b above) in order to generate the device ephemeral private key eSK.device 101i. eSK.device 101i can be used with KEM parameters 101f-x to generate ePK.device 101h with PQC.KeyGen function 101q. The algorithm used to generate the ephemeral PKI key pair can be specified in KEM parameters 101f-x selected by device 101 in a step 204 above.

Steps 209 through 212 are depicted and described in connection with FIG. 2 and also FIG. 3 above. At step 209 device 101 can use processor 101p to generate a first shared secret key K1 102k-1 and first asymmetric ciphertext C1 102c-1 using KEM ENCAPS 101k and PK.server 103d and KEM parameters 103f-y. In a step 212, device 101 can encrypt into a first symmetric ciphertext symm-C1 102s-1 comprising (i) ePK.device 101h and parameters 101f-x, (ii) (PK.device 101a and parameters 101f-a) and/or (ID.device 101d), and (iii) KEM parameters 101f. The first symmetric ciphertext symm-C1 102s-1 can be encrypted using at least a symmetric key S1 210b derived from K1 102k-1 using HKDF 210a in a step 210 in FIG. 2a and FIG. 3. For some embodiments device 101 could use a device certificate cert.device 101c for (ii) in the previous sentence. Some embodiments may omit the inclusion of the PK.device 101a within the first symmetric ciphertext symm-C1 102s-1 but include identification information for device 101 such as ID.device 101d, and server 111 could select locally or query other servers for PK.device 101a using the ID.device 101d.

Device 101 can send server 111 a message 121 using radio 101r (or an equivalent wired physical interface if device 101 operates in a wired configuration), wherein message 121 includes at least (i) identification information for PK.server 103d, (ii) the first asymmetric ciphertext C1 102c-1, and (iii) the first symmetric ciphertext symm-C1 102s-1. For some embodiments the identification information for PK.server 103d could comprise the PK.server 103d.

Device 101 can then receive a second message 122 from server 111 using radio 101r (or an equivalent wired physical interface if device 101 operates in a wired configuration), wherein message 122 includes at least (i) a second symmetric ciphertext symm-C2 102s-2 of a second asymmetric ciphertext C2 102c-2 and (ii) a third symmetric ciphertext symm-C3 102s-3 of a third asymmetric ciphertext C3 102c-3, and (iii) a fourth symmetric ciphertext symm-C4 102s-4. Note that for some embodiments, the use of "double encryption" and the second symmetric ciphertext symm-C2 102s-2 can be omitted, and the second asymmetric ciphertext C2 102c-2 could be received without additional encryption. In some embodiments, the second asymmetric ciphertext C2 102c-2 could be sent with MAC codes generated using MAC key MAC1 210c output from HKDF 210a in a step 210. In some exemplary embodiments described above with a message 122, the third symmetric ciphertext symm-C3 102s-3 can be included within the second symmetric ciphertext symm-C2 102s-3, and/or the fourth symmetric ciphertext symm-C4 can be included within the third symmetric ciphertext symm-C3 102s-3.

At step 215', device 101 can use processor 101p decrypt the second symmetric ciphertext symm-C2 102s-2 with symmetric key S1 210b and read second asymmetric ciphertext C2 102c-2. As depicted in FIG. 1b, the first and second symmetric ciphertexts can be stored in a volatile memory 101m-1 for device 101. Note that although step 215' in FIG. 5 and in FIG. 9a depicts and describes that symmetric key S1 201b is used to decrypt the second symmetric ciphertext symm-C2 102s-2, a protocol specifying message 122 and response message 123 could specify the update or a key schedule for the symmetric key S1 210b, such that symmetric key S1 210b based on K1 102k-1 is updated with additional data input into HKDF 210a. For these embodiments, then a step 215' could be conducted with an updated symmetric key S1' 210b', where the key S1 210b is updated to S1' 210b'. Note that subsequent key S3 224b (as well as MAC keys) can be updated, where additional shared data is input into the generating HKDF with the original derived shared secret keys, such that key S3 224b could be used to decrypt the fourth symmetric ciphertext symm-C4 102s-4 in step 229 below, but then an updated key S3' 224b' could be used to encrypt the fifth symmetric ciphertext symm-C5 102s-5.

At step 226, device 101 can use processor 101p to generate a second shared secret key K2 102k-2 from the second asymmetric ciphertext C2 102c-2 and KEM DECAPS 110j and eSK.device 101i. A step 226 was depicted and described in connection with FIG. 2 and FIG. 5 above. As depicted in FIG. 9a, the steps for device 101 to conduct with server 111 continues in FIG. 9b below.

FIG. 9b

FIG. 9b is a flow chart illustrating exemplary steps for a device to conduct multiple different KEM algorithms in order to efficiently secure communications with a server, in accordance with exemplary embodiments. The steps and components depicted in FIG. 9b for a device 101 are also depicted and described in connection with FIG. 2 and additional Figures above. The steps and data for device 101 to securely conduct multiple different KEM algorithms can comprise (i) a first portion depicted in FIG. 9a above and also (ii) a continuing, second portion depicted in FIG. 9b herein. Device 101 can use the electrical components for device 101 depicted and described in connection with FIG. 1b in order to conduct the steps in FIGS. 9a and 9b. Note that a device 101 can conduct the additional steps than the steps shown in FIG. 9b, as depicted in FIG. 2 and additional Figures above. FIG. 9b provides a summary of the primary steps for a preferred embodiment where a device 101 can use multiple types of KEM algorithms or parameters for multiple different KEM with a server 111.

At step 221a, a processor 101p in device 101 can use the HKDF 221a to generate a second symmetric ciphering key S2 221b using at least the first and second shared secret keys K1 102k-1 and K2 102k-2. A step 221a for device 101 is depicted and described above in connection with FIG. 4. Although not depicted in FIG. 9b and also FIG. 9a above, device 101 could also generate corresponding MAC keys along with symmetric ciphering keys S2, S1, etc.

At step 227, device 101 can decrypt the third symmetric ciphertext symm-C3 102s-3 using at least the second symmetric ciphering key S2 221b, wherein the plaintext for the third symmetric ciphertext symm-C3 102s-3 includes a third asymmetric ciphertext C3 102c-3 from server 111. A step 227 was depicted and described in connection with FIG. 5 above, as well as FIG. 2. As contemplated throughout the present invention, when the term "decrypt" is used, that can mean using both (i) a symmetric ciphering key to decrypt data and also (ii) integrity check the data using a MAC key corresponding to the symmetric ciphering key. For example, and as depicted for a step 227 in FIG. 5, device 101 could use a symmetric ciphering algorithm 227a depicted with "decryption". Both the second symmetric ciphering key S2 221b and second MAC key MAC 221c can be input into the symmetric ciphering algorithm 227a along with parameters such as parameters 220m' in order for the decryption step to both (i) convert the third symmetric ciphertext symm-C3 102s-3 into asymmetric ciphertext C3 102c-3 using the second symmetric ciphering key S2 221b and (ii) calculate MAC codes using the MAC key 221c.

MAC codes could be received in a message 122 in FIG. 2 and also FIG. 1a. Device 101 could use the second MAC key 221c to calculate MAC codes using the MAC key 221c and then compare the calculated MAC codes from a decryption step 227a with the received MAC codes with third symmetric ciphertext symm-C3 102s-3. If the received MAC codes with the third symmetric ciphertext symm-C3 102s-3 match or are equal to the calculated MAC codes for the with third symmetric ciphertext symm-C3 102s-3, then an integrity and authentication verification check for the with third symmetric ciphertext symm-C3 102s-3 could be successfully completed by a device 101 in a step 227. The description in this paragraph for using MAC codes with symmetric ciphertext and MAC keys to process or calculate the MAC codes to support integrity check and authentication can apply to all the symmetric ciphering algorithms described in the present invention, including symmetric ciphering or symmetric encryption steps 212a, 215a, 223a, 215b, 227a, 229a, 232a, 235a, 237a, 239a, and also 241. The step of integrity check and authentication described two sentences above ensures that bits within the symmetric ciphertext had not been flipped or changed, either unintentionally, such as through bit errors in a communications network such as IP network 107, or potentially intentionally, such as by an attacker operating between server 111 and device 101.

At step 228, device 101 can generate a third shared secret key K3 102k-3 using the KEM DECAPS 101j' and the device static private key PK.device 101v and KEM parameters 103f-a and third asymmetric ciphertext C3 102c-3. The third asymmetric ciphertext C3 102c-3 could be output from a decryption step 227 above. A step 228 is depicted and described in connection with FIG. 1a, FIG. 2, and also FIG. 6 above.

As depicted and described in connection with FIG. 6, a step 228 can include a HKDF 224a (where HKDF 224a can also be used by server 111), and device 101 can generate a third symmetric ciphering key S3 224b using at least the first and second and third shared secret keys K1 102$k$-1 and K2 102$k$-2 and K3 102$k$-3. As described for a HKDF 224$a$ in FIG. 6, additional data shared between device 101 and server 111 can be input into the HKDF 224$a$ in addition to the shared secret keys in order to generate both a symmetric ciphering key S3 224$b$ and MAC key 223$c$.

At step 229, device 101 can decrypt the fourth symmetric ciphertext symm-C4 102$s$-4 using at least the third symmetric ciphering key S3 224$b$ output from HKDF 224$a$ in the paragraph above and read the plaintext for the fourth symmetric ciphertext symm-C4 102$s$-4. A step 229 is depicted and described in connection with FIG. 6 above. The plaintext for the fourth symmetric ciphertext symm-C4 102$s$-4 can include at least a server ephemeral public key ePK.server 103$h$ and parameters 103$f$-$z$. Additional data could be included within the plaintext, such as any of Token1 206$a$, token2 219$a$, and/or data1.server 219$f$.

At step 230, device 101 can generate a fourth shared secret key K4 102$k$-4 and fourth asymmetric ciphertext C4 102$c$-4 using the KEM ENCAPS 101$k'$ and the server ephemeral public key ePK.server 103$h$ and KEM parameters 103$f$. A step 230 for device 101 is depicted and described in connection with FIG. 6 above, and also in FIG. 2.

At step 231, device 101 can generate a first symmetric ciphering key S4 231$b$ using at least the first and second and third and fourth shared secret keys K1 102$k$-1 and K2 102$k$-2 and K3 102$k$-3 and K4 102$k$-4. Steps 231 for device 101 and server 111 are depicted and described in connection with FIG. 2 and also FIG. 6 above.

At step 232, device 101 can encrypt into a fifth symmetric ciphertext symm-C5 102$s$-5 at least the fourth asymmetric ciphertext C4 102$c$-4 using at least the third symmetric key S3 224$b$. A step 232 by device 101 is depicted and described in connection with FIG. 7$a$ above. As discussed with a step 215' in FIG. 9$a$ above, for some embodiments the third symmetric key S3 224$b$ could be updated to a key S3' 224$b'$ using data from message 122, such that device 101 uses a first third symmetric key S3 224$b$ in order to decrypt the fourth symmetric ciphertext symm-C4 102$s$-4 in a step 229, but then uses a second third symmetric key S3' 224$b'$ in order to conduct the step 232. In other words, a HKDF 224$a$ in FIG. 6 above could output both (i) the first third symmetric key S3 224$b$ for device 101 to use for decryption (e.g. step 229) and then the (ii) second first third symmetric key S3' 224$b'$ to use with encryption in step 232.

At step 235, device 101 can encrypt into a sixth symmetric ciphertext symm-C6 102$s$-6 the device application data 233$a$ using the symmetric key S3 224$b$. A step 235 by device 101 is depicted and described in connection with FIG. 7$a$ above. Device 101 can then send a third message 123 to server 111, wherein the third message 123 includes at least the fifth symmetric ciphertext symm-C5 102$s$-5 and the sixth symmetric ciphertext symm-C6 102$s$-6. Although not depicted in FIG. 9$b$, device 101 and server 111 could also communicate subsequent messages, such as the message 124 from server 111, where the message 124 could include a seventh symmetric ciphertext symm-C7 102$s$-7. Device could decrypt the seventh symmetric ciphertext symm-C7 102$s$-7 using at least the fourth symmetric ciphering key S4 231$b$.

FIG. 10$a$

FIG. 10$a$ is a flow chart illustrating exemplary steps for a server to use multiple different KEM algorithms in order to efficiently secure communications with a device, in accordance with exemplary embodiments. The steps and components depicted in FIG. 10$a$ for a server 111 are also depicted and described in connection with FIG. 2 and additional Figures above. The steps and data for server 111 to securely conduct multiple different KEM algorithms can comprise (i) a first portion depicted in FIG. 10$a$ and also (ii) a continuing, second portion depicted in FIG. 10$b$ below. Server 111 can use the server hardware depicted for server 111 in FIG. 1$b$ in order to conduct the steps in FIG. 10. Note that a server 111 can conduct the additional steps as depicted in FIG. 2 and additional Figures above. FIG. 10$a$ provides a summary of the primary steps for a preferred embodiment where a server 111 can use multiple types of KEM algorithms or parameters for multiple different KEM with a server 111. Note that some steps can be conducted in a different order or sequence than depicted in FIG. 10$a$ and also FIG. 10$b$ below. As one example, a step 222 below could be conducted before a step 221, and other possibilities exist as well for the sequence of some steps without departing from the scope of the present invention.

At step 203, server 111 can store in nonvolatile memory 111$b$ (i) a first set of KEM parameters 103$f$, (ii) server cryptographic algorithms 103$s$, and (iii) a server static private key SK.server 103$b$ with associated KEM parameters 103$f$-$y$. The first set of KEM parameters 103$f$ can be a subset of server cryptographic parameters 103$x$ for server 111 as depicted and described in connection with FIG. 1$a$. The data stored in server 111 can be stored during a configuration step for server 111. An example of the first set of KEM parameters 103$f$ are depicted and described in connection with FIG. 8 above. Although not depicted in FIG. 10$a$, a server 111 could also store a corresponding PK.server 103$d$ for the SK.server 103$b$. In addition, server 111 could store a plurality of server static private keys SK.server 103$b$ each with a corresponding server static public key PK.server 103$d$, and could use a database 244 as depicted in FIG. 2 in order to store the keys along with associated values, such as identities or secure hash values over the server static public keys PK.server 103$d$.

Server 111 can then receive a first message 121 from a device 101, wherein message 121 includes at least (i) identification information for a server static public key of PK.server 103$d$, (ii) a first asymmetric ciphertext C1 102$c$-1, and (iii) a first symmetric ciphertext symm-C1 102$s$-1. For some embodiments the identification information can comprise a secure hash value over PK.server 103$d$, which is depicted for a message 121 in FIG. 2. Server 111 can use the identification information to select the server static private key SK.server 103$b$ and associated KEM parameters 103$f$-$y$ in order to process the first asymmetric ciphertext C1 102$c$-1.

At step 214, server 111 can generate a first shared secret key K1 102$k$-1 from the first asymmetric ciphertext C1 102$c$-1 using KEM DECAPS 103$j$ and SK.server 103$b$ and KEM parameters 103$f$-$y$. At step 214 server 111 can also generate a first symmetric ciphering key S1 210$b$ using at least the first shared secret key K1 102$k$-1. A step 214 and 215 by server 111 is depicted and described in connection with FIG. 3 above. At step 215, server 111 can decrypt the first symmetric ciphertext symm-C1 102$s$-1 using at least the first mutually derived symmetric ciphering key S1 210$b$, in order to read plaintext (i) parameters 101$f$, (ii) ePK.device 101$h$ with parameters 101$f$-$x$, and (iii) (a device static public key PK.device 101$a$ with associated KEM parameters 101$f$-$a$) and/or (ID.device 101$d$).

As depicted and described in connection with FIG. 2 above, for some embodiments a server 111 may optionally not store or operate with the server static private key SK.server 103$b$, which could be stored in a separate secure server 111'. For these embodiments, server 111 could send a message with at least the first asymmetric ciphertext C1 102c-1 to the secure server 111', and the secure server 111' could conduct the step 214. Secure server 111' could send data output from step 214 to server 111 in order for server 111 to conduct the subsequent steps.

For embodiments where the plaintext from symm-C1 102s-1 includes the device static public key PK.device 101a with associated KEM parameters 110f-a, then server 111 can directly use PK.device 101a and parameters 101f-a in a step 222. For some embodiments the PK.device 101a and parameters 110f-a could be included in a device certificate cert.device 101c in the plaintext from symm-C1 102s-1, and server 111 could verify the device certificate cert.device 101c. For embodiments where the plaintext from symm-C1 102s-1 includes the device identity ID.device 101d, then server 111 could query a database such as database 244 or another server with the ID.device 101d in order to receive the PK.device 101a and parameters 101f-a.

Although not depicted in FIG. 10a but depicted and described in connection with FIG. 2 and also FIG. 8, server 111 can then conduct a step 219b in order to select KEM parameters 103f-z. The KEM parameters 103f-z can specify a PQC KEM algorithm that is a different type or different family than the KEM parameters 110f-x for ePK.device 101h received in message 121. The KEM parameters 103f-z can specify a PQC KEM algorithm that is a different type or different family than the KEM parameters 103f-y for SK.server 103b.

At step 220c, server 111 can conduct KEM ENCAPS 103k with ePK.device 101h and parameters 101f-x to generate second shared secret key K2 102k-2 and a second asymmetric ciphertext C2 102c-2. A step 220c is depicted and described in connection with FIG. 4 above.

At step 221, server 111 can generate a second symmetric ciphering key S2 221b using at least the first and second shared secret keys K1 102k-1 and K2 102k-2. A HKDF 221a with a step 221 as depicted and described in connection with FIG. 4 can be used to generate the key S2 221b along with a MAC key MAC2 221c. Device 101 can mutually derive the key S2 221b using HKDF 221a in a step 226.

At step 223 server 111 can encrypt the second asymmetric ciphertext C2 102c-2 using the key S1 210b to create a second symmetric ciphertext symm-C2 102s-2. Note that the key S1 210b at a step 223 can be generated by a HKDF function that has input of at least the first shared secret key K1 102k-1 generated in a step 214. A step 223 by server 111 is depicted and described in connection with FIG. 2 and FIG. 4 above.

At step 222, server 111 can conduct KEM ENCAPS 103k' with PK.device 101a and parameters 101f-a to generate a third shared secret key K3 102k-3 and a third asymmetric ciphertext C3 102c-3. A step 220c is depicted and described in connection with FIG. 4 above.

Figure 10A:
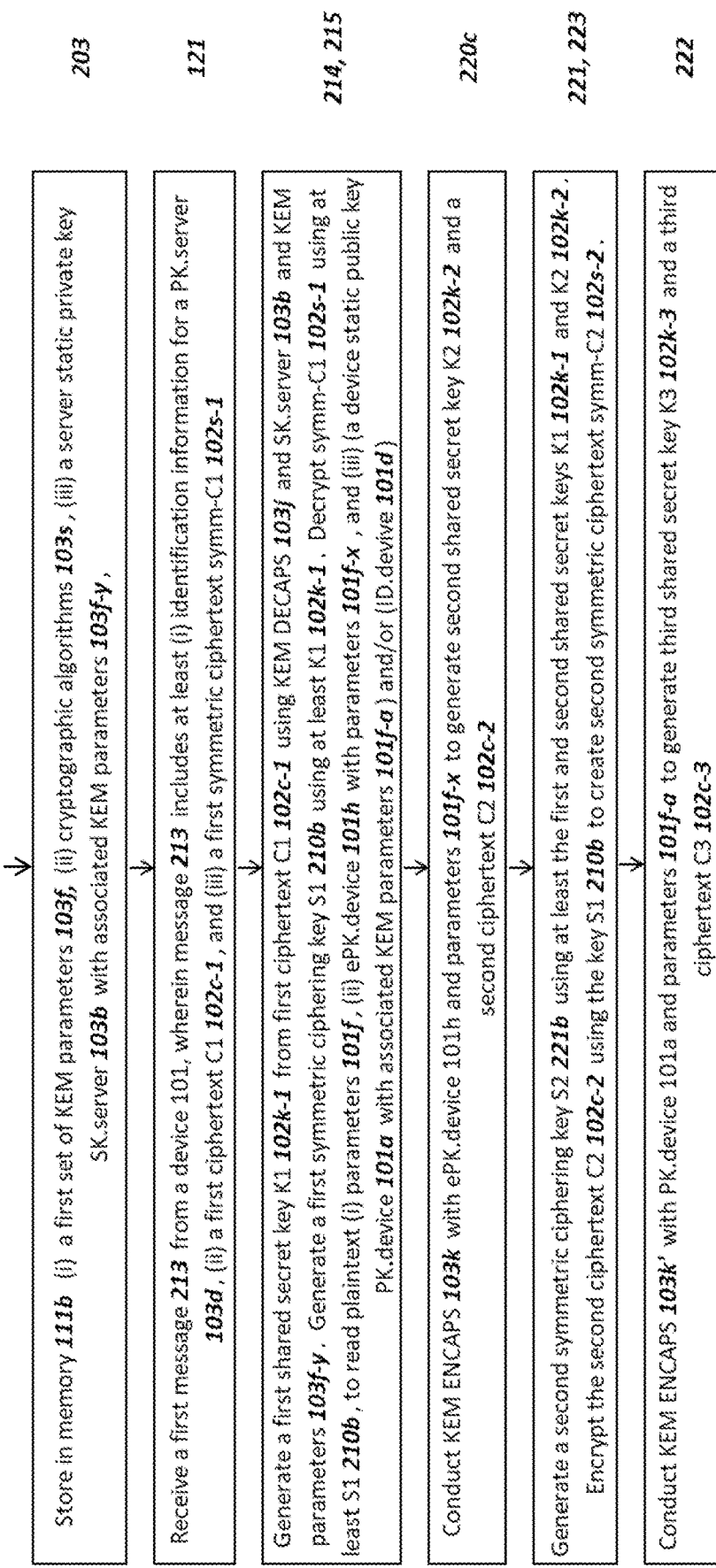
FIG. 10a is a flow chart illustrating exemplary steps for a server to use multiple different KEM algorithms in order to efficiently secure communications with a device, in accordance with exemplary embodiments.

Although FIG. 10a, as well as FIG. 4, depict the use of (i) device ephemeral public key PK.device 101h with a KEM ENCAPS 103k in a step 220c, and (ii) device static public key PK.device 101a with KEM ENCAPS 103k' in a step 222, for some exemplary embodiments the order for the use of the two public keys by server 111 could be changed without departing from the scope of the present disclosure. In other words, (i) a step 220c as depicted in FIG. 4 and also FIG. 10a could use device static public key PK.device 101d and parameters 101f-a for the KEM ENCAPS 103k, and (ii) in a step 222 as depicted in FIG. 4 and also FIG. 10a, device 101 could use device ephemeral public key ePK.device 101h and parameters 110f-x for KEM ENCAPS 103k'. For the embodiment described within this paragraph, then device in a step 226 would conduct KEM DECAPS 101k with SK.device 101v, and then in a step 228 conduct KEM DECAPS 101k' with eSK.device 101i. As depicted in FIG. 9a, the steps for device 101 to conduct with server 111 continues in FIG. 9b below.

FIG. 10b

FIG. 10b is a flow chart illustrating exemplary steps for a server to conduct multiple different KEM algorithms in order to efficiently secure communications with a device, in accordance with exemplary embodiments. The steps and components depicted in FIG. 10b for a server 111 are also depicted and described in connection with FIG. 2 and additional Figures above. The steps and data for server 111 to securely conduct multiple different KEM algorithms can comprise (i) a first portion depicted in FIG. 10a above and also (ii) a continuing, second portion depicted in FIG. 10b herein. Server 111 can use the electrical components for server 111 depicted and described in connection with FIG. 1b in order to conduct the steps in FIGS. 10a and 10b. Note that a server 111 can conduct the additional steps than the steps shown in FIG. 10b, as depicted in FIG. 2 and additional Figures above. FIG. 10b provides a summary of the primary steps for a preferred embodiment where a device 101 can use multiple types of KEM algorithms or parameters for multiple different KEM with a server 111. Note that some steps can be conducted in a different order or sequence than depicted in FIG. 10b and also FIG. 10a above. As one example, a step 219c below could be conducted before a step 223', and other possibilities exist as well for the sequence of some steps without departing from the scope of the present invention.

At step 223', server 111 can encrypt at least the third asymmetric ciphertext C3 102c-3 from a step 222 with the second symmetric ciphering key S2 221b in order to create a third symmetric ciphertext symm-C3 102s-3. A step 233' is depicted and described above in connection with FIG. 2 and also FIG. 4. As mentioned above, for some embodiments the "encryption" step over asymmetric ciphertext such as within a step 223' could omit the use of a ciphering key and could only use the corresponding MAC key. For these embodiments, the corresponding description such as within the first sentence of this paragraph would be "At step 223', server 111 can use symmetric ciphering algorithm 223a at least the third asymmetric ciphertext C3 102c-3 from a step 222 with the second MAC key MAC2 221c in order to create a MACed third asymmetric ciphertext C3 102c-3".

At step 219c, server 111 can generate a server ephemeral private key eSK.server 103i and ephemeral public key ePK.server 103h using a selected second subset 103f-z of KEM parameters 101f and 103f. A step 219c is depicted and described above in connection with FIG. 2. A step 219c by server 111 could use a PQC KeyGen function 103q. As described above in FIG. 10b, some steps depicted in FIG. 10 could be conducted in a different order than illustrated in FIG. 10b. As one example, a step 219c could be conducted before a step 233'.

Server 111 can then conduct a step 224a to generate a third symmetric ciphering key S3 224b with a HKDF 224a over at least shared secret keys K1 102k-1, K2 102k-2, and K3 102k-3. A step 224a for server 111 is depicted and described in connection with FIG. 4 above. Additional and mutually shared data could be input into the HKDF 224a in a step 224a as well. As described above in FIG. 10b, some steps depicted in FIG. 10 could be conducted in a different order than illustrated in FIG. 10b. As one example, a step 224a could be conducted before a step 233'.

At step 225, server 111 can encrypt at least ePK.server 103h and parameters 103f-z with the third symmetric ciphering key S3 241b to create a fourth symmetric ciphertext symm-C4 102s-4. A step 225 is depicted and described above in connection with FIG. 2 and also FIG. 5.

Server 111 can then send to device 101 a second message 122, wherein message 122 includes at least (i) the second symmetric ciphertext symm-C2 102s-2 and (ii) the third symmetric ciphertext symm-C3 102s-3 and (iii) the fourth symmetric ciphertext symm-C4 102s-4. A message 122 is also depicted and described in connection with FIG. 2 above, as well as FIG. 1a. Although a single value for metadata 220m is depicted for a message 122 in FIG. 2, different values of metadata 220m could be associated with each of the i) the second symmetric ciphertext symm-C2 102s-2 and (ii) the third symmetric ciphertext symm-C3 102s-3 and (iii) the fourth symmetric ciphertext symm-C4 102s-4, such as different initialization vectors output from HKDF and different MAC codes for each of the symmetric ciphertexts.

Server 111 can then receive a third message 123 from device 101, and the third message 123 can include at least a fifth symmetric ciphertext symm-C5 102s-5 and sixth symmetric ciphertext symm-C6 102s-6. A third message 123 from device 101 to server 111 is depicted and described in connection with FIG. 1a and also FIG. 2 above.

At step 237, server 111 can decrypt the fifth symmetric ciphertext symm-C5 using at least the third symmetric ciphering key S3 224b in order to read the fourth asymmetric ciphertext C4 102c-4. A step 237 is depicted and described in connection with FIG. 7a above. MAC codes received in metadata 21b' for the fifth symmetric ciphertext symm-C5 could be verified with the third MAC key MAC3 224c associated with the third symmetric ciphering key S3 224b.

At step 238, server 111 can then use the fourth asymmetric ciphertext C4 102c-4 to conduct a KEM DECAPS 103f' with eSK.server 103i and KEM parameters 103f to generate a fourth shared secret key K4 102k-4. A step 238 is depicted and described in connection with FIG. 2 and also FIG. 7a above.

Server 111 can then conduct a step 231 to generate a fourth symmetric ciphering key S4 231b with a HKDF 231a over at least shared secret keys K1 102k-1, K2 102k-2, K3 102k-3 and K4 102k-4. A step 231 for server 111 and device 101 is depicted and described in connection with FIG. 6 above.

At step 239, server 111 can decrypt the sixth symmetric ciphertext symm-C6 102s-6 using at least the fourth symmetric ciphering key S4 231b in order to read plaintext application data 233a from device 101. A step 239 is depicted and described in connection with FIG. 7b above. MAC codes received in metadata 21b' for the sixth symmetric ciphertext symm-C6 could be verified with the fourth MAC key MAC4 231c associated with the fourth symmetric ciphering key S4 231b. At step 240, server 111 can process the plaintext application data 233a, such as storing values from the plaintext application data 233a in memory 111b, and generating server application data 106b in response to the device application data 233a. A step 240 by server 111 is depicted and described in connection with FIG. 2 above.

Although not depicted in FIG. 10b, device 101 and server 111 could also communicate subsequent messages, such as the message 124 from server 111 in FIG. 2, where the message 124 could include a seventh symmetric ciphertext symm-C7 102s-7. Server 111 could encrypt the seventh symmetric ciphertext symm-C7 102s-7 which contains at least server application data 106b using at least the fourth symmetric ciphering key S4 231b. Device 101 could receive the message 124 an decrypt the seventh symmetric ciphertext symm-C7 102s-7 using at least the fourth symmetric ciphering key S4 231b mutually derived by device 101 in a step 231 performed by device 101.

CONCLUSION

Various exemplary embodiments have been described above. Those skilled in the art will understand, however, that changes and modifications may be made to those examples without departing from the scope of the claims.

The invention claimed is:

1. A method for a server to securely communicate with a device, the method performed by the server, the method comprising:
   a) storing in nonvolatile memory a first key encapsulation mechanism (KEM) for a first KEM algorithm, a second key encapsulation mechanism (KEM) for a second KEM algorithm, and a server static private key for the first KEM algorithm;
   b) receiving a first message from the device, wherein the first message includes a first asymmetric ciphertext and a first symmetric ciphertext;
   c) conducting a first KEM decapsulation (DECAPS) function with the first asymmetric ciphertext, the first KEM algorithm, and the server static private key in order to generate a first shared secret;
   d) generating a first symmetric ciphering key using a first shared secret key;
   e) decrypting the first symmetric ciphertext using the first symmetric ciphering key, wherein a first plaintext from the first symmetric ciphertext includes a device ephemeral public key and a device static public key;
   f) conducting a first KEM encapsulation (ENCAPS) function with the device ephemeral public key in order to generate a second shared secret and a second asymmetric ciphertext;
   g) conducting a second KEM ENCAPS function with the device static public key and the second KEM algorithm in order to generate a third shared secret key and a third asymmetric ciphertext;
   h) generating a second symmetric ciphering key using at least the second shared secret and the first shared secret key;
   i) generating a third symmetric ciphering key using at least a third shared secret and a first shared secret key and a second shared secret key;
   j) generating a server ephemeral public key and a server ephemeral private key;
   k) encrypting (i) the second asymmetric ciphertext into a second symmetric ciphertext using the first symmetric ciphering key, (ii) the third asymmetric ciphertext into a third symmetric ciphertext using the second symmetric ciphering key, and (iii) at least the server ephemeral public key into a fourth symmetric ciphertext using the third symmetric ciphering key; and
   l) sending a second message to the device, wherein the second message includes the second symmetric ciphertext and the third symmetric ciphertext and the fourth symmetric ciphertext.

2. The method of claim 1, wherein the first KEM algorithm and the second KEM algorithm comprise different algorithm types.

3. The method of claim 2, wherein the first KEM algorithm comprises a first algorithm type for lattice-based cryptography and the second KEM algorithm comprises a second algorithm type for code-based cryptography.

4. The method of claim 2, wherein the first KEM algorithm comprises a first algorithm type for code-based cryptography and the second KEM algorithm comprises a second algorithm type for lattice-based cryptography.

5. The method of claim 1, wherein the first symmetric ciphering key comprises a first portion and a second portion, wherein in step e) the server decrypts with the first portion of the first symmetric ciphering key, and wherein in step k) the server encrypts the second asymmetric ciphertext with the second portion of the first symmetric ciphering key.

6. The method of claim 1, further comprising in step h), generating the second symmetric ciphering key using a HMAC-based Extract-and-Expand Key Derivation Function (HKDF) with at least the first shared secret and the second shared secret.

7. The method of claim 6, further comprising in step h) generating a message authentication code (MAC) key and an initialization vector with the HKDF.

8. A network for securely communicating with a device, the network comprising:
   a nonvolatile memory configured to store a server static private key;
   a network interface configured to:
   a) receive, from the device, a first message comprising a first asymmetric ciphertext and a first symmetric ciphertext of a first plaintext comprising a device ephemeral public key and a device static public key; and
   b) send, to the device, a second message comprising a second symmetric ciphertext and a third symmetric ciphertext and a fourth symmetric ciphertext;
   a random access memory (RAM) storing computer executable instructions configured to:
   a) decrypt the first symmetric ciphertext using a first symmetric ciphering key;
   b) generate a server ephemeral public key and a corresponding server ephemeral private key; and
   c) encrypt (i) a second asymmetric ciphertext into a second symmetric ciphertext using the first symmetric ciphering key, (ii) a third asymmetric ciphertext into a third symmetric ciphertext using a second symmetric ciphering key, and (iii) the server ephemeral public key into a fourth symmetric ciphertext using a third symmetric ciphering key; and
   a processor configured to:
   a) conduct a KEM decapsulation (DECAPS) function with the first asymmetric ciphertext and the server static private key in order to generate a first shared secret;
   b) generate the first symmetric ciphering key using at least the first shared secret;
   c) conduct a first KEM encapsulation (ENCAPS) function with the device ephemeral public key in order to generate a second shared secret and the second asymmetric ciphertext;
   d) conduct a second KEM ENCAPS function with the device static public key in order to generate a third shared secret key and the third asymmetric ciphertext;
   e) generate the second symmetric ciphering key using at least the second shared secret and the first shared secret; and
   f) generate the third symmetric ciphering key using at least a third shared secret and a first shared secret key and a second shared secret key.

9. The network of claim 8, wherein at least one of the server static private key and the server ephemeral private key supports a first KEM algorithm, wherein at least one of the device static public key and the device ephemeral public key supports a second KEM algorithm, and wherein the first and second KEM algorithms comprise different algorithm types.

10. The network of claim 9, wherein the first KEM algorithm comprises code-based cryptography and the second KEM algorithm comprises lattice-based cryptography.

11. The network of claim 9, wherein the first KEM algorithm comprises lattice-based cryptography and the second KEM algorithm comprises code-based cryptography.

12. The network of claim 8, wherein the first symmetric ciphering key comprises a first portion and a second portion, wherein the network decrypts the first symmetric ciphertext with the first portion of the first symmetric ciphering key, and wherein network encrypts the second asymmetric ciphertext with the second portion of the first symmetric ciphering key.

13. The network of claim 8, further comprising in step e) for the processor, generating the second symmetric ciphering key using a HMAC-based Extract-and-Expand Key Derivation Function (HKDF) with at least the first shared secret and the second shared secret.

14. The network of claim 13, further comprising in step e) for the processor, generating a message authentication code (MAC) key and an initialization vector with the HKDF.

15. A method for a device to securely communicate with a network, the method performed by the device, the method comprising:
   a) storing (i) a set of key encapsulation mechanism (KEM) algorithms comprising a first KEM algorithm, (ii) a server static public key, and (iii) a device static public key;
   b) generating a device ephemeral private key and a corresponding device ephemeral public key for the first KEM algorithm;
   c) conducting a KEM encapsulation (ENCAPS) function with the server static public key to generate a first shared secret and a first asymmetric ciphertext;
   d) generating a first symmetric ciphering key using at least the first shared secret;
   e) encrypting a first plaintext into a first symmetric ciphertext, wherein the first plaintext comprises the device ephemeral public key, the device static public key, an identifier for the first KEM algorithm, and the set of KEM algorithms;
   f) sending, to the network via a network interface, a first message comprising the first asymmetric ciphertext and the first symmetric ciphertext;
   g) receiving, from the network, a second message comprising a second symmetric ciphertext, a third symmetric ciphertext, and a fourth symmetric ciphertext;
   h) decrypting the second symmetric ciphertext with the first symmetric ciphering key in order to read a second asymmetric ciphertext;
   i) conducting a first KEM decapsulation (DECAPS) function with the device ephemeral private key and the first KEM algorithm and the second asymmetric ciphertext to generate a second shared secret;
   j) generating a second symmetric ciphering key using at least the first shared secret and the second shared secret;
   k) decrypting the third symmetric ciphertext with the second symmetric ciphering key in order to read a third asymmetric ciphertext;

l) conducting a second KEM DECAPS function with the device static private key and the third asymmetric ciphertext to generate a third shared secret;

m) generating a third symmetric ciphering key using at least the first shared secret and the second shared secret and the third shared secret; and n) decrypting the fourth symmetric ciphertext with the third symmetric ciphering key in order to read a second plaintext.

16. The method of claim 15, wherein the second plaintext includes a server ephemeral public key and an identity for second KEM algorithm, wherein the set of KEM algorithms includes the second KEM algorithm, and wherein the server ephemeral public key supports the second KEM algorithm.

17. The method of claim 15, further comprising conducting a second KEM ENCAPS function with the server ephemeral public key and the second KEM algorithm in order to generate a fourth asymmetric ciphertext and a fourth shared secret.

18. The method of claim 17, wherein the first KEM algorithm comprises a first algorithm type for lattice-based cryptography and the second KEM algorithm comprises a second algorithm type for code-based cryptography.

19. The method of claim 17, wherein the first KEM algorithm comprises a first algorithm type for code-based cryptography and the second KEM algorithm comprises a second algorithm type for lattice-based cryptography.

20. The method of claim 15, wherein the first symmetric ciphering key comprises a first portion and a second portion, wherein in step e) the device encrypts with the first portion of the first symmetric ciphering key, and wherein in step h) the device decrypts the second symmetric ciphertext with the second portion of the first symmetric ciphering key.

21. The method of claim 15, further comprising in step j), generating the second symmetric ciphering key using a HMAC-based Extract-and-Expand Key Derivation Function (HKDF) with at least the first shared secret and the second shared secret.

22. The method of claim 21, further comprising generating a message authentication code (MAC) key and an initialization vector with the HKDF.

* * * * *